(12) United States Patent
Kwon et al.

(10) Patent No.: US 10,203,863 B2
(45) Date of Patent: Feb. 12, 2019

(54) FLEXIBLE DISPLAY DEVICE AND OPERATING METHOD THEREOF

(71) Applicant: LG ELECTRONICS INC., Seoul (KR)

(72) Inventors: Yunmi Kwon, Seoul (KR); Kiseon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 39 days.

(21) Appl. No.: 15/059,909

(22) Filed: Mar. 3, 2016

(65) Prior Publication Data
US 2017/0061932 A1    Mar. 2, 2017

(30) Foreign Application Priority Data
Aug. 26, 2015 (KR) .................. 10-2015-0120570

(51) Int. Cl.
*G06F 3/0487*    (2013.01)
*G06F 3/14*    (2006.01)
*G06F 1/16*    (2006.01)
*G09G 5/14*    (2006.01)
*G06F 3/041*    (2006.01)

(52) U.S. Cl.
CPC .......... *G06F 3/0487* (2013.01); *G06F 1/1652* (2013.01); *G06F 3/0412* (2013.01); *G06F 3/14* (2013.01); *G09G 5/14* (2013.01); *G06F 2203/04102* (2013.01); *G09G 2340/14* (2013.01); *G09G 2354/00* (2013.01); *G09G 2380/02* (2013.01)

(58) Field of Classification Search
CPC .................. G09G 2380/02; G06F 2203/04102
See application file for complete search history.

(56) References Cited

U.S. PATENT DOCUMENTS

| | | | |
|---|---|---|---|
| 8,860,656 B1 * | 10/2014 | Cho .................. | G06F 3/041 345/102 |
| 8,947,344 B2 * | 2/2015 | Cho .................. | G06F 3/041 345/1.1 |
| 9,651,997 B2 * | 5/2017 | Browning ........... | G06F 1/1652 |
| 2010/0011291 A1 * | 1/2010 | Nurmi .................. | G06F 3/0414 715/702 |
| 2012/0007796 A1 * | 1/2012 | Jokinen ................. | H05K 1/189 345/156 |

(Continued)

FOREIGN PATENT DOCUMENTS

| | | |
|---|---|---|
| CN | 103827771 A | 5/2014 |
| CN | 104583908 B | 9/2018 |
| WO | 2013/147333 A1 | 10/2013 |

*Primary Examiner* — Gene W Lee
(74) *Attorney, Agent, or Firm* — Dentons US LLP

(57) ABSTRACT

A flexible display device is provided. The flexible display device includes a display unit including an expandable or reducible screen, a sensing unit to detect a size of the screen, and a control unit coupled with the display unit and the sensing unit, the control unit is further capable of: displaying a first execution window of a first application on the screen corresponding to a first distance; and executing a second application if the size of the screen is expanded by an area corresponding to a predetermined distance in a first direction after the size of the screen is reduced by the area corresponding to the predetermined distance in a second direction.

13 Claims, 55 Drawing Sheets

(56) References Cited

U.S. PATENT DOCUMENTS

| | | | |
|---|---|---|---|
| 2013/0265221 A1* | 10/2013 | Lee | G06F 3/01 |
| | | | 345/156 |
| 2013/0275910 A1* | 10/2013 | Kim | G06F 3/0484 |
| | | | 715/800 |
| 2014/0137041 A1* | 5/2014 | Jeon | G06F 3/0482 |
| | | | 715/815 |
| 2014/0204037 A1 | 7/2014 | Kim | |
| 2014/0218375 A1 | 8/2014 | Kim | |
| 2014/0375702 A1* | 12/2014 | Cho | G06F 1/3265 |
| | | | 345/690 |

* cited by examiner

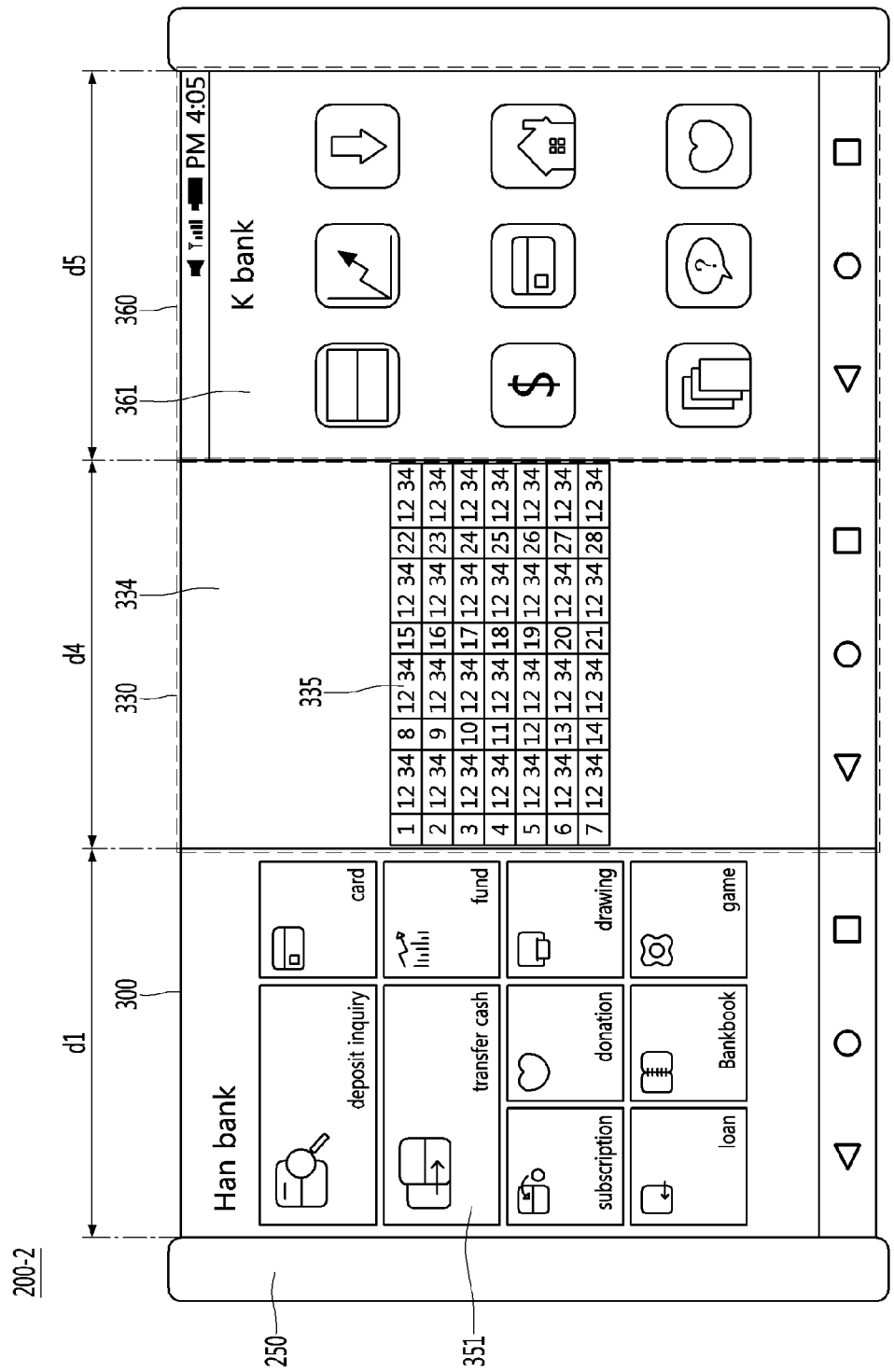

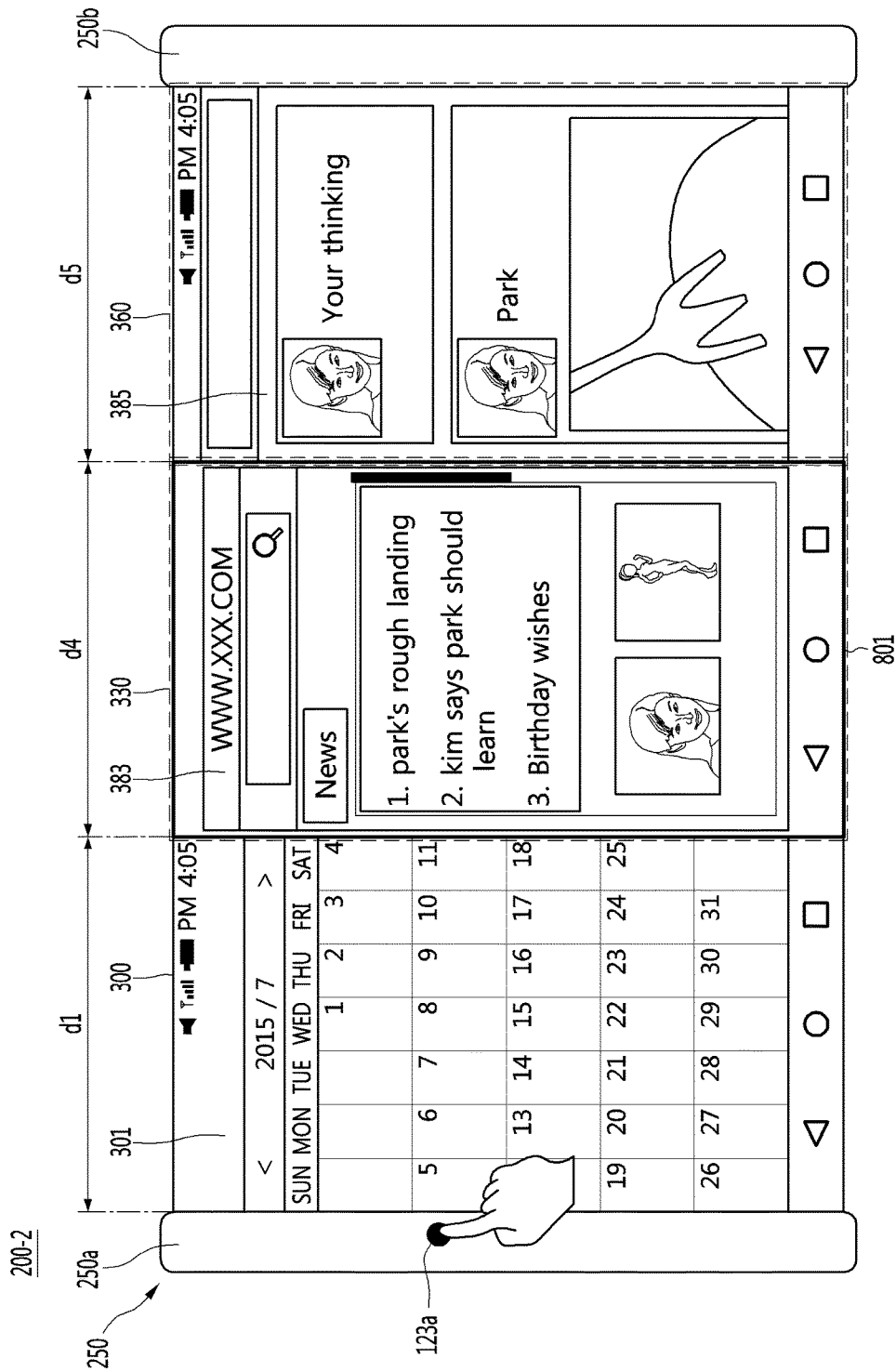

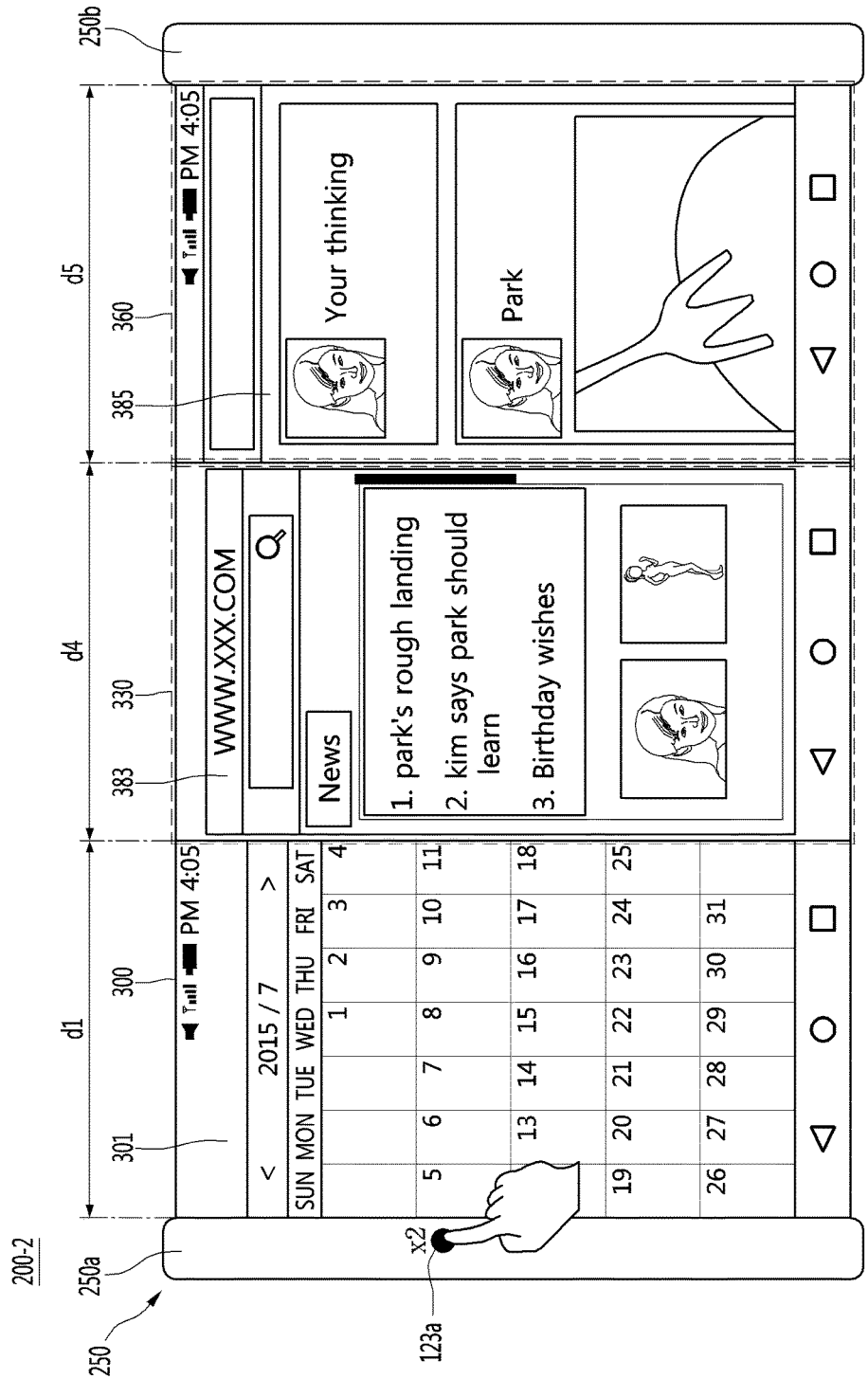

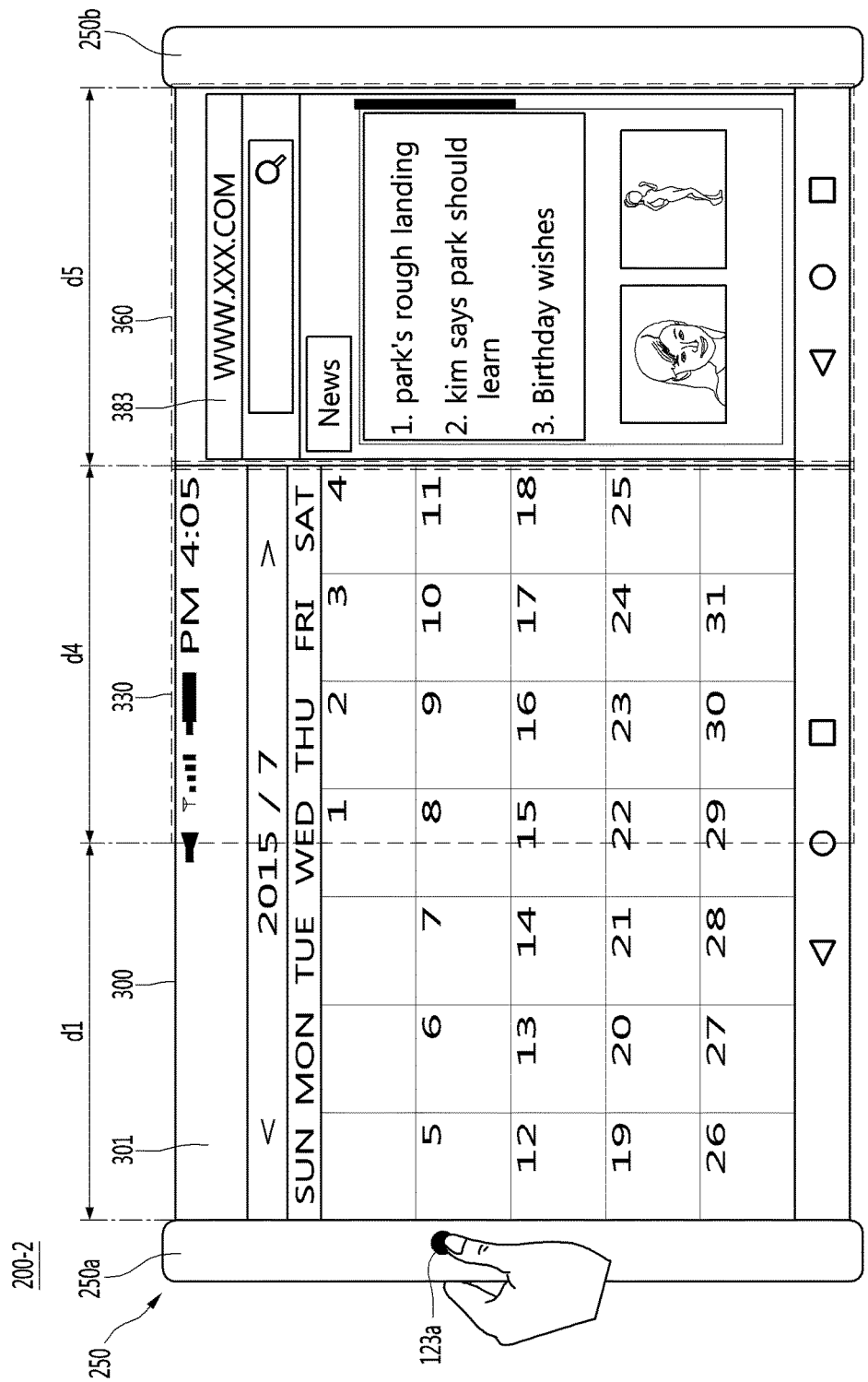

FLEXIBLE DISPLAY DEVICE AND OPERATING METHOD THEREOF

CROSS-REFERENCE TO RELATED APPLICATIONS

The present application claims priority under 35 U.S.C. 119 and 35 U.S.C. 365 to Korean Patent Application No. 10-2015-0120570 (filed on Aug. 26, 2015), which is hereby incorporated by reference in its entirety.

BACKGROUND

The present disclosure relates to a flexible display device and a method for operating the same.

With the development of a display technology, researches have been conducted to develop flexible display devices that can be rolled or can be stretched in at least one direction when being used. Such display devices can be variously changed in shape, and thus may satisfy both the requirement of a large-size screen at a stage of display use and the requirement of a compact display size for display portability.

Meanwhile, a flexible display device may be deformed into not only a predetermined shape but also various shapes depending on a user's intention or an environment in which the display device is used. Therefore, if a display area of the display device is fixed, a user may feel a sense of inconvenience.

SUMMARY

Embodiments provide a flexible display device capable of being extended or reduced by a simple operation according to a request of a user.

Embodiments also provide a flexible display device for enabling multitasking through an extended area of a display unit.

In one embodiment, a flexible display device includes a display unit including an expandable or reducible screen, a sensing unit to detect a size of the screen, and a control unit coupled with the display unit and the sensing unit, the control unit is further capable of: displaying a first execution window of a first application on the screen corresponding to a first distance; and executing a second application if the size of the screen is expanded by an area corresponding to a predetermined distance in a first direction after the size of the screen is reduced by the area corresponding to the predetermined distance in a second direction.

the control unit is further capable of detecting an expansion of the screen in the first direction; and displaying a second execution window of the second application on an expanded area of the screen.

the control unit is further capable of, when the size of the screen is reduced by the area the predetermined distance in the second direction, displaying, on the first execution window, an indicator representing that the second application can be executed if the size of the screen is expanded by the area corresponding to the predetermined distance in the first direction.

a part of the first execution window is disappeared if the size of the screen is reduced over the predetermined distance.

the first application and the second application provides the same type of a service.

the first application window and the second application window are separated from each other.

In another embodiment, A flexible display device includes a display unit including an expandable or reducible screen; a sensing unit to detect a size of the screen; and a control unit coupled with the display unit and the sensing unit, the control unit is further capable of: displaying a first information on the screen corresponding to a first distance; and displaying an indicator representing that a second information can be provided if the size of the screen is expanded by an area corresponding to a predetermined distance in a first direction after the size of the screen is reduced by the area corresponding to the predetermined distance in a second direction.

the control unit is further capable of detecting an expansion of the screen in the first direction; and displaying a second information on an expanded area of the screen.

the first information is an execution window of a first application and the second information is a home screen.

wherein the control unit is further capable of receiving a request for selecting an application icon included in the home screen; and switching the home screen to an execution window of a second application corresponding to the selected application icon according to the request.

the first information is an execution window of a first application and the second information is an execution window of a second application.

the first application and the second application provides the same type of a service.

the control unit displays the second information on the extended area if an extended distance of the expanded area of the screen is equal to or larger than a reference distance.

wherein the control unit displays, on the extended area, one or more application icons associated with the first information in if the extended distance corresponding to the extended area is less than the reference distance.

wherein the control unit is further capable of receiving a request for selecting one of the one or more application icons; and displaying an execution window of an application corresponding to a selected application icon on an area extended by at least the reference distance if the extended distance of the screen is equal to or larger than the reference distance.

The details of one or more embodiments are set forth in the accompanying drawings and the description below. Other features will be apparent from the description and drawings, and from the claims.

BRIEF DESCRIPTION OF THE DRAWINGS

FIGS. 9A to 9C are diagrams illustrating an operation of performing multitasking via a home screen according to an embodiment.

FIGS. 15A to 15C are diagrams illustrating an example in which one of a plurality of items is switched to preset information using a home button.

FIGS. 17A and 17B are diagrams illustrating an example in which in the case where a request for successively selecting the home button two times is received, information related to each item is displayed.

FIGS. 19A and 19B are diagrams illustrating that, in the case where a request for selecting the home button is received and the display unit is extended, an item of an area corresponding to an extending direction of the display unit is enlarged.

DETAILED DESCRIPTION OF THE EMBODIMENTS

Figure 1A:
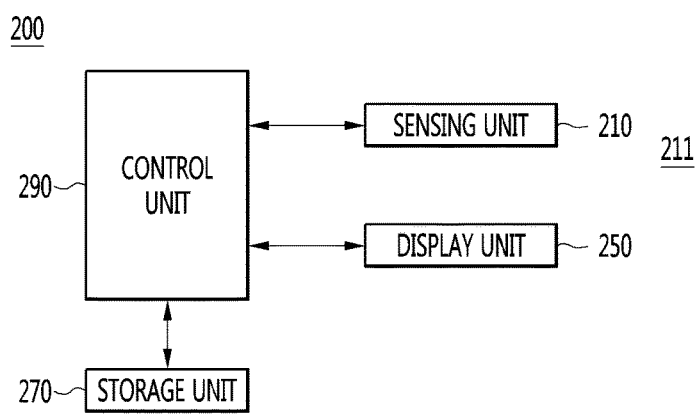
FIG. 1A is a block diagram illustrating a flexible display device according to an embodiment.

Embodiments of the present disclosure will be described in detail with reference to the accompanying drawings. Like reference numerals refer to like elements throughout, and overlapping descriptions are avoided. In the following description, the terms "module" and "unit" for referring to elements are given or used interchangeably in consideration of ease of description, and thus, the terms per se do not necessarily indicate different meanings or functions. Detailed descriptions of the related art are not provided so that the gist of the embodiments is not unnecessarily obscured. Furthermore, the accompanying drawings are provided only to assist with an understanding of the embodiments of the present disclosure and are not intended to limit the technical concept of the present disclosure, and should be construed as covering all modifications, equivalents or alternatives that fall within the spirit and technical scope of the present disclosure.

The term "first", "second" or the like may be used for describing various elements but does not limit the elements. Such terms are only used for distinguishing one element from other elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terms of a singular form may include plural forms unless otherwise specified.

It will be further understood that the terms "comprise", "comprising,", "include", "including", "have" and/or "having", when used herein, specify the presence of stated features, numbers, steps, operations, elements, components or combinations thereof, but do not preclude the presence or addition of one or more other features, numbers, steps, operations, elements, components or combinations thereof.

Figure 1B:
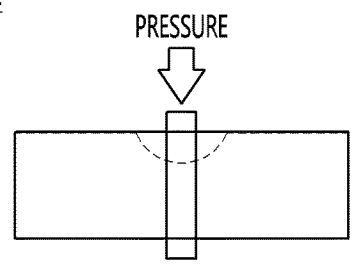
FIG. 1B is a diagram for describing a pressure sensor of a sensing unit.
Figure 1C:
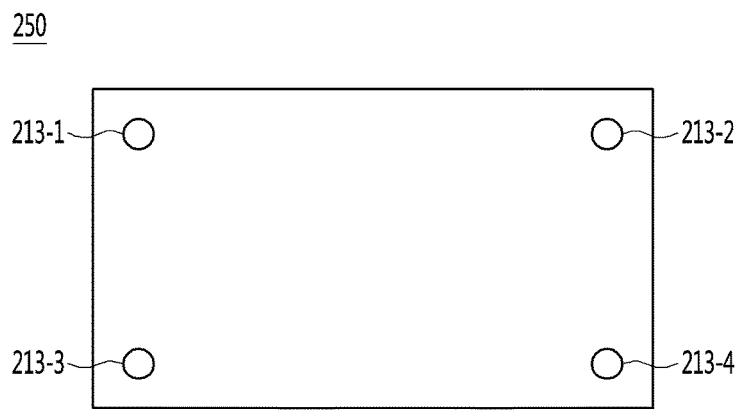
FIG. 1C is a diagram illustrating a display unit in which the sensing unit includes a plurality of acceleration sensors.

FIGS. 1A to 1C are diagrams illustrating a flexible display device according to an embodiment.

FIG. 1A is a block diagram illustrating a flexible display device 200 according to an embodiment, FIG. 1B is a diagram for describing a pressure sensor 211 of a sensing unit 210, and FIG. 1C is a diagram illustrating a display unit 250 in which the sensing unit 210 includes a plurality of acceleration sensors 213-1 to 213-4.

The flexible display device 200 according to an embodiment is a next-generation display device that is not only bendable but also stretchable and may be implemented in various and new environments, compared to typical display devices implemented using a rigid material such as glass, silicon, or the like.

In one embodiment, the flexible display device 200 may be a stretchable display device that is stretched when being pulled and recovers its original form when being released. If a certain period of time elapses while the flexible display device is being pulled and stretched, the flexible display device may be fixed in a stretched state. When a force is applied to the flexible display device, the flexible display device may contract to recover its original form.

In another embodiment, the flexible display device 200 may be a rollable display device that is able to be rolled or unrolled like paper.

Referring to FIG. 1A, the flexible display device 200 may include the sensing unit 210, the display unit 250, a storage unit 270, and a control unit 290.

The sensing unit 210 may detect extension or reduction of the display unit 250. The sensing unit 210 may detect a direction or strength of a force applied to the display unit 250.

In one embodiment, the sensing unit 210 may include at least one pressure sensor. The at least one pressure sensor may be disposed at the display unit 250. In the case where the sensing unit 210 includes at least one pressure sensor, each pressure sensor 211 may detect a change in resistance or capacitance between both ends of an area to which a pressure (or force) is applied as illustrated in FIG. 1B. The pressure sensor 211 may transfer, to the control unit 290, at least one of a capacitance change signal indicating a detected capacitance change or a resistance change signal indicating a detected resistance change. The capacitance change signal or the resistance change signal may include information on at least one of the strength or the direction of the force applied to the pressure sensor 211. The control unit 290 may obtain at least one of the strength or the direction of the force applied to the display unit 250, using the capacitance change signal or the resistance change signal received from the pressure sensor 211.

In another embodiment, the sensing unit 210 may include the plurality of acceleration sensors 213-1 to 213-4 as illustrated in FIG. 1C. In the case where the display unit 250 has a rectangular shape, each acceleration shape may be disposed adjacent to a vertex of a rectangle. In the case where the display unit 250 includes a flexible substrate and an image display unit, the acceleration sensors 213-1 to 213-4 may be arranged under the flexible substrate, and the image display unit may be disposed on the flexible substrate. However, this arrangement is merely an example, and the acceleration sensors 213-1 to 213-4 may be embedded in the flexible substrate or the image display unit.

The acceleration sensor serves to detect an intensity of impact or an acceleration of an object. A motion state of the display unit 250 may be accurately detected using the acceleration sensor. The acceleration sensor may sense the acceleration of the display unit 250 in three axial (x-axis, y-axis, z-axis) directions perpendicular to each other. The control unit 290 may obtain a moving speed using a tri-axial acceleration measured by the acceleration sensor. The control unit 290 may obtain a tri-axially extended distance of the display unit 250 using the obtained moving speed. The control unit 290 may obtain the strength and the direction of the force applied to the display unit 250, using the moving speed and distance obtained using the acceleration sensor. The control unit 290 may extend the display unit 250 according to the direction and the strength of the force.

In another embodiment, the sensing unit 210 may include a plurality of hall sensors. The plurality of hall sensors may be arranged inside the display unit 250 or on the display unit 250. In the case where the sensing unit 210 includes the plurality of hall sensors, the control unit 290 may extend or reduce the display unit 250 using voltage sensed by the hall sensors.

In the case where the sensing unit 210 includes the hall sensors, an embodiment in which extension or reduction of the display unit 250 is detected using the hall sensors will be described with reference to FIGS. 3A to 3F.

The display unit 250 may be stretched in at least one direction. The display unit 250 may include a flexible substrate and an image display unit. The flexible substrate may be formed of polydimethylsiloxane (PDMS) and may be extended by a pulling force. The image display unit may be disposed on the flexible substrate, and may be extended together with the flexible substrate. The image display unit may display an image.

The display unit 250 may include an organic light-emitting diode (OLED).

The storage unit 270 may store a strength of a force applied to the display unit 250 and an extension degree or a reduction degree of the display unit 250 which corresponds to the strength of the force. The extension degree of the display unit 250 may indicate an extended length of the display unit 250, and the reduction degree of the display unit 250 may indicate a reduced length of the display unit 250.

The control unit 290 may detect extension or reduction of the display unit 250 via the sensing unit 210. The extension of the display unit 250 may indicate that a size of a screen able to be displayed by the display unit 250 is increased, and the reduction of the display unit 250 may indicate that the size of the screen able to be displayed by the display unit 250 is decreased. The control unit 290 may change a graphic or an image displayed on the screen according to the increase or decrease in the size of the screen of the display unit 250.

Furthermore, the control unit 290 may control overall operation of the flexible display device 200. Operation of the control unit 290 will be described in more detail later.

Figure 2A:
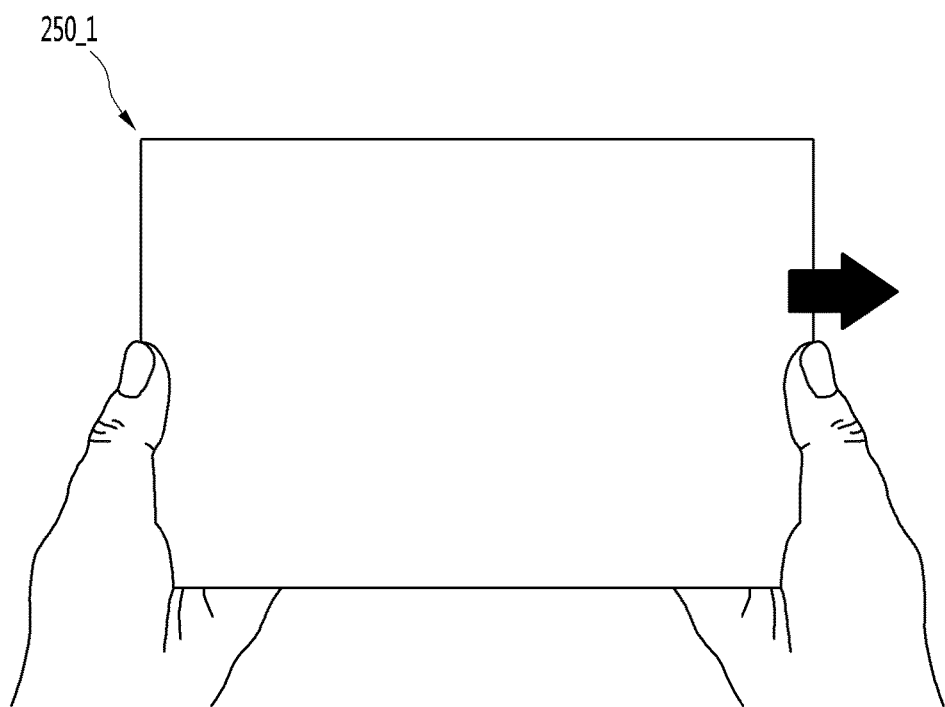
FIGS. 2A and 2B illustrate exemplary use of a stretchable display device that is a type of a flexible display device.
Figure 2A:
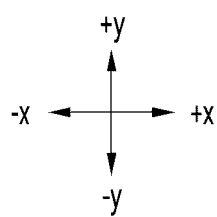
Figure 2B:
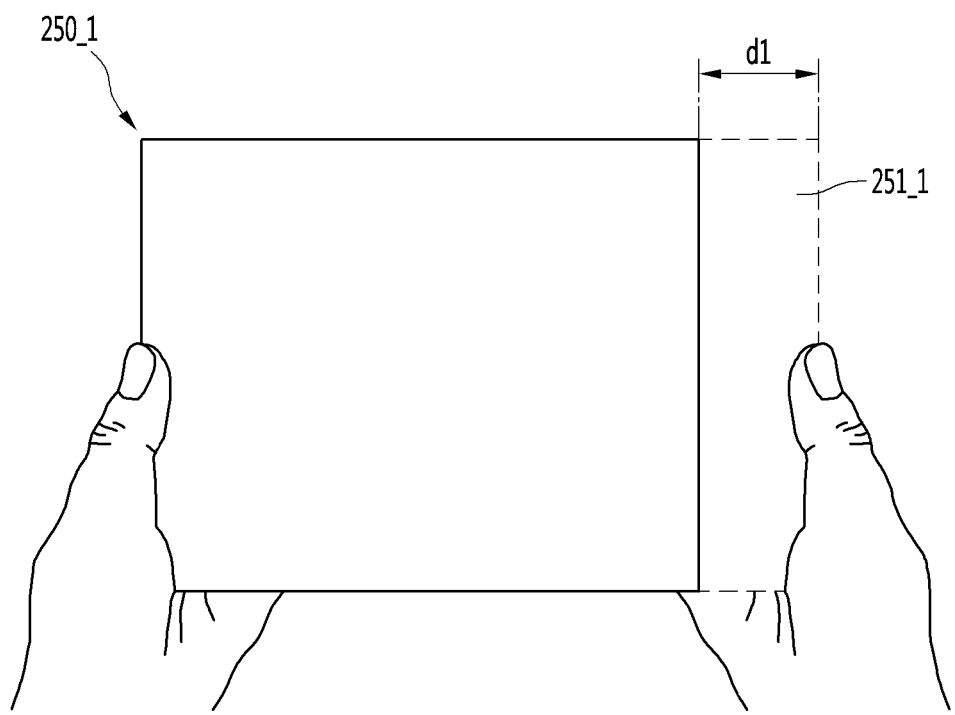

FIGS. 2A and 2B illustrate exemplary use of a stretchable display device that is a type of a flexible display device.

FIG. 2A illustrates a state of a display unit 250_1 before a stretchable display unit 200_1 is stretched. In this state, when a force is applied to the display unit 250_1 in a +x-axis direction, the control unit 290 may extend the display unit 250_1 by a distance of d1 in the +x-axis direction as illustrated in FIG. 2B. As the display unit 250_1 is extended, the display unit 250 may be extended by as much as an extended area 251_1 corresponding to the extended distance d1. That is, the screen size of the display unit 250 may be increased by as much as the extended area 251_1. FIG. 2 illustrates that the force is applied in the +x-axis direction, but this is merely an example. In the case where a force is applied to the display unit 250_1 in a −x-axis direction, the control unit 290 may allow the display unit 250_1 to recover its original size.

FIGS. 3A to 3F are diagrams illustrating a configuration and operation of a rollable display device which is a type of a flexible display device according to an embodiment.

Figure 3A:
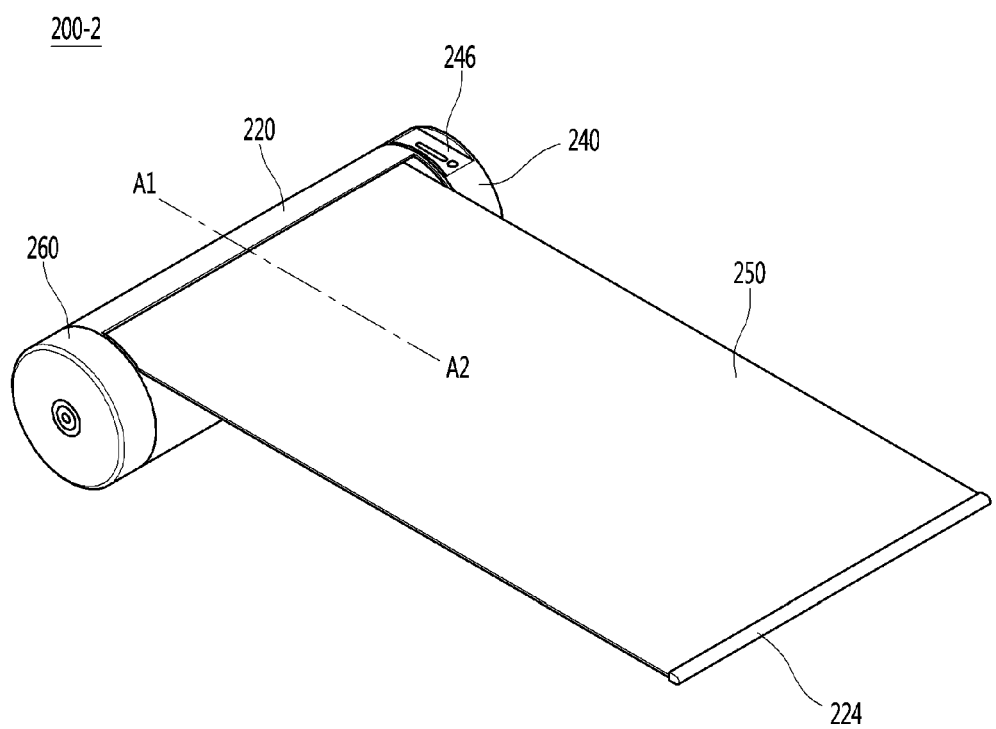
FIGS. 3A to 3F are diagrams illustrating a configuration and operation of a rollable display device which is a type of a flexible display device.
Figure 3B:
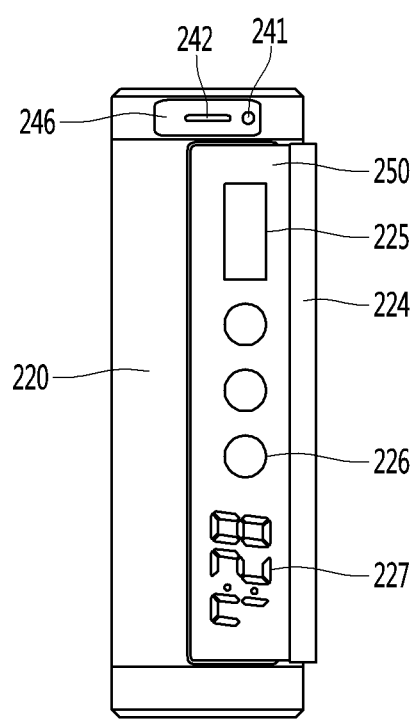
Figure 3C:
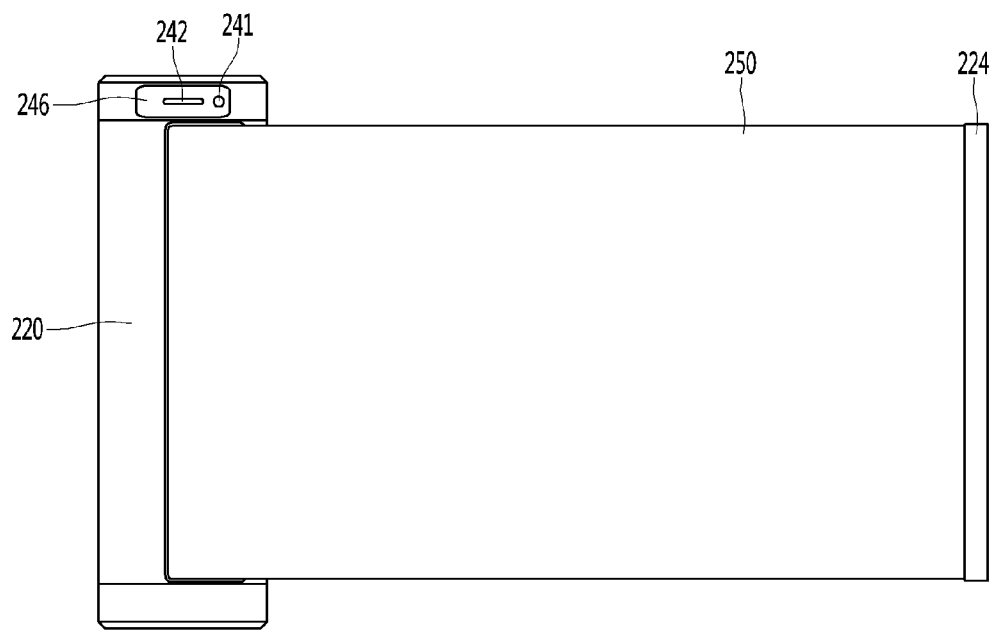
Figure 3D:
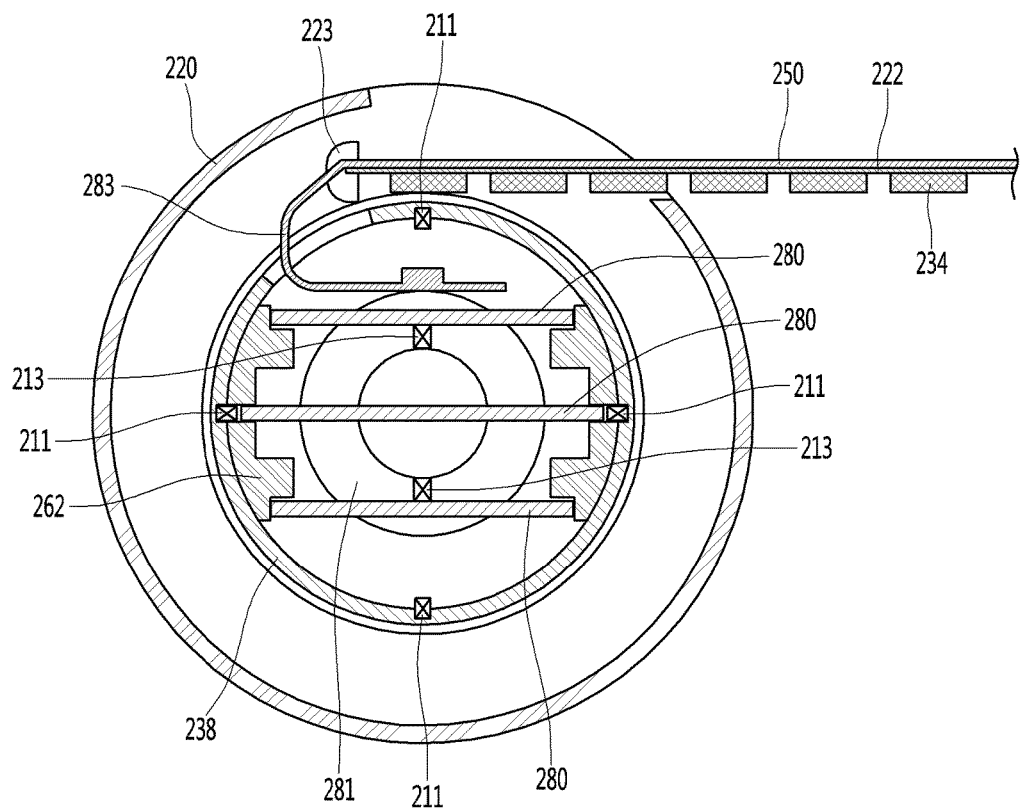
Figure 3E:
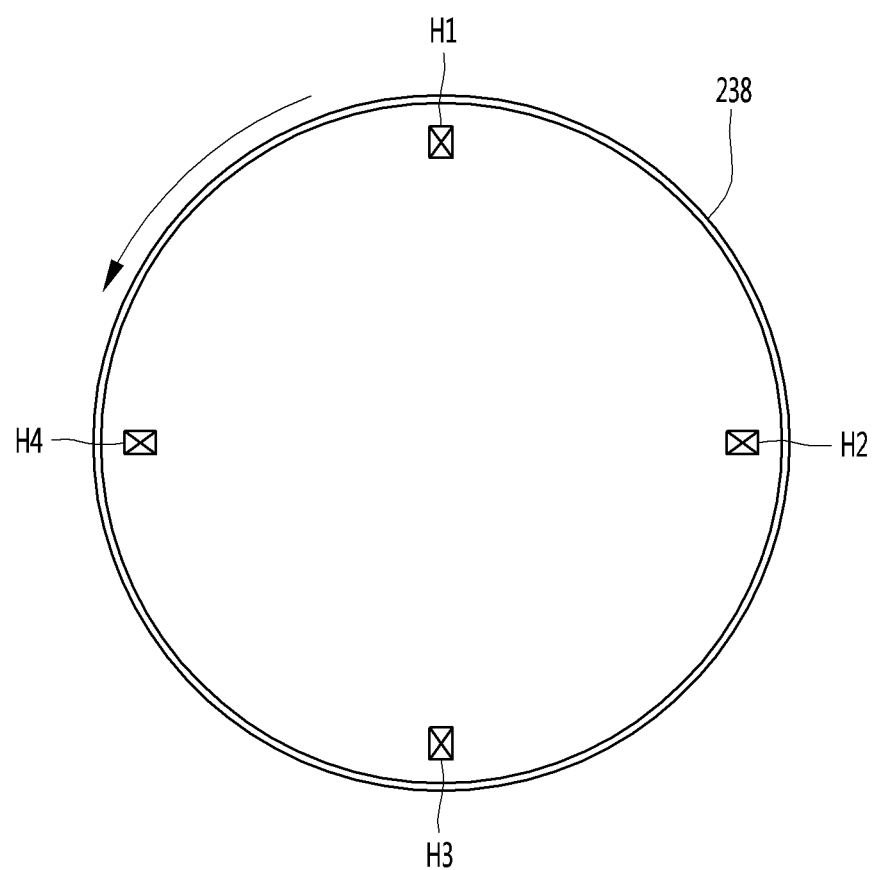
Figure 3F:
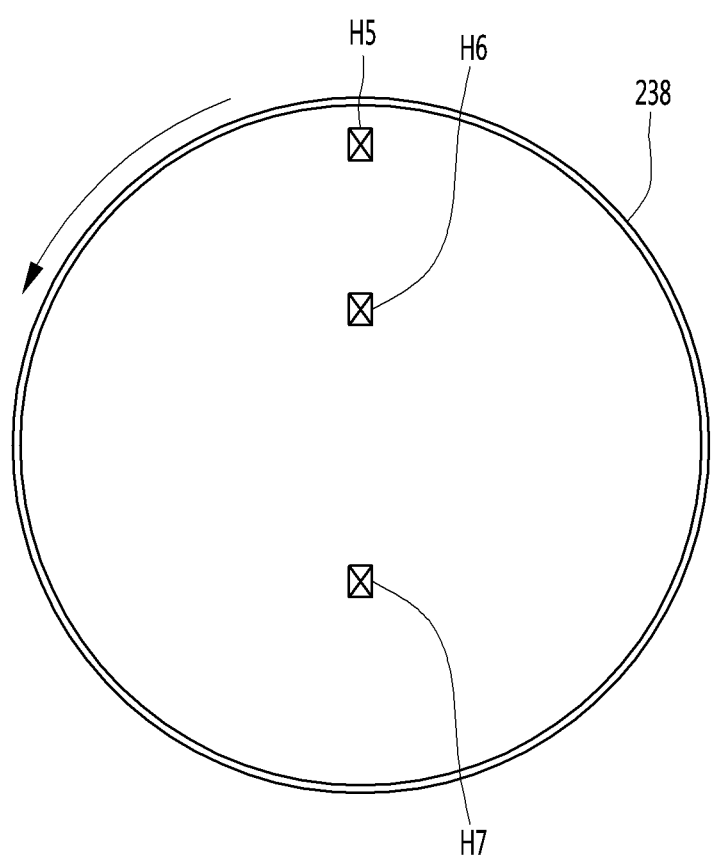

FIG. 3A is a perspective view of the rollable display device according to an embodiment, FIG. 3B is a diagram illustrating the rollable display device that is in a first operation state according to an embodiment, FIG. 3C is a diagram illustrating the rollable display device that is in a second operation state according to an embodiment, FIG. 3D is a cross-sectional view of the rollable display device taken along line A1-A2 of FIG. 3A, and FIGS. 3E and 3F are diagrams illustrating a process of sensing a spread length, a rolled length, or a rotation amount of a display unit using a hall sensor according to an embodiment.

Referring to FIGS. 3A to 3D, a rollable display device 200-2 may include an upper case 240, an intermediate case 220, a lower case 260, a display unit 250, a first holder 223, and a second holder 224.

The upper case 240, the lower case 260, and the intermediate case 220 form an exterior of the rollable display device 200-2. The intermediate case 220 may have a cylindrical shape, but is not limited thereto and may have various shapes such as a hexahedral shape. As illustrated in FIG. 3D, a part of the intermediate case 220 may be opened so as to expose a part of the display unit 250.

The upper case 240 and the lower case 260 may cover the intermediate case 220 at an upper side and a lower side thereof. The upper case 240 and the lower case 260 may not expose various components arranged inside the intermediate case 220. A recess part 246 may be formed in the upper case 240, wherein the recess part 246 may be recessed towards the inside of the upper case 240 so as to have a planar shape. At least one of a camera 241 or a sound output unit 242 may be disposed in the recess part 246. The first holder 223 (see FIG. 3D) may be provided to an end portion of one side of the display unit 250, and the second holder 224 may be provided to an end portion of another side of the display unit 250. The first holder 223 may prevent the display unit 250 from escaping from an inner side of the intermediate case 220 when a screen of the display unit 250 is maximally extended. The second holder 224 may prevent the display unit 250 from being rolled into the inner side of the intermediate case 220. A user may draw the second holder 224 in a specific direction to extend the screen of the display unit 250.

The display unit 250 may be rolled in towards the inner side of the intermediate case 220, or may be rolled out of the intermediate case 220. That is, the display unit 250 may be wound, rolled or coiled into the inner side of the intermediate case 220, or may be unwound, unrolled or uncoiled out of the intermediate case 220.

FIG. 3B is a diagram illustrating the first operation state of the rollable display device 200-2, and FIG. 3C is a diagram illustrating the second operation state of the rollable display device 200-2.

In a state in which the display unit 250 is not deformed (e.g., a state of having an infinite radius of curvature, hereinafter referred to as the first operation state), a region displayed by the display unit 250 may be a plane. In a state in which the display unit 250 is deformed by an external force in the first operation state (e.g., a state of having a finite radius of curvature, hereinafter referred to as the second operation state), a region displayed by the display unit 250 may be a curved surface. As illustrated in the drawings, information displayed in the second operation state may be time information output to the curved surface. Such time information may be implemented by individually controlling light emission of sub-pixels arranged in a matrix.

In the first operation state, the display unit 250 may not be flat but curved (e.g., vertically or horizontally curved). In this case, when an external force is applied to the display unit 250, the display unit 250 may be deformed to be flat (or less curved) or more curved.

The display unit 250 may be combined with a touch sensor to implement a flexible touch screen. When the flexible touch screen is touched, a control unit 290 may perform control corresponding to the touch input. The flexible touch screen may detect a touch input not only in the first operation state but also in the second operation state.

The rollable display device 200-2 according to an embodiment may be provided with a deformation detecting unit for detecting deformation of the display unit 250. The deformation detecting unit may be included in the sensing unit 210 (see FIG. 1A).

The deformation detecting unit may be provided to the display unit 250 or the intermediate case 220 so as to detect information on deformation of the display unit 250. Here, the information on deformation may include a deformation direction, a deformation degree, a deformation portion, or a deformation time of the display unit 250 or an acceleration of recovery of the display unit 250 deformed, or may additionally include various information detectable due to warpage of the display unit 250.

Furthermore, the control unit 290 may change information displayed on the display unit 250 or may generate a control signal for controlling a function of the rollable display device 200-2, on the basis of the information on deformation of the display unit 250 detected by the deformation detecting unit.

In an embodiment, the first operation state of the rollable display device 200-2 represents an inactive state in which a minimum display region is exposed to the outside so that basic information alone is displayed. The second operation state of the rollable display device 200-2 represents an active state in which the display unit 250 is extended. Extending of the display unit 250 may indicate that a screen displayed by the display unit 250 is extended. This extending includes gradational extending. A display region of the rollable display device 200-2, which is extended or reduced by rolling the display unit 250, may be implemented at one time at the moment of the extending or reducing, or the display region may be gradually extended or reduced. Therefore, hereinafter all states excepting the first operation state may be regarded as the second operation state, and the second operation state may be classified into a plurality of stages according to a degree of extension.

As illustrated in FIG. 3B, only regions such as a message window 225, an icon 226, or a time display part 227 may be displayed to minimize an exposed region of the display unit 250 in the first operation state. However, in the second operation state, the exposed region of the display unit 250 may be maximized to display information on a larger screen as illustrated in FIG. 3C. It is assumed that FIG. 3C illustrates a state in which the display unit 250 is maximally extended in some cases.

The control unit 290 (see FIG. 1A) may detect an unwound length of the display unit 250, and may turn on/off a part of the display unit 250 on the basis of the unwound length. For example, the control unit 290 may obtain a length of the display unit 250 unwound out of an opened region of the intermediate case 220. The control unit 290 may turn off the display unit 250 disposed inside the intermediate case 220, and may turn on the display unit 250 unwound out of the opened region of the intermediate case 220. Turning on a part of the display unit 250 may represent that power is applied so that the part of the display unit 250 displays information, and turning off a part of the display unit 250 may represent that power is not applied so that the part of the display unit 250 does not display information. Accordingly, since a part of the display unit 250 which is not unwound out of the intermediate case 220 is turned off, unnecessary power consumption and heating may be prevented.

Furthermore, when the display unit 250 is separated from an outer circumferential surface of an inner case 238, the control unit 290 may turn on a separated part of the display unit 250 and may turn off a non-separated part of the display unit 250. The control unit 290 may detect that the display unit 250 is separated from the outer circumferential surface of the inner case 238 using a length sensing unit 211 disposed in an inner circumferential surface of the inner case 238, so as to turn on the separated part of the display unit 250 and turn off the non-separated part of the display unit 250.

Referring to FIG. 3D, a shaft 281, the inner case 238, the length sensing unit 211, a rotation amount sensing unit 213, a plurality of circuit boards 280, a flexible circuit board 283, and a support frame 262 may be arranged in the intermediate case 220.

The shaft 281 may be rotated as the inner case 238 rotates.

The inner case 238 may be shaped like a roller, may be rollable, and may serve to wind or unwind the display unit 250. The inner case 238 is axially connected to the intermediate case 220 so as to be rotatable.

The length sensing unit 211 may sense a wound length or an unwound length of the display unit 250. The length sensing unit 211 may include a magnetic member. The length sensing unit 211 may include at least one hall sensor. The length sensing unit 211 will be described later in more detail.

The rotation amount sensing unit 213 may sense the number of turns of the display unit 250 wound on the inner case 238. That is, the rotation amount sensing unit 213 may sense the number of turns of the display unit 250 wound on the inner case 238 as the display unit 250 is rolled. The rotation amount sensing unit 213 may include a magnetic member. The rotation amount sensing unit 213 may include at least one hall sensor. The rotation amount sensing unit 213 will be described later in more detail.

A plurality of electronic circuit components for operating the rollable display device 200-2 may be mounted on each circuit board 280.

The flexible circuit board 283 may connect electronic circuit components mounted on the inner case 238 to the display unit 250. The electronic circuit component may include at least one of the sensing unit 210, the storage unit 270, or the control unit 290 illustrated in FIG. 1A.

The support frame 262 may support the circuit board 280, and may be disposed in the inner case 238.

The inner case 238 may be rotated by magnetism between the length sensing unit 211 and rolling sensing units 234 spaced apart from each other under the display unit 250. The rolling sensing unit 234 may include a magnetic member, and may include at least one hall sensor. The display unit 250 may be rotated together with the inner case 238 while being rolled on the inner case 238 by the magnetism. In detail, the display unit 250 may be rolled by attraction between the rolling sensing unit 234 and the length sensing unit 211. For example, in the case where the length sensing unit 211 includes an N-pole magnetic member and the rolling sensing unit 234 includes an S-pole magnetic member, they attract each other. A position of the length sensing unit 211 may be fixed. The rolling sensing unit 234 is attracted towards the length sensing unit 211 while moving linearly, and the rolling sensing units 234 spaced apart from each other are continually introduced into the intermediate case 220. Since the rolling sensing unit 234 that has been already introduced and the length sensing unit 211 continuously attract each other, the rolling sensing unit 234 newly introduced and the length sensing unit 211 maintain a balance in terms of attraction so that the rolling sensing units 234 are rotated around the length sensing units 211. By virtue of this mechanism, the display unit 250 is wound while being rolled.

A sheet 222 provided with the rolling sensing unit 234 may be disposed on a lower surface of the display unit 250. The sheet 222 may be included in the display unit 250, or may be present independently from the display unit 250. The sheet 222 may be flexible. For example, the sheet 222 may be silicone or Thermoplastic Poly Urethane (TPU). The sheet 222 may be bonded to the lower surface of the display unit 250 in the form of a sheet frame, may sequentially fix the rolling sensing units 234, and may be formed through bonding, tape or insert molding. Furthermore, the sheet 222 may be formed of a material that is flexible, has excellent elasticity and elongation, and enables maintenance of a small thickness of the sheet 222. This is intended to allow the rolling sensing units 234 to have the same magnetic pole so that the display unit 250 is spread flat by repulsion. That is, the rolling sensing units 234 having the same magnetic pole repel each other by a repulsive force so that the display unit 250 is spread flat.

The length sensing unit 211 may sense magnetism between the rolling sensing unit 234 and the length sensing unit 211 to calculate the wound length or the unwound length of the display unit 250. The rotation amount sensing unit 213 may sense the number of turns of the display unit 250 wound on the outer circumferential surface of the inner case 238. This will be described later in more detail with reference to FIGS. 3E and 3F.

Referring to FIG. 3E, the length sensing unit 211 may include four hall sensors H1 to H4. The four hall sensors are arranged on the inner circumferential surface of the inner case 238 or an inner space thereof along a circumferential direction of the inner case 238, while being spaced apart from each other by a fixed distance. Here, first to fourth hall sensors H1 to H4 sense movement of the rolling sensing unit 234 by sensing a change of magnetism in the circumferential direction of the inner case 238.

The arrows of FIGS. 3E and 3F represent a rotation direction of the inner case 238. The first hall sensor H1 alone senses the rolling sensing unit 234 in the second operation state in which the display unit 250 is maximally exposed as the inner case 238 is rotated. Thereafter, when the inner case 238 is rotated counterclockwise, the display unit 250 is wound on the inner case 238, and the second to fourth hall sensors H2 to H4 sequentially sense the rolling sensing unit 234. As described above, the first to fourth hall sensors H1 to H4 provide information for measuring a length of the display unit 250 wound along the outer circumferential surface of the inner case 238. The control unit 290 may detect a sensor that lastly senses the rolling sensing unit 234 when the display unit 250 is wound or unwound. Accordingly, the control unit 290 may calculate the wound length or the unwound length of the display unit 250. This is the same for the case where the display unit 250 is wound on the inner case 238 by multiple turns.

In the case where the display unit 250 is wound on the outer circumferential surface 238 in two or more layers, magnetism is changed in a radial direction of the inner case 238. Therefore, if a hall sensor for sensing the change is provided, the wound length of the display unit 250 may be measured more accurately.

For example, as illustrated in FIG. 3F, if two or more hall sensors are spaced apart from each other by a fixed distance in a radial direction of the inner case 238, a magnetism change of the rolling sensing unit 234 stacked in two or more layers on the outer circumferential surface of the inner case 238 may be sensed, so that the wound length of the display unit 250 may be calculated more accurately. Although FIG. 3F illustrates three hall sensors, i.e., fifth to seventh hall sensors H5 to H7, this is merely an example. That is, the fifth to seventh hall sensors H5 to H7 sense a magnetism change in a radial direction of the inner case 238 due to the rolling sensing unit 234.

In more detail, in the second operation state (i.e., the state illustrated in FIG. 3D), the control unit 290 may calculate the wound length of the display unit 250 using the first to fourth hall sensors H1 to H4 while the display unit 250 is wound in one layer on the inner case 238. In the case where the display unit 250 is wound in two layers on the inner case 238, the fifth to seventh hall sensors H5 to H7 sense a change of magnetism in a radial direction. The control unit 290 may obtain the number of turns of the display unit 250 wound, using the magnetism change sensed by the fifth to seventh hall sensors H5 to H7. A length of the display unit 250 wound thereafter may be calculated using the first to fourth hall sensors H1 to H4, and, when the display unit 250 is stacked in three layers in a radial direction in which the fifth to seventh hall sensors H5 to H7 are arranged, the magnetism change is sensed by the fifth to seventh hall sensors H5 to H7. As described above, the control unit 290 may calculate the length of the display unit 250 wound on the outer circumferential surface of the inner case 238 using the first to fourth hall sensors H1 to H4, and may calculate the number of turns of the display unit 250 wound on the outer circumferential surface of the inner case 283 using the fifth to seventh hall sensors H5 to H7.

According to another embodiment, the rollable display device 200-2 may be additionally provided with the upper case 240, the intermediate case 220, and the lower case 260 at another end portion of the display unit 250. The elements described above with reference to FIG. 3D may be included in the intermediate case 220. Therefore, a user may grip the rollable display device 200-2 with both hands to extend or reduce the display unit 250.

The flexible display device 200 may include all configurations of a mobile terminal 100 described below with reference to FIG. 4.

A mobile terminal included in the flexible display device 200 will be described with reference to FIG. 4.

The mobile terminal described herein may include a cell phone, a smartphone, a laptop computer, a terminal for a digital broadcast, a personal digital assistant (PDA), a portable multimedia player (PMP), a navigator, a slate PC, a tablet PC, an ultrabook, a wearable device (e.g., a smartwatch, smart glasses, or a head mounted display (HMD)), or the like.

However, those skilled in the art would understand that configurations according to the embodiments described herein may also be applied to not only mobile devices but also non-mobile devices such as digital TVs, desktop computers or digital signage.

Figure 4:
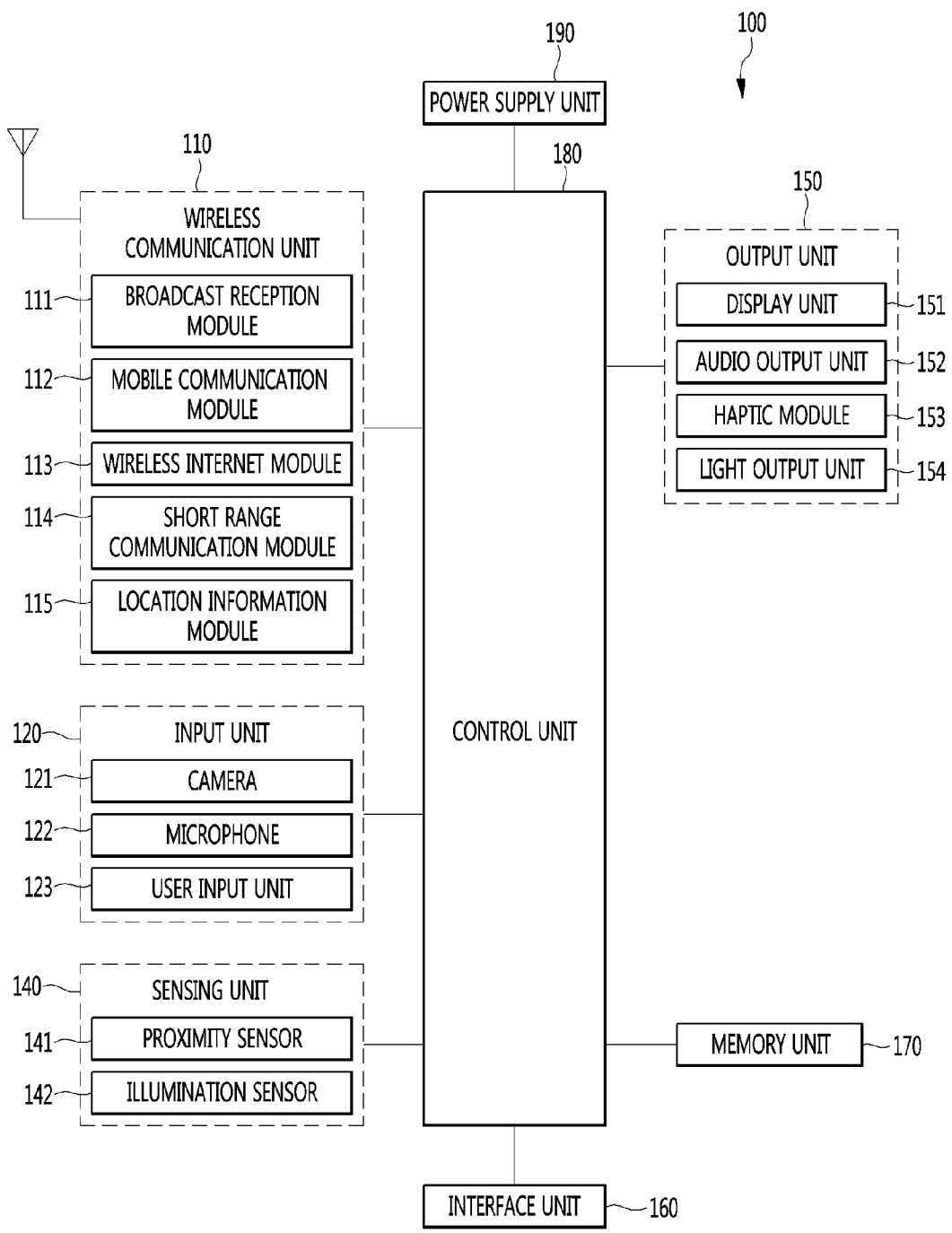
FIG. 4 is a block diagram for describing a mobile terminal in relation to an embodiment.

FIG. 4 is a block diagram for describing a mobile terminal in relation to an embodiment.

The flexible display device 200 may include elements of a mobile terminal 100. In particular, the sensing unit 210 of the flexible display device 200 may perform a function of a sensing unit 140 of the mobile terminal 100, the display unit 250 may perform a function of a display unit 151 of the mobile terminal 100, and the storage unit 270 may perform a function of a memory 170 of the mobile terminal 100.

The mobile terminal 100 may include a wireless communication unit 110, an input unit 120, a sensing unit 140, an output unit 150, an interface unit 160, a memory unit 170, a control unit 180, and a power supply unit 190. Since the elements illustrated in FIG. 4 are not essential for realizing a mobile terminal, a mobile terminal to be described herein may include more or fewer elements than the above-described.

In detail, the wireless communication unit 110 among the elements may include one or more modules enabling wireless communication between the mobile terminal 100 and another mobile terminal 100, or between the mobile terminal 100 and an external server. In addition, the wireless communication 110 may include one or more modules connecting the mobile terminal 100 to one or more networks.

The wireless communication unit 110 may include at least one of a broadcast reception module 111, a mobile communication module 112, a wireless internet module 113, a short range communication module 114, and a location information module 115.

The input unit 130 may include a camera 121 or an image input unit for an image signal input, a microphone 122 or an audio input unit for an audio signal input, a user input unit 123 (e.g., a touch key, a mechanical key, etc.) for receiving information from a user. Voice data or image data collected by the input unit 120 may be analyzed and processed with user's control commands.

The sensing unit 140 may include at least one sensor for sensing at least one of surrounding environment information around the mobile terminal and user information. For example, the sensing unit 140 may include at least one selected from a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., the camera (see 121)), a microphone (see 122), a battery gauge, an environmental sensor (e.g., a barometer, a hygrometer, a thermometer, a radiation sensor, a thermal sensor, a gas detection sensor, etc.), a chemical sensor (e.g., an e-nose, a healthcare sensor, a biometric sensor, etc.). Furthermore, the mobile terminal disclosed herein may combine and use information sensed by at least two sensors among those sensors.

The output unit 150 is for generating an output related to sense of sight, sense of hearing, or sense of touch, and may include at least one selected from a display unit 151, an audio output unit 152, a haptic module 153, and a light output unit 154. The display unit 151 may form a mutually layered structure with or be formed into one with a touch sensor, and realize a touch screen. Such a touch screen may not only function as the user input unit 123 providing an input interface between the mobile terminal 100 and the user, but also provide an output interface between the mobile terminal 100 and the user.

The interface unit 160 plays a role of a passage with various kinds of external devices connected to the mobile terminal 100. This interface unit 160 may include at least one selected from a wired/wireless headset port, an external charger port, a wired/wireless data port, a memory card port, a port connecting a device having an identification module prepared therein, an audio input/output (I/O) port, a video input/output (I/O) port, and an earphone port. In the mobile terminal 100, a proper control may be performed on a connected external device in correspondence to connection between the external device and the interface unit 160.

In addition, the memory 170 stores data for supporting various functions of the mobile terminal 100. The memory 170 may store a plurality of application programs or applications driven in the mobile terminal 100, data for operations of the mobile terminal 100, and instructions. At least a part of these application programs may exist in the mobile terminal 100 at the time of release for basic functions (e.g., a call originating or receiving function, a message transmitting and receiving function). Moreover, the application programs are stored in the memory 170 and installed in the mobile terminal 100, and then may be driven to perform operations (or functions) of the mobile terminal by the control unit 180.

The control unit 180 typically controls overall operations of the mobile terminal 100 besides operations related to the application programs. The control unit 180 may provide the user with, or process proper information or functions by processing a signal, data, or information input or output through the above-described elements, or driving the application programs stored in the memory 170.

In addition, the control unit 180 may control at least a part of the elements illustrated in FIG. 4 so as to drive the application programs stored in the memory 170. Furthermore, the control unit 180 may combine at least two elements among the elements included in the mobile terminal 100 and operate the combined.

The power supply unit 190 receives internal or external power under a control of the control unit 180 and supplies the power to each element included in the mobile terminal 100. The power supply unit 190 includes a battery and the battery may be an embedded type battery or a replaceable battery.

At least a part of the elements may operate in cooperation with each other for realizing an operation, control, or control method of the mobile terminal according to various embodiments. In addition, the operation, control, or control method of the mobile terminal may be realized in the mobile terminal by driving at least one application program stored in the memory 170.

Hereinafter, the above-described elements are described in detail with reference to FIG. 4 before describing various embodiments realized through the mobile terminal 100.

Firstly, in the wireless communication unit 110, the broadcast reception module 111 receives a broadcast signal and/or broadcast related information from an external broadcast management server through a broadcast channel. The broadcast channel may include a satellite channel or a terrestrial channel. Two or more broadcast reception modules may be provided to the mobile terminal 100 for simultaneous broadcast reception or broadcast channel switching for at least two broadcast channels.

The mobile communication module 112 may transmit and receive wireless signals to and from at least one selected from a base station, an external terminal, and a server on a mobile communication network constructed according to technical standards or communication schemes for the mobile communication (e.g., Global System for Mobile communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A) etc.).

The wireless signal may include a voice call signal, a video call signal, or various types of data according to transmission and reception of a text/multimedia message.

The wireless internet module 113 refers to a module for a wireless internet connection, and may be embedded in or prepared outside the mobile terminal 100. The wireless internet module 113 is configured to transmit and receive a wireless signal over a communication network conforming with wireless internet technologies.

The wireless internet technologies include, for example, Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and LTE-Advanced (LTE-A), and the wireless internet module 113 transmits and receives data according to at least one wireless internet technology within the range of including internet technology not described in the above.

From a viewpoint that an access to the wireless internet through WiBro, HSDPA, HSUPA, GSM, CDMA, WCDMA, LTE, or LTE-A is conducted through a mobile communication network, the wireless internet module 113 conducting the access to the wireless internet through the mobile communication network may be understood as a kind of the mobile communication module 112.

The short range communication module 114 is for short range communication and may support the short range communication by using at least one selected from Bluetooth™, Radio Frequency Identification (RFID), Infrared Data Association (IrDA), Ultra Wideband UWB), ZigBee, Near Field Communication (NFC), Wi-Fi, Wi-Fi Direct, and Wireless Universal Serial Bus (Wireless USB) technologies. This short range communication module 114 may support, through a wireless area network, wireless communication between the mobile communication terminal 100 and a wireless communication system, between the mobile terminal 100 and another mobile terminal 100, or between the mobile terminal 100 and a network on which the other mobile terminal 100 or an external server is located. The wireless area network may be a wireless personal area network.

Here, the other mobile terminal 100 may be a wearable device (e.g., a smart watch, a smart glass, or an HMD) through which data is mutually exchangeable (or interworkable) with the mobile terminal 100 according to an embodiment. The short range communication module 114 may detect (or recognize) a wearable device capable of communicating with the mobile terminal 100. Furthermore, when the detected wearable device is authenticated to communicate with the mobile terminal 100, the control unit 180 may transmit at least a part of data processed in the mobile terminal 100 to the wearable device through the short range communication module 114. Therefore, a user of the wearable device may use the data processed by the mobile terminal 100 through the wearable device. For example, when a call is received by the mobile terminal 100, the user may perform a phone call through the wearable device, or when a message is received by the mobile terminal 100, the user may check the received message through the wearable device.

The location information module 115 is for obtaining a location (or a current location) of the mobile terminal. As a representative example thereof, there is a global positioning system (GPS) module or a Wi-Fi module. For example, when adopting the GPS module, the mobile terminal may obtain a location of the mobile terminal by using a signal transmitted from a GPS satellite. For another example, when adopting the Wi-Fi module, the mobile terminal may obtain the location of the mobile terminal on the basis of information on a wireless access point (AP) transmitting or receiving a wireless signal with the Wi-Fi module. If necessary, the location information module 115 may additionally or alternatively perform any one function among other modules in the wireless communication unit 110 in order to obtain data about the location of the mobile terminal. The location information module 115 is a module used for obtaining the location (or current location) of the mobile terminal, and is not limited to a module directly calculating or obtaining the location of the mobile terminal.

Next, the input unit 120 is for receiving image information (or an image signal), audio information (or an audio signal), data, or information input from the user. The mobile terminal 100 may include one or a plurality of cameras 121 for an input of image information. The camera 121 processes an image frame such as a still image or video obtained by an image sensor in a video call mode or an image capturing mode. The processed image frame may be displayed on the display unit 151 or stored in the memory 170. Furthermore, the plurality of cameras 121 prepared in the mobile terminal 100 may be arranged to form a matrix structure, and, through the cameras 121 forming this matrix structure, a plurality of pieces of information on images having different angles or different focuses may be input to the mobile terminal 100. In addition, the plurality of cameras 121 may be arranged in a stereo structure to obtain left and right images for realizing a stereoscopic image.

The microphone 122 may process an external sound signal as electrical voice data. The processed voice data may be variously used according to a function (or an application program) being performed in the mobile terminal 100.

Furthermore, various noise removal algorithms may be implemented for removing noise generated in a process for receiving the external sound signal.

The user input unit 123 is for receiving information from the user. When information is input through the user input unit 123, the control unit 180 may control an operation of the mobile terminal 100 in correspondence to the input information. This user input unit 123 may include a mechanical input unit (or mechanical key, for example, buttons positioned on the front and rear surfaces or on the side surfaces, a dome switch, a jog wheel, or a jog switch, etc.) and a touch type input unit. As an example, the touch type input unit may be configured with a virtual key displayed on a touch screen through a software processing, a soft key, or a visual key, or a touch key disposed on a portion other than the touch screen. In addition, the virtual key or the visual key is possibly displayed on the touch screen in various types and, for example, may be configured with graphics, texts, icons, videos, or a combination thereof.

Furthermore, the sensing unit 140 may sense at least one of environmental information surrounding the mobile terminal 100 and user information, and generate a sensing signal corresponding to the sensed information. The control unit 180 may control driving or operations of the mobile terminal 100, or perform data processing, a function, or an operation related to an application program installed in the mobile terminal 100, on the basis of the sensing signal. Hereinafter, representative sensors among various sensors that may be included in the sensing unit 140 are described in detail.

Firstly, the proximity sensor 141 refers to a sensor detecting presence of an object accessing or around a predetermined detecting surface by using an electromagnetic force or an infrared ray without a mechanical contact. This proximity sensor 141 may be disposed in an internal area of the mobile terminal surrounded by the above-described touch screen or around the touch screen.

As an example of the proximity sensor 141, there is a transmissive optoelectronic sensor, a diffuse optoelectronic sensor, a high frequency oscillating proximity sensor, a capacitive proximity sensor, an inductive proximity sensor, or an infrared proximity sensor. When the touch screen is capacitive type, the proximity sensor 141 may be configured to detect an access of an object having conductivity by a change of an electric field according to the access of the object. In this case, the touch screen (or a touch sensor) itself may be classified into a proximity sensor.

Moreover, for convenience of explanation, a behavior that an object is in proximity to the touch screen without contacting the touch screen and is allowed to be recognized as if the object is on the touch screen is referred to as a "proximity touch". A behavior that an object actually contacts the touch screen is referred to as a "contact touch". A position at which an object is subject to a proximity touch over the touch screen means a position at which the object vertically corresponds to the touch screen when the object is subject to the proximity touch. The proximity sensor 141 may detect a proximity touch and a proximity touch pattern (e.g., a proximity touch distance, a proximity touch direction, a proximity touch speed, a proximity touch time, a proximity touch position, a proximity touch shift state, etc.). Furthermore, the control unit 180 may process data (or information) corresponding to a proximity touch action and the proximity touch pattern detected through the proximity sensor 141 and, in addition, may output visual information corresponding to the processed data on the touch screen. In addition, the control unit 180 may control the mobile terminal 100 so that different operations or different data (or information) are processed according to whether a touch for an identical point on the touch screen is a proximity touch or a contact touch.

The touch sensor senses a touch (or a touch input) applied to the touch screen (or the display unit 151) by using at least one of various touch schemes including a resistive-film scheme, a capacitive scheme, an infrared ray scheme, an ultrasonic scheme, and a magnetic field scheme.

As an example, the touch sensor may be configured to convert a change in pressure applied to a specific part or a change in capacitance generated at a specific part of the touch screen into an electrical input signal. The touch sensor may be configured to detect a position or an area thereon which is touched by a touch object touching the touch screen, or pressure or capacitance at the time of the touch. Here, the touch object may be an object applying a touch on the touch sensor, for example, a finger, a touch pen, a stylus pen, or a pointer.

In this way, when there is a touch input on the touch sensor, a signal (signals) corresponding thereto is (are) transmitted to a touch controller. The touch controller processes the signal(s) and transmits corresponding data to the control unit 180. Accordingly, the control unit 180 may know which area of the display unit 151 is touched. Here, the touch controller may be a separate element other than the control unit 180, or be the control unit itself.

Furthermore, the control unit 180 may perform different controls or an identical control according to a kind of the touch object, which touches the touch screen (or a touch key prepared other than the touch screen). Whether to perform different controls or an identical control according to a kind of the touch object may be determined according to a current operation state of the mobile terminal 100 or an application program being executed.

The above-described touch sensor and proximity sensor may sense independently or in a combined manner various types of touches on the touch screen, wherein the touches include a short (or a tap) touch, a long touch, a multi-touch, a drag touch, a flick touch, a pinch-in touch, a pinch-out, a swipe touch, and a hovering touch.

The ultrasonic sensor may recognize position information on a touch object by using an ultrasonic wave. The control unit 180 is able to calculate a position of a wave generating source through information sensed by an optical sensor and a plurality of ultrasonic sensors. The position of the wave generating source may be calculated by using a property that a light is very faster than the ultrasonic wave, in other words, a time that a light arrives at an optical sensor is very shorter than a time that an ultrasound wave arrives at an ultrasonic sensor. In detail, the position of the wave generating source may be calculated by using a time difference from a time when an ultrasonic wave arrives with a light considered as a reference signal.

Furthermore, from a view of a configuration of the input unit 120, the camera 121 includes at least one selected from a camera sensor (e.g., a CCD, or a CMOS sensor), a photo sensor (or an image sensor), and a laser sensor.

The camera 121 and the laser sensor may be combined together and sense a touch of the sensing target for a 3-dimensional stereoscopic image. The photo sensor may be stacked on a display element, and this photo sensor scans a movement of the sensing target close to the touch screen. In detail, the photo sensor includes photo diodes and transistors in rows/columns and scans a target mounted on the photo sensor by using an electrical signal changed according to an amount of a light applied to the photo diodes. In other words, the photo sensor performs coordinate calculation on the sensing target according to a change amount of the light and, through this, position information on the sensing target may be obtained.

The display unit 151 displays (outputs) information processed by the mobile terminal 100. For example, the display unit 151 may display execution screen information on the application program driven in the mobile terminal 100 or user interface (UI) information or graphic user interface (GUI) information according to the execution screen information.

In addition, the display unit 151 may be configured as a stereoscopic display unit displaying a stereoscopic image.

A 3-dimensional display scheme such as a stereoscopic scheme (glasses type), an autostereoscopic scheme (glassless type), or a projection scheme (a holographic scheme) may be applied to the stereoscopic display unit.

The sound output unit 152 may output audio data received from the wireless communication unit 110 or stored in the memory 170 in a call signal reception mode, a call mode or a recording mode, a speech recognition mode, or in a broadcast reception mode. The sound output unit 152 may output a sound signal related to a function (e.g., a call signal reception sound, or a message reception sound, etc.) performed in the mobile terminal 100. This sound output unit 152 may include a receiver, a speaker, or a buzzer, etc.

The haptic module 153 may generate various tactile effects that the user may feel. A representative example of the tactile effect that is generated by the haptic module 153 may be vibration. Strength and a pattern of the vibration generated by the haptic module 153 may be controlled by user selection or setting by the control unit. For example, the haptic module 153 may output different vibrations sequentially or by synthesizing them.

Besides the vibration, the haptic module 153 may generate various tactile effects including an effect by a stimulus such as a pin array moving vertically to a contact skin surface, a air discharge force or air absorptive power through an outlet or an inlet, brush against a skin surface, contact to an electrode, or static electricity, and an effect by reproducing a cold and warmth sense by using a device that heat absorption or heating is enabled.

The haptic module 153 may be implemented to transfer the tactile effect through a direct contact, and may also be implemented for the user to feel the tactile effect through a muscle sense of a finger or an arm. The haptic module 153 may be prepared two or more in number according to a configuration aspect of the mobile terminal 100.

The optical output unit 154 may output a signal for notifying an event occurrence by using a light from an optical source of the mobile terminal 100. The event occurred in the mobile terminal 100 may be exemplified with message reception, call signal reception, missed calls, alarm, schedule notification, email reception, or information reception through an application.

The signal output by the optical output unit 154 is implemented according to that the mobile terminal emits a monochromatic light or a multi-chromatic light towards the front or rear surface. The signal output may be completed when the mobile terminal detects that the user checks the event.

The interface unit 160 may play a role of a passage with all external devices connected to the mobile terminal 100. The interface unit 160 may receive data from the external device, receive power and transfer the power to each element inside the mobile terminal 100, or allow internal data of the mobile terminal 100 to be transmitted to the external device. For example, the interface 160 may include a wired/wireless headset port, an external charger port, a wired/wireless data port, a memory card port, a port connecting a device that an identification module is prepared, an audio input/output (I/O) port, a video input/output (I/O) port, or an earphone port, etc.

Furthermore, the identification module is a chip storing various pieces of information for authenticating user's authority for the mobile terminal 100 and may include a user identify module (UIM), a subscriber identity module (SIM), or a universal subscriber identity module (USIM). A device including the identification module (hereinafter, an 'identification device') may be manufactured in a smart card type. Accordingly, the identification device may be connected to the mobile terminal 100 through the interface unit 160.

In addition, when the mobile terminal 100 is connected to an external cradle, the interface unit 160 may be a passage through which power is supplied from the cradle to the mobile terminal 100 or a passage through which various command signals input from the cradle by the user are delivered. The various command signals or the power input from the cradle may operate as signals for perceiving that the mobile terminal 100 is accurately mounted in the cradle.

The memory 170 may store a program for operations of the control unit 180 and temporarily store input/output data (e.g., a phone book, messages, still images, videos, etc.). The memory 170 may store data about vibrations of various patterns and sounds at the time of a touch input on the touch screen.

The memory 170 may include at least one storage medium type among a flash memory type, a hard disk type, a Solid State Disk (SSD) type, a Silicon Disk Drive (SDD) type, a multimedia card micro type, a card type memory (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc. The mobile terminal 100 may operate in relation to a web storage performing a storage function of the memory 170 over the internet.

Furthermore, as described above, the controller 180 normally controls overall operations and an operation related to an application program of the mobile terminal 100. For example, when a state of the mobile terminal satisfies a set condition, the control unit 180 executes or releases a lock state that limits an input of a user's control command to applications.

In addition, the control unit 180 may perform a control or a process related to a voice call, data communication, or a video call, etc., or may perform a pattern recognition processing for recognizing a written input and a drawing input performed on the touch screen as a character and an image, respectively. Furthermore, the control 180 may combine and control any one of or a plurality of the above-described elements in order to implement various embodiments to be described below in the mobile terminal 100.

The power supply unit 190 receives external or internal power under a control of the control unit 180 and supplies power necessary for operating each element. The power supply unit 190 includes a battery. The battery may be an embedded battery that is rechargeable and may be detachably coupled for charging.

The power supply unit 190 may include a connection port, and the connection port may be configured as an example of the interface 160 to which an external charger providing power is electrically connected for charging the battery.

As another example, the power supply unit 190 may be configured to charge the battery in a wireless manner without using the connection port. In this case, the power supply unit 190 may receive, from an external wireless power transmitting device, power by using one or more of an inductive coupling manner on the basis of a magnetic induction phenomenon and a magnetic resonance coupling manner on the basis of an electromagnetic resonance phenomenon.

Hereinafter, various embodiments may be implemented in a recording medium that is readable with a computer or a similar device by using software, hardware, or a combination thereof.

Next, description is made about a communication system realizable through the mobile terminal 100 according to an embodiment.

Firstly, the communication system may use different wireless interfaces and/or a physical layer. For example, the wireless interface available by the communication system may include Frequency Division Multiple Access (FDMA), Time Division Multiple Access (TDMA), Code Division Multiple Access (CDMA), Universal Mobile Telecommunications Systems (UMTS)(in particular, Long Term Evolution (LTE), or Long Term Evolution-Advanced (LTE-A)), Global System for Mobile Communications (GSM), or etc.

Hereinafter, for convenience of explanation, description is made limitedly to CDMA. However, it is obvious that the embodiments may be applied to all communication systems including an Orthogonal Frequency Division Multiplexing (OFDM) wireless communication system as well as a CDMA wireless communication system.

The CDMA wireless communication system may include at least one terminal 100, at least one base station (BS, also may be referred to as Node B or Evolved Node B), at least one BS controller (BSC) and a mobile switching center (MSC). The MSC may be configured to be connected to the Public Switched Telephone Network (PSTN) and BSCs. The BSCs may be connected to the BS in pair through a backhaul line. The backhaul line may be prepared according to at least one selected from E1/T1, ATM, IP, PPP, Frame Relay, HDSL, ADSL, and xDSL. Accordingly, the plurality of BSCs may be included in a CDMA wireless communication system.

Each of a plurality of BSs may include at least one sector, and each sector may include an omni-directional antenna or an antenna indicating a specific radial direction from the BS. In addition, each sector may include two or more antennas having various types. Each BS may be configured to support a plurality of frequency allocations and each of the plurality of allocated frequencies may have specific spectrum (e.g., 1.25 MHz, or 5 MHz).

An intersection between the sector and the frequency allocation may be called as a CDMA channel. The BS may be called as a base station transceiver subsystem (BTSs). In this case, one BSC and at least one BS are called together as a "base station". The base station may also represent a "cell site". In addition, each of a plurality of sectors for a specific BS may also be called as a plurality of cell sites.

A broadcasting transmitter (BT) transmits a broadcast signal to terminals 100 operated in a system. The broadcast reception module 111 illustrated in FIG. 4 is prepared in the terminal 100 for receiving the broadcast signal transmitted by the BT.

Furthermore, in the CDMA wireless communication system, a global positioning system (GPS) may be linked for checking a location of the mobile terminal 100. A satellite is helpful for grasping the location of the mobile terminal.

Useful location information may be obtained by less than two or at least two satellites. Here, the location of the mobile terminal 100 may be tracked by using all techniques, which are capable of tracking the location, as well as a GPS tracking technique. In addition, at least one of GPS satellites may be selectively or additionally responsible for transmitting satellite digital multimedia broadcasting (DMB).

The location information module 115 prepared in the mobile terminal 100 is for detecting, operating or identifying the location of the mobile terminal 100, and may representatively include a GPS module and a WiFi module. If necessary, the location information module 115 may alternatively or additionally perform any function of other modules in the wireless communication unit 110 for obtaining data for the location of the mobile terminal 100.

The GPS module 115 may precisely calculate 3D current location information according to latitude, longitude, and altitude by calculating distance information from three or more satellites and precise time information, and by applying a trigonometry to the calculated information. A method is currently widely used that calculates location and time information using three satellites, and corrects an error in the calculated location and time information using another satellite. The GPS module 115 may calculate speed information by continuously calculating a current location in real time. However, it is difficult to precisely measure the location of the mobile terminal 100 by using the GPS module in a dead zone, such as an indoor area, of the satellite signal. Accordingly, in order to compensate for location measurement in the GPS manner, a WiFi positioning system (WPS) may be used.

The WPS is a technique for tracking the location of the mobile terminal 100 using a WiFi module prepared in the mobile terminal 100 and a wireless access point (AP) transmitting or receiving a wireless signal to or from the WiFi module, and may mean a location measurement technique based on a wireless local area network (WLAN) using WiFi.

The WPS may include a WiFi positioning server, the mobile terminal 100, a wireless AP connected to the mobile terminal 100, and a database storing arbitrary wireless AP information.

The mobile terminal 100 connected to the wireless AP may transmit a location information request message to the WiFi positioning server.

The WiFi positioning server extracts information on the wireless AP connected to the mobile terminal 100 on the basis of the location information request message (or a signal) of the mobile terminal 100. The information on the wireless AP connected to the mobile terminal 100 may be transmitted to the WiFi positioning server through the mobile terminal 100 or transmitted to the WiFi positioning server from the wireless AP.

The information on the wireless AP, which is extracted on the basis of the location information request message of the mobile terminal 100, may be at least one selected from a MAC address, a Service Set Identification (SSID), a Received Signal Strength Indicator (RSSI), Reference Signal Received Power (RSRP), Reference Signal Received Quality (RSRQ), channel information, Privacy, a Network Type, Signal Strength, and Noise Strength.

As described above, the WiFi positioning server may receive information on the wireless AP connected to the mobile terminal 100, and extract wireless AP information corresponding to the wireless AP to which the mobile terminal is being connected from the pre-constructed database. At this point, information on arbitrary wireless APs, which is stored in the database, may be information on a MAC Address, an SSID, channel information, Privacy, a Network Type, latitudinal and longitudinal coordinates of a wireless AP, a building name and floor on which the wireless AP is located, indoor detailed location information (GPS coordinates available), an address of an owner of the wireless AP, a phone number, and etc. At this point, in order to remove a wireless AP provided by using a mobile AP or an illegal MAC address in the location measurement process, the WiFi positioning server may extract a predetermined number of pieces of wireless AP information in the descending order of an RSSI.

Thereafter, the WiFi positioning server may extract (or analyze) location information on the mobile terminal 100 by using at least one piece of wireless AP information extracted from the database. The location information of the mobile terminal 100 is extracted (or analyzed) by comparing the stored and the received wireless AP information.

As a method of extracting (or analyzing) location information on the mobile terminal 100, a cell-ID method, a fingerprint method, a trigonometry, and a landmark method may be used.

The cell-ID method is a method of determining a location of a wireless AP having strongest strength from among surrounding wireless AP information collected by a mobile terminal. This method is advantageous in that implementation is simple, an additional cost is not necessary, and location information may be rapidly obtained. However, when installation intensity of a wireless AP is lower, positioning precision becomes lowered.

The fingerprint method is a method of selecting a reference location in a service area, collecting signal strength information, and estimating a location through signal strength information transmitted from a mobile terminal on the basis of the collected information. In order to use the fingerprint method, it is necessary to construct a database for propagation characteristics in advance.

The trigonometry is a method of operating a location of a mobile terminal on the basis of a distance between coordinates of at least three wireless APs and the mobile terminal. For estimating the distances between the mobile terminal and the wireless APs, signal strength is converted into distance information, or a time of arrival (ToA) of a wireless signal, a time difference of arrival (TDoA) of a wireless signal, an angle of arrival (AoA) of a wireless signal may be used.

The landmark method is a method of measuring a location of a mobile terminal by using a landmark transmitter.

Besides the above-described methods, various algorithms may be used for extracting (or analyzing) location information on a mobile terminal.

The location information on the mobile terminal 100 extracted in this way may be transmitted to the mobile terminal 100 through the WiFi positioning server and the mobile terminal 100 may obtain the location information.

The mobile terminal 100 may obtain location information by being connected to at least one wireless AP. At this point, the number of wireless APs requested for obtaining the location information on the mobile terminal 100 may be variously varied according to a wireless communication environment in which the mobile terminal 100 is located.

Various embodiments of a method for operating the flexible display device 200 will be described. The embodiments may be applied to both the stretchable display device 200_1 described above with reference to FIGS. 2A and 2B and the rollable display device 200_2 described above with reference to FIGS. 3A to 3F.

Figure 5:
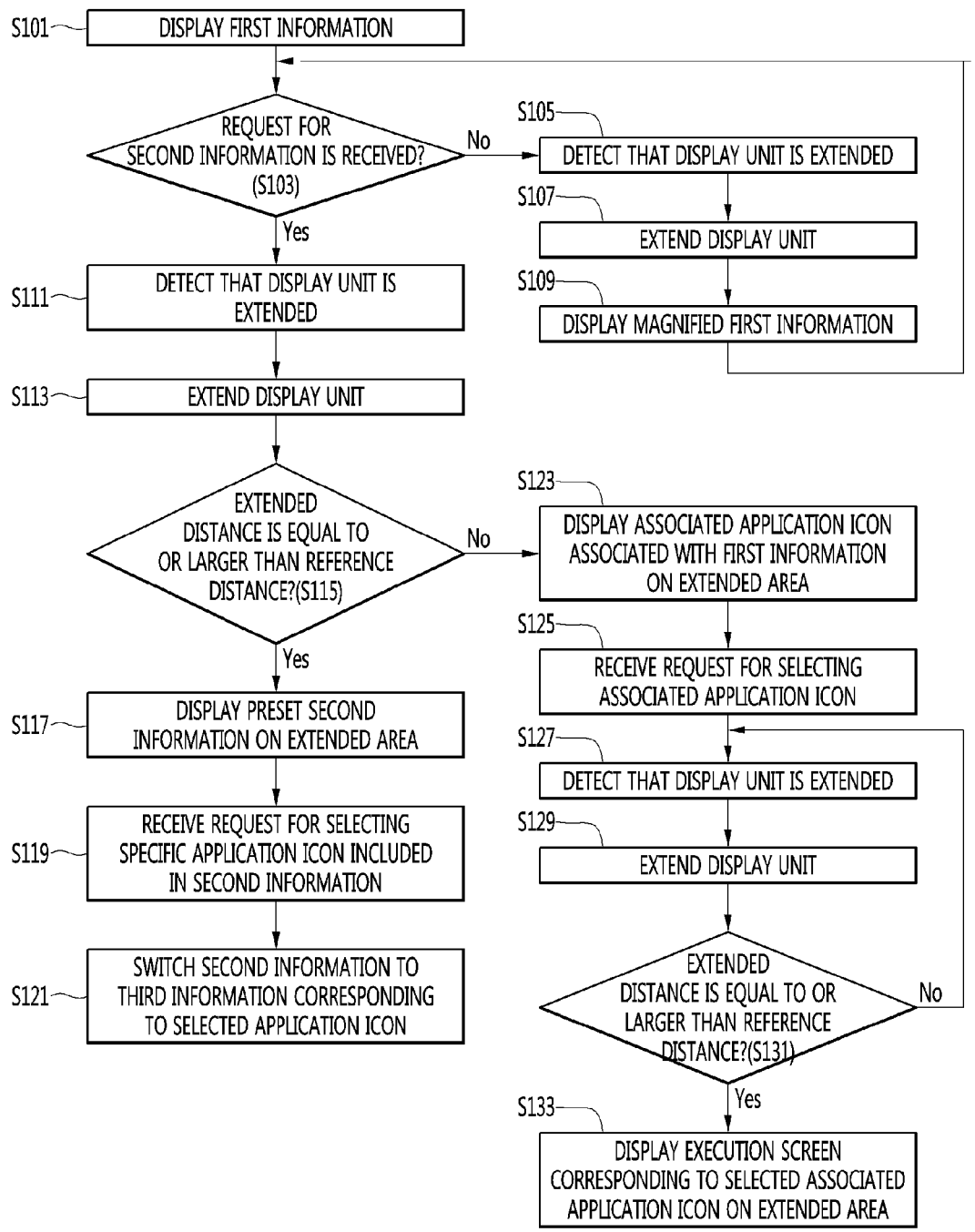
FIG. 5 is a flowchart illustrating a method for operating a flexible display device according to an embodiment.

FIG. 5 is a flowchart illustrating a method for operating a flexible display device according to another embodiment.

The control unit 290 of the flexible display device 200 displays first information via the display unit 250 (S101). That is, the control unit 290 may display the first information on the screen of the display unit 250. In one embodiment, the first information may be an execution window of a specific application installed in the flexible display device 200. In the case where the flexible display device 200 is the stretchable display device 200_1, the display unit 250 may be in a state of not being deformed. In the case where the flexible display device 200 is the rollable display device 200_2, the display unit 250 may be in a state of being extended by a certain distance. However, an embodiment of the present disclosure is not limited thereto, and, even in the case where the flexible display device 200 is the rollable display device 200_2, the display unit 250 may be in a state of not being stretched.

The control unit 290 checks whether a request for displaying second information is received (S103). In one embodiment, the second information may be preset information. The preset information may be a home screen. The home screen may be a menu screen displayed in response to an input of selecting a home button provided to the flexible display device 200.

In another embodiment, the second information may be information preset according to an input from a user.

In the case where the request for displaying the second information is not received, the control unit 290 detects that the display unit 250 is extended (S105), and accordingly extends the display unit 250 (S107). The control unit 290 may detect that the display unit 250 is extended in a specific direction, and may extend the display unit 250 according to a result of the detection. The principle of extension of the display unit 250 has been described with reference to FIGS. 3A to 3F. In one embodiment, the extension of the display unit 250 may indicate that the screen displayed by the display unit 250 is extended.

The control unit 290 displays the first information enlarged on the display unit 250 extended (S109). The control unit 290 may enlarge and display the first information while extending the display unit 250. This operation is described below with reference to the following figures.

The following description is provided with respect to the rollable display device 200_2, but may also be applied to the stretchable display device 200_1.

Furthermore, for the following description, the display unit 250 alone is illustrated among the elements of the rollable display device 200_2.

Figure 6A:
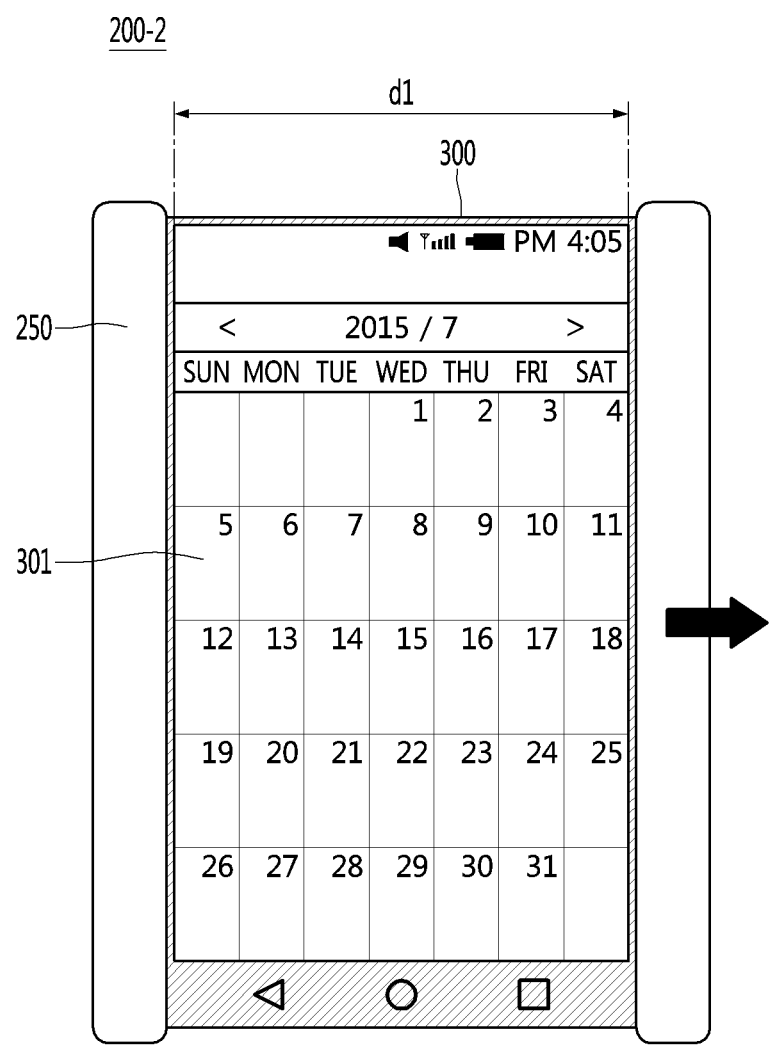
FIGS. 6A and 6B are diagrams illustrating that first information is enlarged and displayed as a display unit is extended according to an embodiment.
Figure 6B:
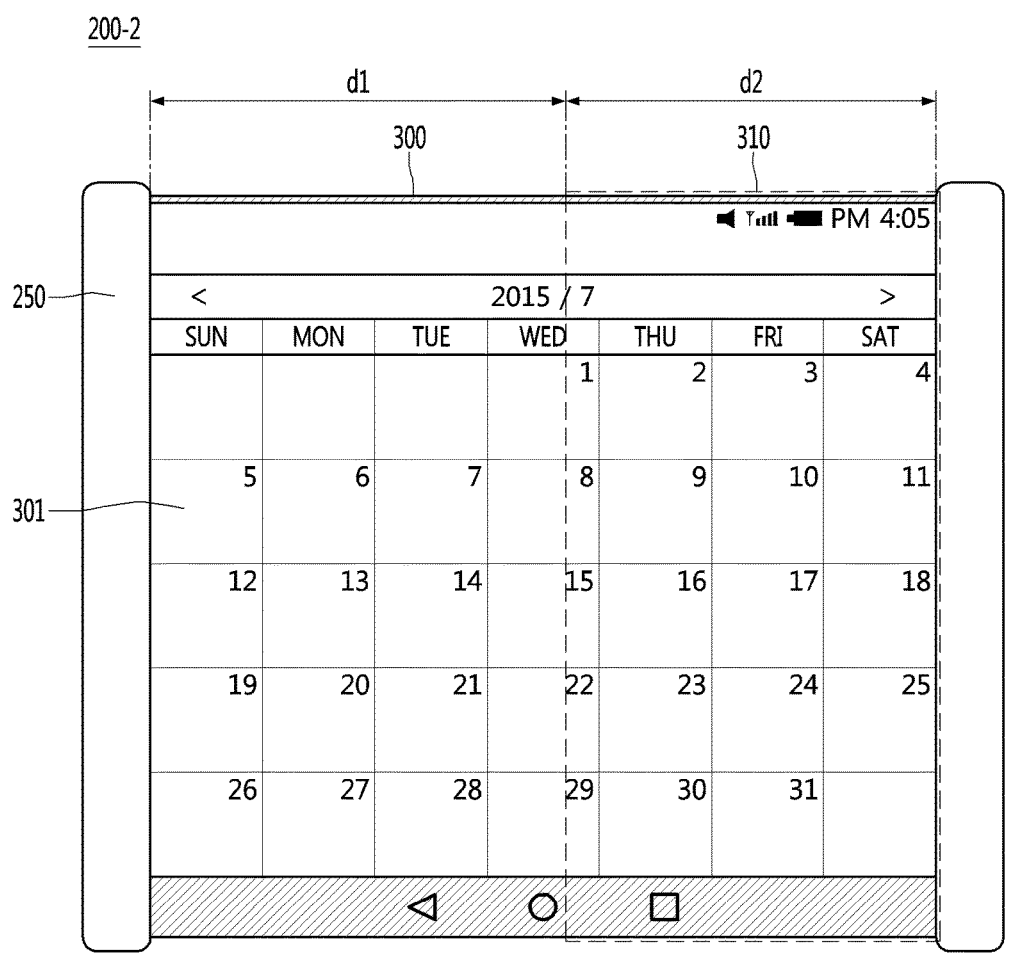

FIGS. 6A and 6B are diagrams illustrating that the first information is enlarged and displayed as the display unit is extended according to an embodiment.

Referring to FIG. 6A, the display unit 250 displays first information 301 on an area 300 of a screen. The screen of the display unit 250 may be in a state of being extended by as much as the area 300 corresponding to the specific distance d1. For another example, the screen of the display unit 250 may be in a state of not being deformed, i.e., stretched. The screen of the display unit 250 illustrated in FIG. 6A may be referred to as a default screen of the state of not being deformed. The first information 310 may be an execution window displayed as a scheduling application is run.

The control unit 290 may detect, via the sensing unit 210, that the display unit 250 is extended in the +x-axis direction. As illustrated in FIG. 6B, the control unit 290 may extend the display unit 250 by as much as an area 310 corresponding to a distance d2 according to a sensed force. As the display unit 250 is extended, the screen displayed by the display unit 250 may be increased by as much as the area 310 in comparison with the screen of the area 300. The control unit 290 may control the display unit 250 so that the first information 301 is enlarged in proportion to a size of the area 310. That is, the control unit 290 may enlarge and display the first information 301 while extending the display unit 250.

The method of FIG. 5 continues to be described below referring back to FIG. 5.

After the request for displaying the second information is received (S103), the control unit 290 detects that the display unit 250 is extended (S111), and extends the display unit 250. In one embodiment, the request for displaying the second information may request that the display unit 250 is extended in a first direction by a certain distance within a preset time and then is reduced in an opposite direction to the first direction. The preset time may be one second, but this is merely an example. A user's motion of rolling out one side of the display unit 250 of the rollable display device 200_2 and then rolling in the one side may correspond to the request for displaying the second information.

In another embodiment, the request for displaying the second information may request that the display unit 250 is reduced in the first direction by a certain distance and then is extended in the opposite direction to the first direction by a certain distance. A user's motion of rolling out one side of the display unit 250 and then rolling in the one side may correspond to the request for displaying the second information.

when the size of the screen is reduced by the area the predetermined distance in the second direction, the control unit 290 displays, on the first execution window, an indicator representing that the second information can be provided if the size of the screen is expanded by the area corresponding to the predetermined distance in the first direction.

The control unit 290 determines whether an extended distance corresponding to an extended area is equal to or larger than a reference distance (S115). In one embodiment, the reference distance may indicate a minimum distance required for displaying the second information on the extended area.

In one embodiment, the second information may be preset information. The second information may be a home screen.

In another embodiment, the second information may be an item associated with the first information.

In one embodiment, if the extended distance is equal to or larger than the reference distance, the control unit 290 may display the second information on the extended area while displaying the first information on the area 300, or, if the extended distance is less than the reference distance, the control unit 290 may display information associated with the first information on the extended area.

If the extended distance is equal to or larger than the reference distance, the control unit 290 displays the second information on the extended area (S117). In one embodiment, the second information may be a home screen, wherein the home screen may include a plurality of application icons corresponding to a plurality of applications.

In another embodiment, the second information may be a user menu item. The user menu item may include information on applications registered as favorites by a user or information on applications that have been recently executed by the display device 200. Operations S103 to S117 are described below with reference to the following figures.

FIGS. 7A to 7D illustrate an example in which the second information is displayed on the extended area of the display unit according to the request for displaying the second information.

Figure 7A:
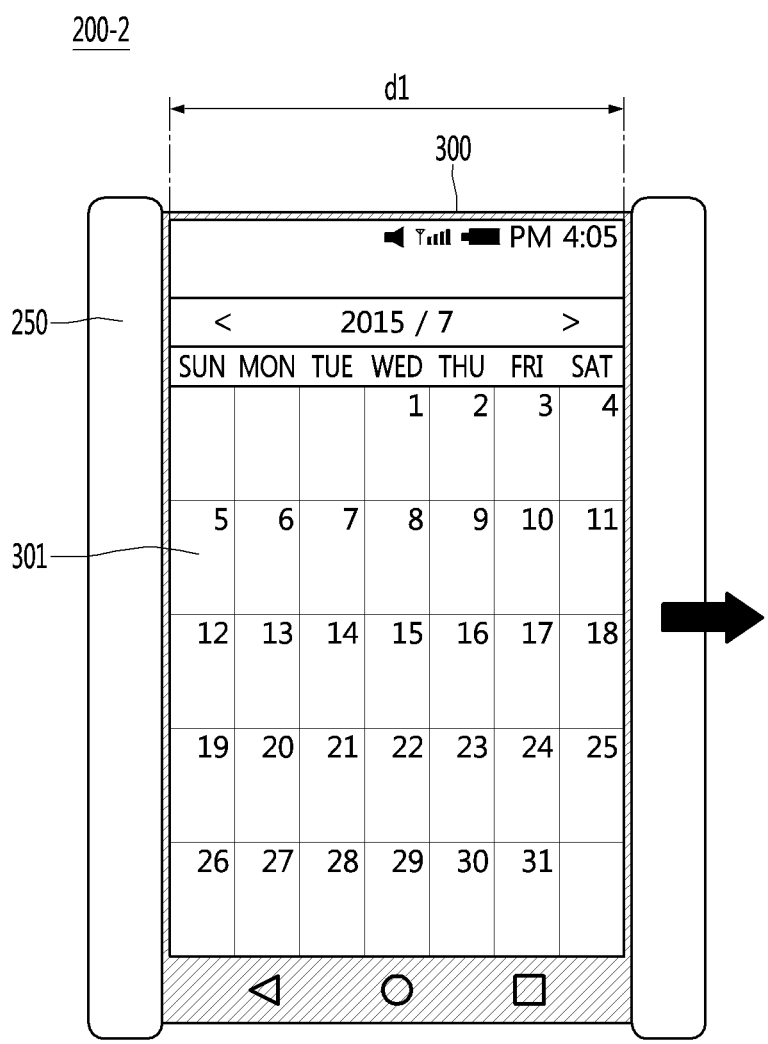
FIGS. 7A to 7D illustrate that second information is displayed on an extended area of the display unit according to a request for displaying the second information.

Referring to FIG. 7A, the display unit 250 of the rollable display device 200_2 displays the first information 301 on the area 300 of the screen. The first information 301 may be an execution window of a scheduling application. The screen of the display unit 250 may be in a state of being extended by as much as the area 300 corresponding to the specific distance d1. For another example, the display unit 250 may be in a state of not being deformed, i.e., stretched. It is assumed that the display unit 250 illustrated in FIG. 7A is in the state of not being deformed.

Figure 7B:
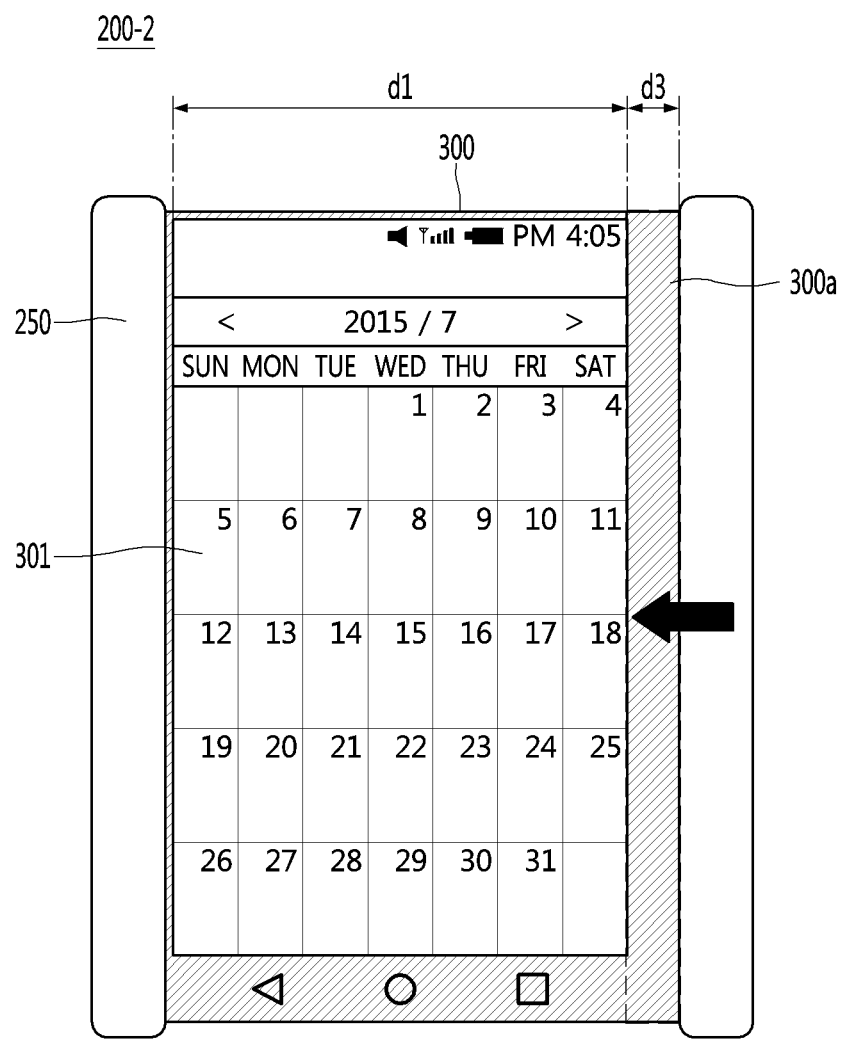

The control unit 290 may detect, via the sensing unit 210, that the display unit 250 is extended in the +x-axis direction, and may extend the screen of the display unit 250 by as much as an area 300a corresponding to a certain distance d3 according to a result of the detection as illustrated in FIG. 7B. The certain distance d3 may be less than a preset distance. The preset distance may be a reference distance for displaying no information on the area 300a corresponding to the certain distance d3.

Figure 7C:
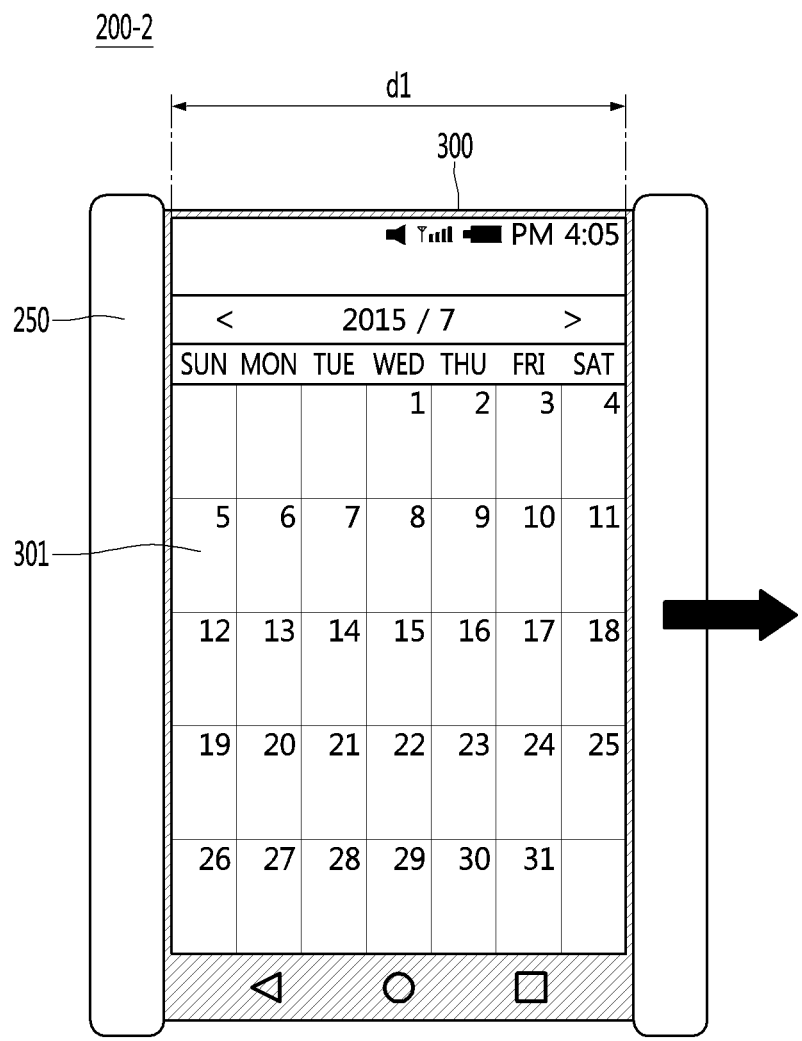

Thereafter, the control unit 290 may detect, via the sensing unit 210, that the display unit 250 is reduced in the −x-axis direction. Accordingly, as illustrated in FIG. 7C, the control unit 290 may allow the display unit 250 to return to its original state. In this state, if it is detected that the display unit 250 is extended in the +x-axis direction, the control unit 290 may determine that a request for displaying the second information on an area to be extended is received. That is, in the case where the display unit 250 is extended by a certain distance in the +x-axis direction, and then the display unit 250 is reduced by a certain distance in the −x-axis direction, and then it is detected that the display unit 250 is extended in the +x-axis direction within a preset time, the control unit 290 may determine that the request for displaying the second information on the area to be extended is received. The preset time may be one second, but this is merely an example.

Figure 7D:
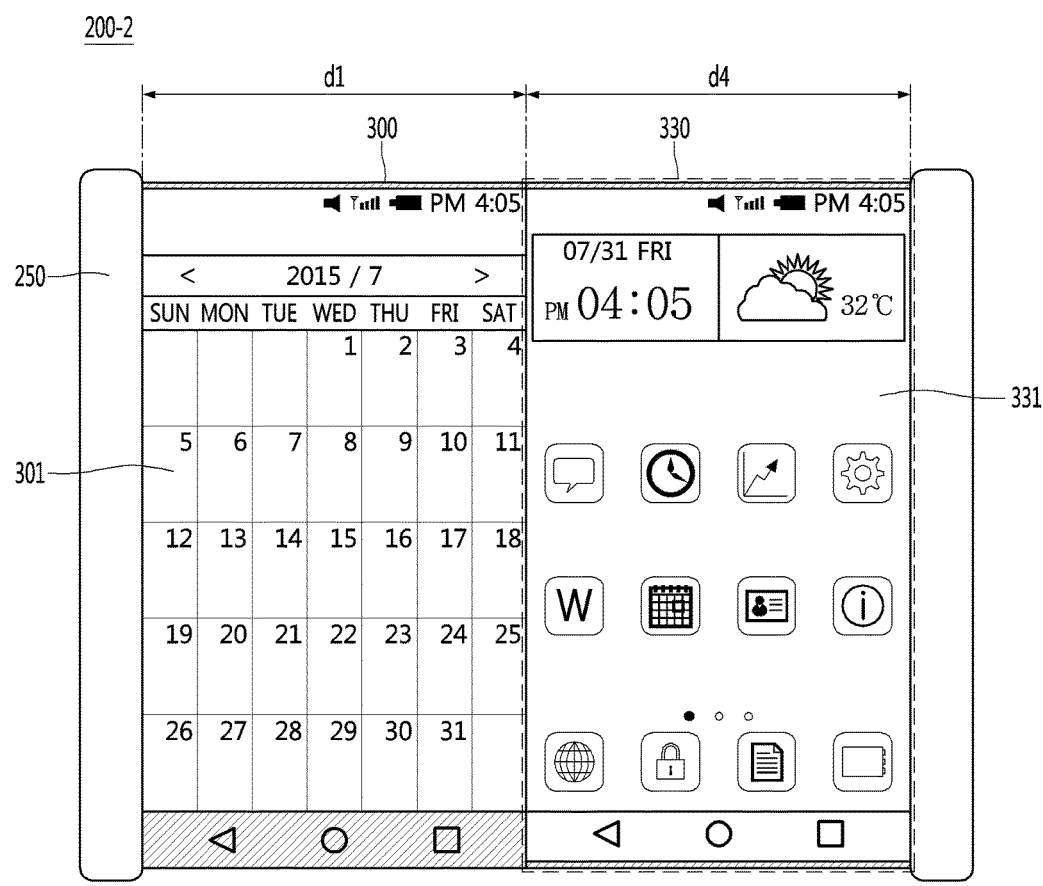

As the display unit 250 is extended in the +x-axis direction, the control unit 290 may extend the display unit 250 by as much as an area 330 corresponding to a distance d4 as illustrated in FIG. 7D. Here, the distance d4 may be equal to or larger than the above-mentioned preset distance. Here, the distance d4 may be equal to the distance d1. Accordingly, the screen of the display unit 250 may be extended by as much as the area 330. The control unit 290 may control the display unit 250 so that second information 331 is displayed on the extended area 330 in response to a request for displaying the second information 331. The control unit 290 may simultaneously display the first information on the area 300 corresponding to the distance d1 and the second information on the area 330 corresponding to the extended distance d4. The control unit 290 may simultaneously display the first information and the second information on an area corresponding to a total horizontal distance (i.e., d1+d4) of the screen. The area 300 and the area corresponding to the distance d4 may be divided areas.

The second information 331 may be a home screen, and may include a widget or information on at least one application registered as a favorite by the user.

The user may perform a motion of rolling out and then rolling in one side of the display unit 250 and then may roll out the one side again so as to view the home screen via the extended area. The user may perform multitasking via the home screen displayed on the extended area 330. This operation will be described later.

FIGS. 8A to 8F illustrate another example in which the second information is displayed on the extended area of the display unit according to the request for displaying the second information.

Figure 8A:
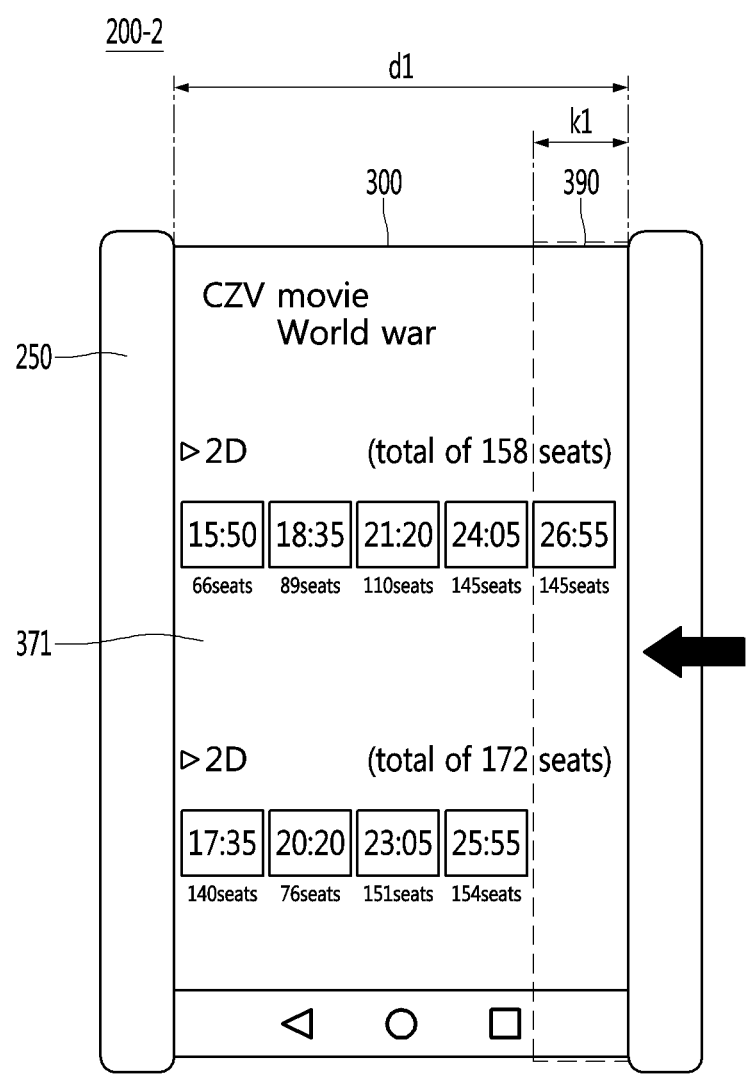
FIGS. 8A to 8F illustrate another example in which the second information is displayed on the extended area of the display unit according to the request for displaying the second information.
Figure 8B:
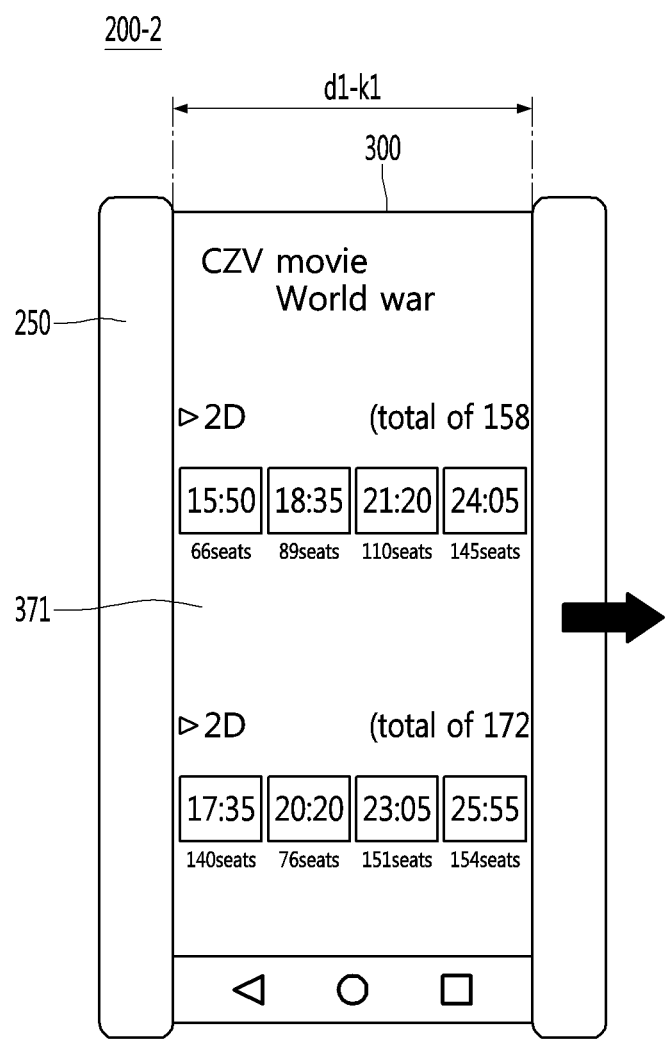
Figure 8C:
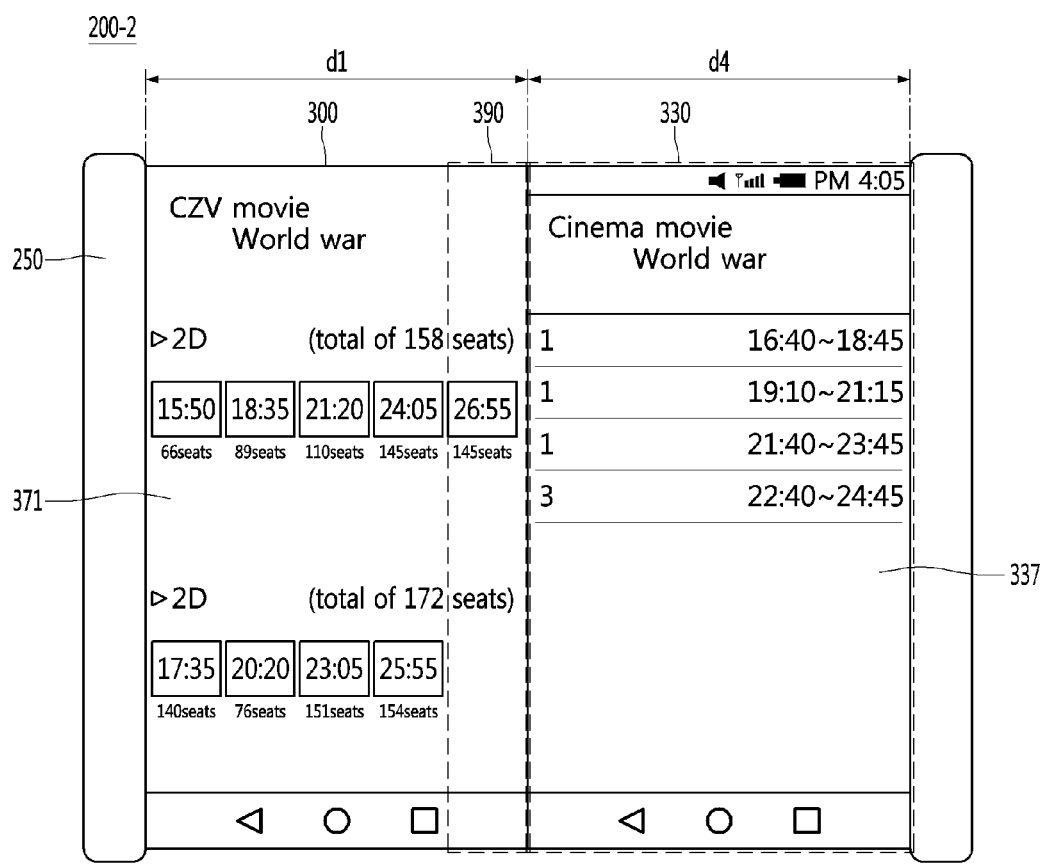

FIGS. 8A to 8C will be described firstly.

Referring to FIG. 8A, the display unit 250 of the rollable display device 200_2 displays the first information on the area 300 of the screen. The first information may be an execution window 371 of a first movie application. The screen of the display unit 250 may be in a state of being extended by as much as the area 300 corresponding to the specific distance d1. For another example, the display unit 250 may be in a state of not being deformed, i.e., stretched. It is assumed that the display unit 250 illustrated in FIG. 8A is in the state of not being deformed.

The control unit 290 may detect, via the sensing unit 210, that the display unit 250 is reduced in the −x-axis direction, so as to reduce the screen 300 of the display unit 250 by as much as an area 390 corresponding to a certain distance k1. FIG. 8B illustrates the display unit 250 that is in a state of being reduced by as much as the area 390 corresponding to the certain distance k1. The certain distance k1 may be less than a preset distance. The preset distance may be a default distance or may be changed according to a setting of the user.

The control unit 290 displays an indicator (not shown) representing that another movie application can be executed if the size of the screen is expanded by an area corresponding to a certain distance k1 in the +x-axis direction. For example, the indicator is displayed at right end of the execution window 371. The indicator includes at least one of (red) color line and text.

Referring to FIG. 8B, if it is detected that the display unit 250 is extended in the +x-axis direction again, the control unit 290 may recognize this motion as a trigger for displaying the second information. In detail, in the case where it is detected that the display unit 250 is reduced in the −x-axis direction by a certain distance and then is extended in the +x-axis direction by a certain distance with a preset time, the control unit 290 may recognize this motion as a request for displaying the second information. The preset time may be one second, but this is merely an example. On the other hand, if the size of screen is reduced over the certain distance k1 in FIG. 8B, a part of the execution window 371 is gradually disappeared.

As the display unit 250 is extended in the +x-axis direction, the control unit 290 may extend the display unit 250 by as much as the area 390 corresponding to the distance k1 and the area 330 corresponding to the distance d4 as illustrated in FIG. 8C. The control unit 290 may display a part of the execution window 371 of the first movie application hidden by the area 390, and may display an execution window 337 of a second movie application on the area 330. That is, the control unit 290 may display the execution window 337 of the second movie application that is the same application type as the first movie application, on the area 330 extended in response to the request for displaying the second information. The first movie application may be provided by a first movie distributor, and the second movie application may be provided by a second movie distributor. The execution window 371 of the first movie application may include information on a movie title (e.g., World War), a movie showing schedule, and the number of remaining seats of a corresponding movie showing time. The control unit 290 may provide, to the execution window 337 of the second movie application, information on the movie showing schedule of the movie entitled "Word War" provided by the second movie distributor and the number of remaining seats of a corresponding movie showing time, on the basis of the information displayed on the execution window 371 of the first movie application. While the first movie application is running, the user may execute the second movie application by simply performing a motion of rolling in and then rolling out the display unit 250 if a specific movie is not shown at a desired time or there is no remaining seat, so that the user may be easily provided with information on the specific movie provided by another movie distributor. That is, it is not necessary for the user to additionally search for a movie title or a movie showing schedule.

A plurality of movie applications may be installed in the flexible display device 200. In this case, a movie application provided to the extended area 330 in response to the request for displaying the second information may be an application that has been most frequently used during a preset period among the plurality of movie applications. If there exist multiple movie applications that have been most frequently used, a most-recently used movie application may be provided. For another example, a movie application corresponding to a movie distributor located at a nearest place to the flexible display device 200 may be provided.

Figure 8D:
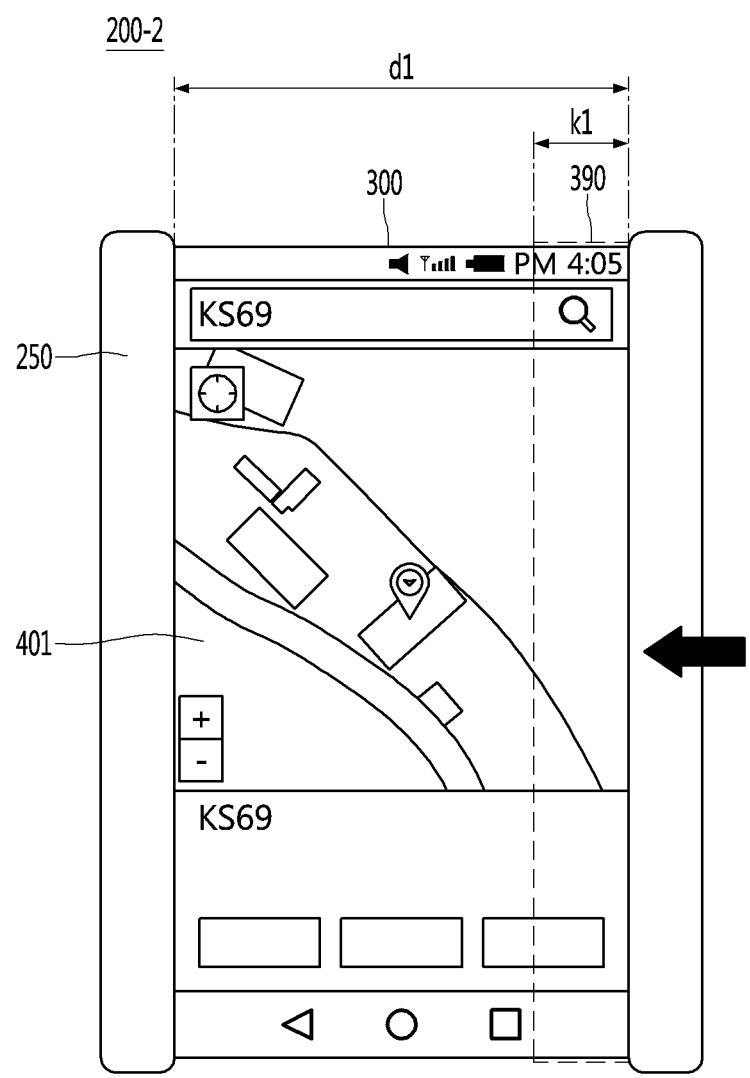
Figure 8E:
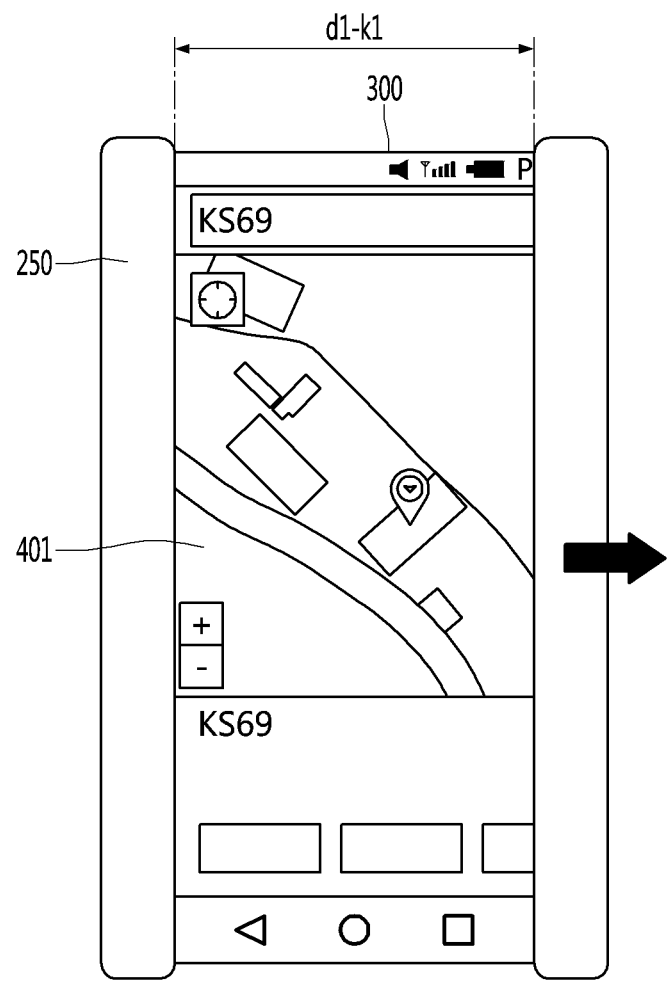
Figure 8F:
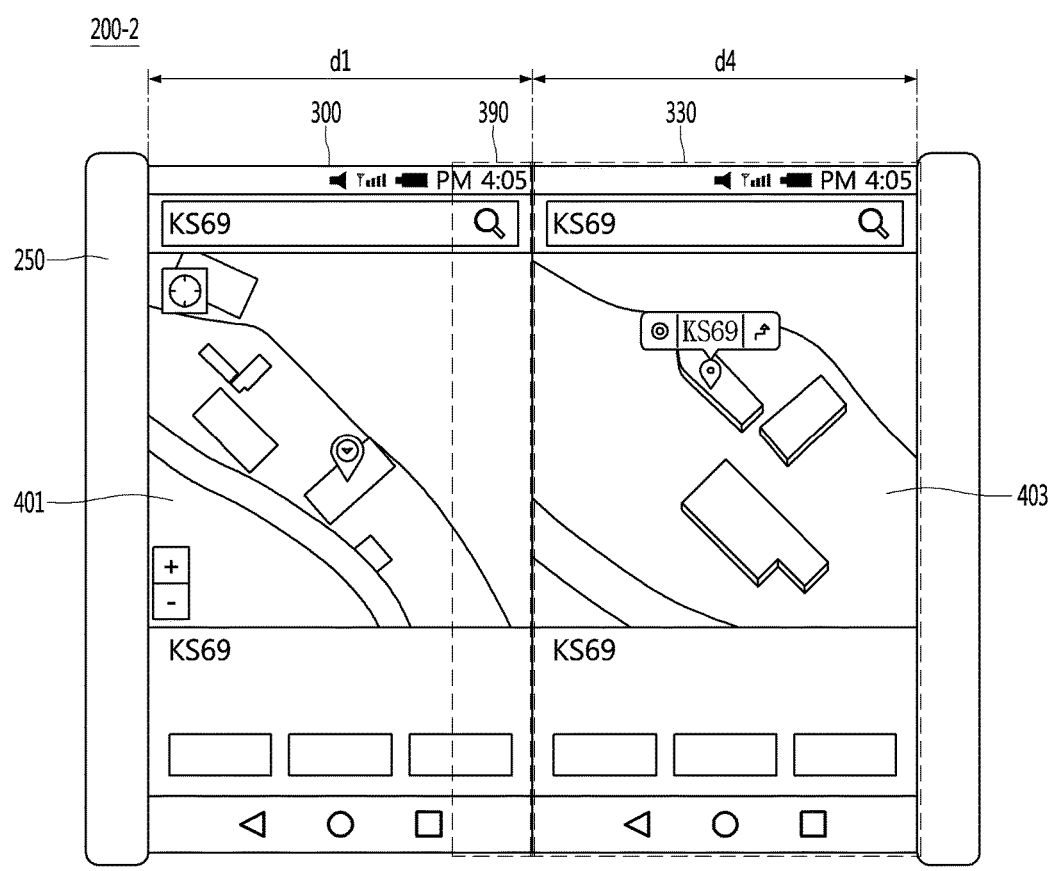

Next, FIGS. 8D to 8F are described.

Referring to FIG. 8D, the display unit 250 of the rollable display device 200_2 displays the first information on the area 300 of the screen. The first information may be an execution window 401 of a first map application. The screen of the display unit 250 may be in a state of being extended by as much as the area 300 corresponding to the specific distance d1. For another example, the display unit 250 may be in a state of not being deformed, i.e., stretched.

The control unit 290 may detect, via the sensing unit 210, that the display unit 250 is reduced in the −x-axis direction, so as to reduce the screen 300 of the display unit 250 by as much as the area 390 corresponding to the certain distance k1. FIG. 8E illustrates the display unit 250 that is in a state of being reduced by as much as the area 390 corresponding to the certain distance k1. The certain distance k1 may be less than a preset distance. The preset distance may be a default distance or may be changed according to a setting of the user.

Referring to FIG. 8E, if the display unit 250 is extended in the +x-axis direction again, the control unit 290 may recognize this motion as a trigger for displaying the second information. In detail, in the case where it is detected that the display unit 250 is reduced in the −x-axis direction by a certain distance and then is extended in the +x-axis direction by a certain distance with a preset time, the control unit 290 may recognize this motion as a request for displaying the second information. The preset time may be one second, but this is merely an example.

As the display unit 250 is extended in the +x-axis direction, the control unit 290 may extend the display unit 250 by as much as the area 390 corresponding to the distance k1 and the area 330 corresponding to the distance d4 as illustrated in FIG. 8F. The control unit 290 may display a part of the execution window 401 of the first map application hidden by the area 390, and may display an execution window 403 of a second map application on the area 330. That is, the control unit 290 may execute the second map application that provides a map service similar to that of the first map application in response to the request for displaying the second information, and may display the execution window 403 of the second map application on the extended area 330.

The control unit 290 may execute the second map application on the basis of information provided to the execution window 401 of the first map application displayed on the area 300 of a default screen. In detail, in the case where a map for a specific location (e.g., a location searched for by the user) is displayed on the execution window 401 of the first map application, the control unit 290 may display, on the execution window 403 of the second map application, a map for the specific location using information on the specific location. If the user determines that information on a region to be found is insufficient while the first map application is running, the user may execute the second map application that provides a service similar to that of the first map application by making the request for displaying the second information. The user may be provided with information on the specific information by simply making a motion of rolling in and then rolling out one side of the display unit 250, without additionally inputting information of the specific location via the execution window 403 of the second map application.

A plurality of map applications may be installed in the flexible display device 200. In this case, a map application provided to the extended area 330 in response to the request for displaying the second information may be an application that has been most frequently used during a preset period among the plurality of map applications. If there exist multiple map applications that have been most frequently used, a most-recently used map application may be provided. For another example, if it is detected that the user inputs a destination and is in a vehicle, the control unit 290 may execute a navigation application in response to the request for displaying the second information, and may display, on the extended area 330, an execution window of the navigation application for providing a guide to an input destination.

The method of FIG. 5 continues to be described below referring back to FIG. 5.

The control unit 290 receives a request for selecting a specific application icon included in the second information (S119), and switches second information to third information corresponding to a selected application icon in response to the received request (S121). That is, the control unit 290 may execute an application corresponding to an application icon in response to a request for selecting the application icon, and may display an execution window of the executed application on an extended area. This operation is described below with reference to the following figures.

Figure 9A:
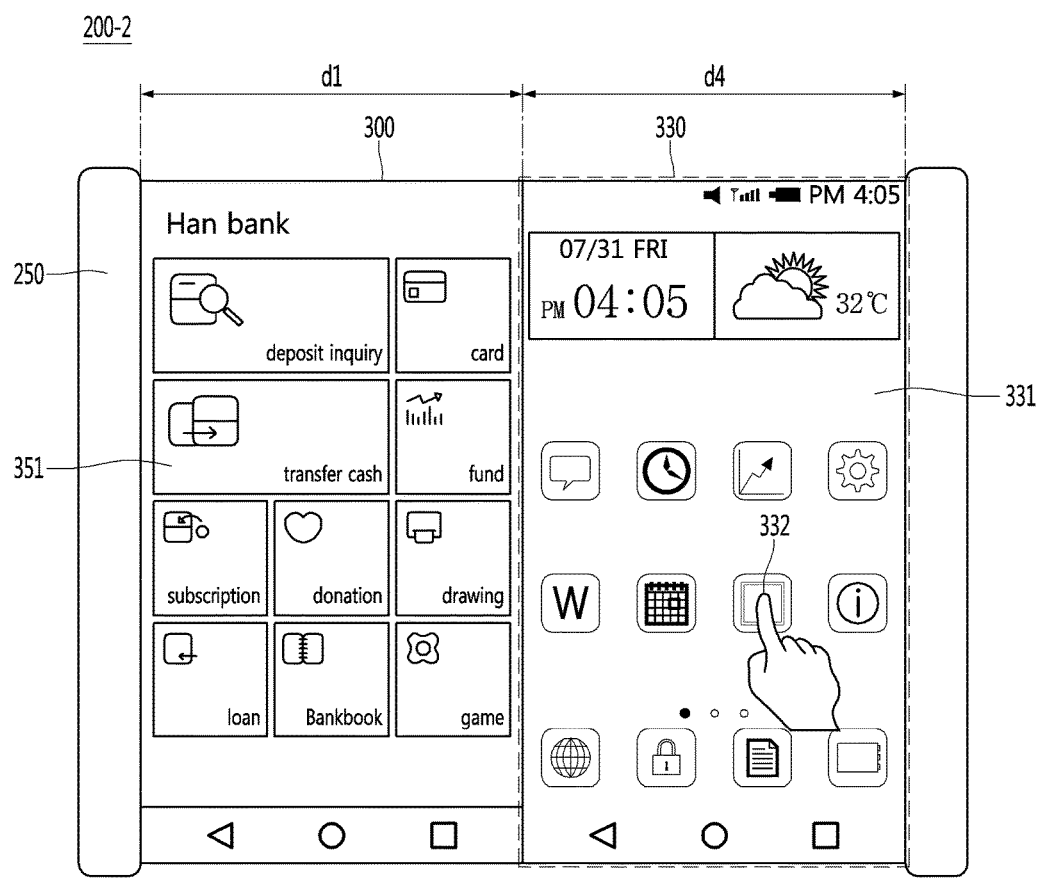
Figure 9B:
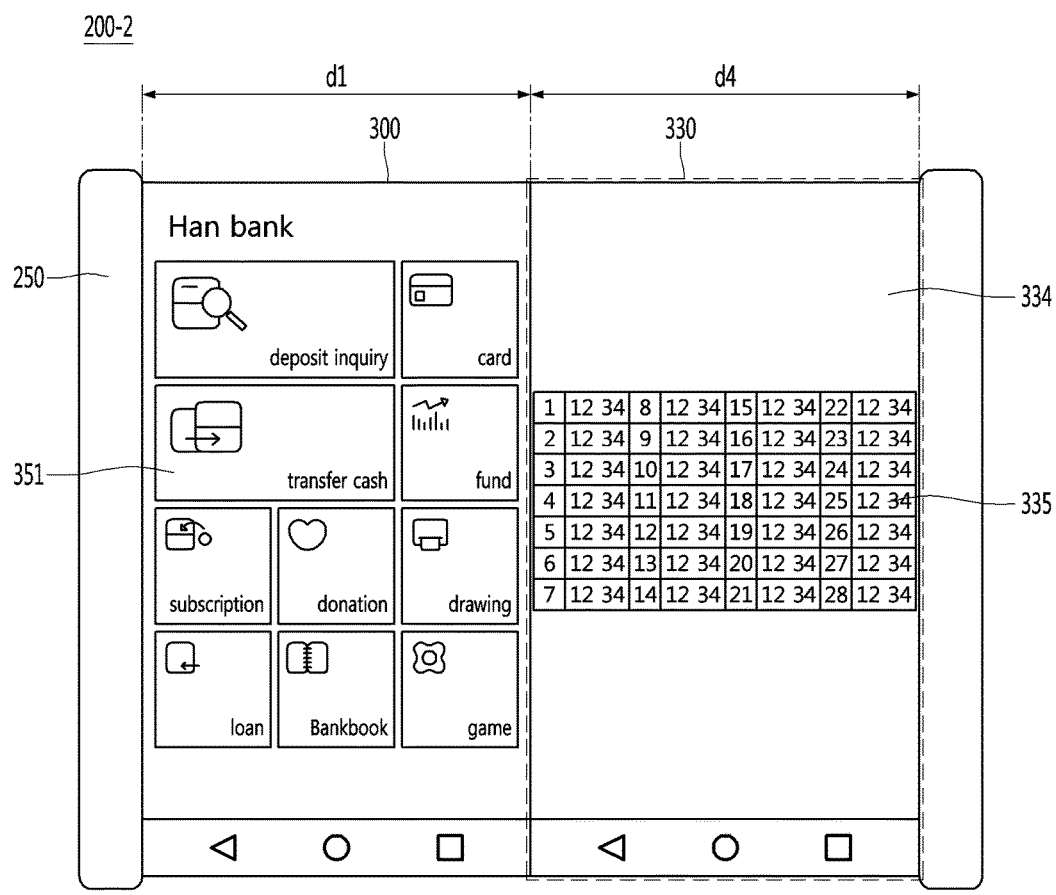

FIGS. 9A to 9C are diagrams illustrating an operation of performing multitasking via a home screen according to an embodiment.

The second information may be a home screen. FIG. 9A is a diagram illustrating that a home screen 331 is displayed on the extended area 330 through the process described above with reference to FIGS. 7A to 7D.

Referring to FIG. 9A, an execution window 351 of a financial application may be displayed on the default screen 300 of the display unit 250. Compared to FIG. 7A, FIG. 9A illustrates the execution window 351 of the financial application instead of the execution window 301 of the scheduling application. The home screen 331 may be displayed on the extended area 330 of the display unit 250. In the case where a request for selecting a gallery icon 332 corresponding to a gallery application included in the home screen 331 is received, the control unit 290 may control the display unit 250 so that an execution window 334 of the gallery application is displayed on the extended area 330 as illustrated in FIG. 9B. That is, the control unit 290 may switch the home screen 331 to the execution window 334 of the gallery application in response to the request for selecting the gallery icon 332. A security card image 335 containing information on a security card may be displayed on the execution window 334 of the gallery application. While using a mobile banking service via the financial application, the user may quickly check information for mobile banking by executing the gallery application via the home screen 331.

Meanwhile, in the case where it is detected that the display unit 250 is further extended in the +x-axis direction, the control unit 290 may further extend the display unit 250 by as much as an area 360 corresponding to a distance d5 as illustrated in FIG. 9C. Here, the distance d5 may be equal to the distance d4. The control unit 290 may control the display unit 250 so that a financial application execution window 361 different from the execution window 351 of the financial application is displayed. The user may execute two financial applications to perform multitasking.

Figure 10A:
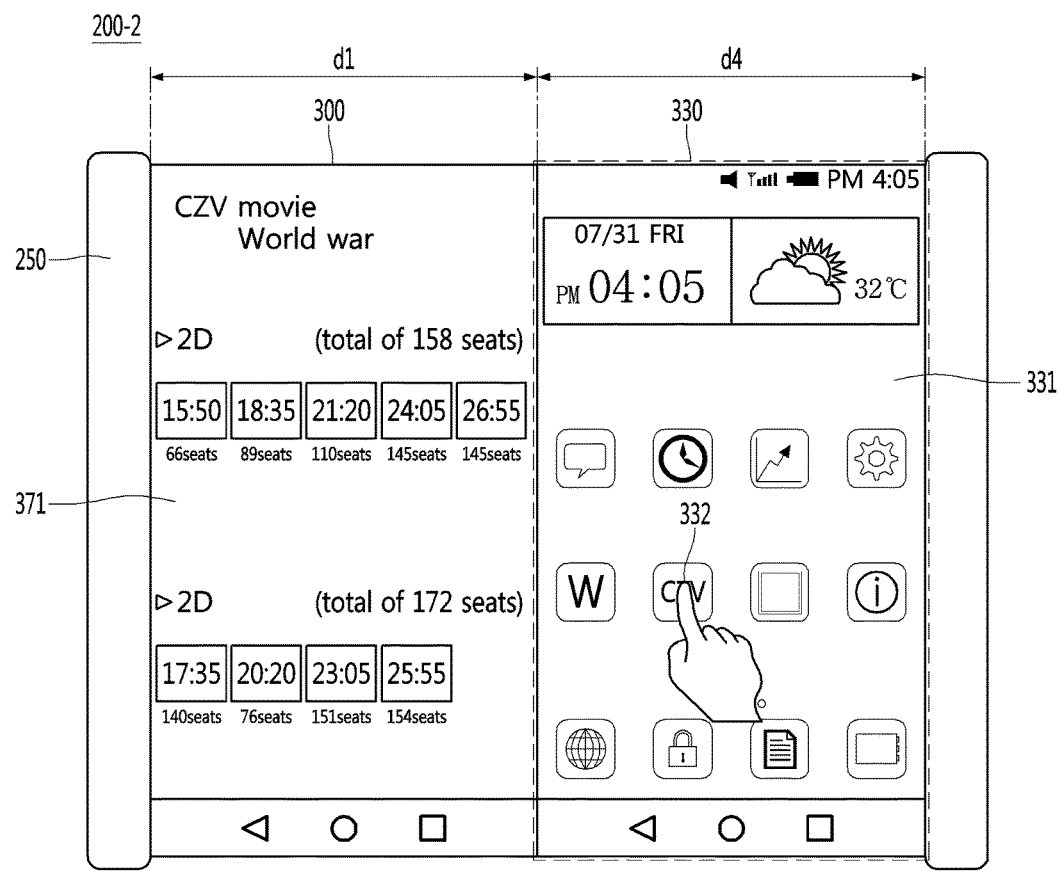
FIGS. 10A and 10B are diagrams illustrating an operation of performing multitasking via a home screen according to another embodiment.
Figure 10B:
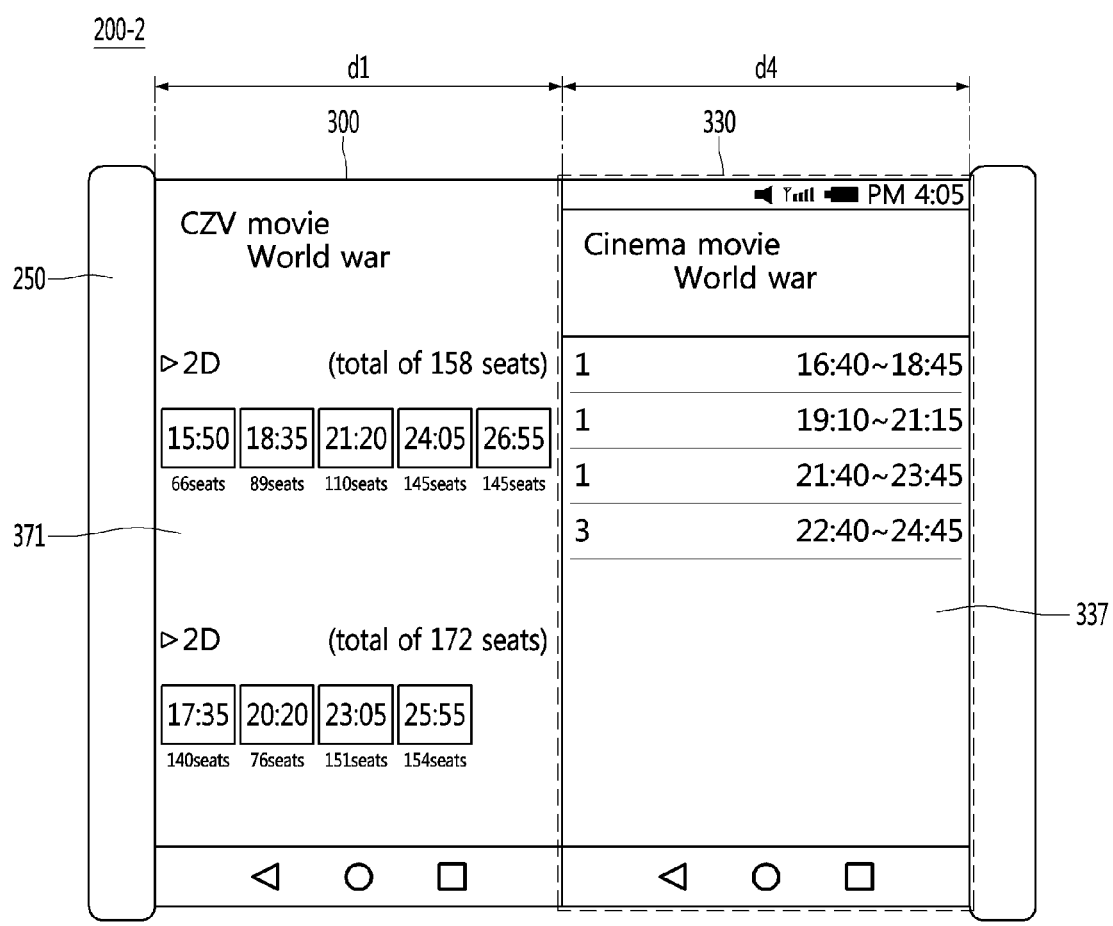

FIGS. 10A and 10B are diagrams illustrating an operation of performing multitasking via a home screen according to another embodiment.

FIG. 10A is a diagram illustrating that the home screen 331 is displayed on the extended area 330 through the process described above with reference to FIGS. 7A to 7D.

Referring to FIG. 10A, the execution window 371 of the first movie application may be displayed on the area 300 of the screen of the display unit 250. Compared to FIG. 7A, FIG. 10A illustrates the execution window 371 of the first movie application instead of the execution window 301 of the scheduling application. The home screen 331 may be displayed on the extended area 330 of the display unit 250. In the case where a request for selecting a movie application icon 336 corresponding to the second movie application is received through the home screen 331, the control unit 290 may control the display unit 250 so that the execution window 337 of the second movie application is displayed on the extended area 330 as illustrated in FIG. 10B. That is, the control unit 290 may switch the home screen 336 to the execution window 337 of the second movie application in response to the request for selecting the movie application icon 336. If the user is unable to find a remaining seat for a specific movie to be shown at a desired time from the execution window 371 of the first movie application, the user may execute the second movie application so as to compare and check movie showing schedules and remaining seats of the specific movie.

FIGS. 11A to 11G are diagrams illustrating an operation of performing multitasking via a home screen according to another embodiment.

Figure 11A:
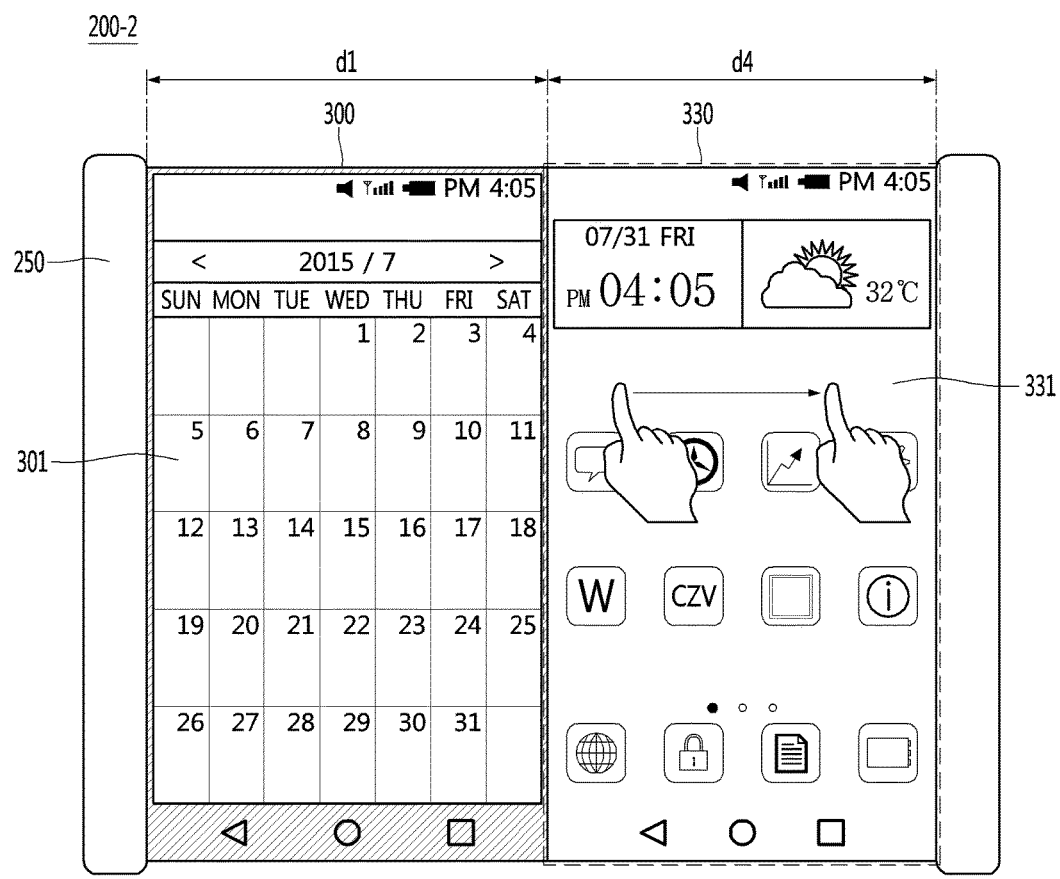
FIGS. 11A to 11G are diagrams illustrating an operation of performing multitasking via a home screen according to another embodiment.
Figure 11B:
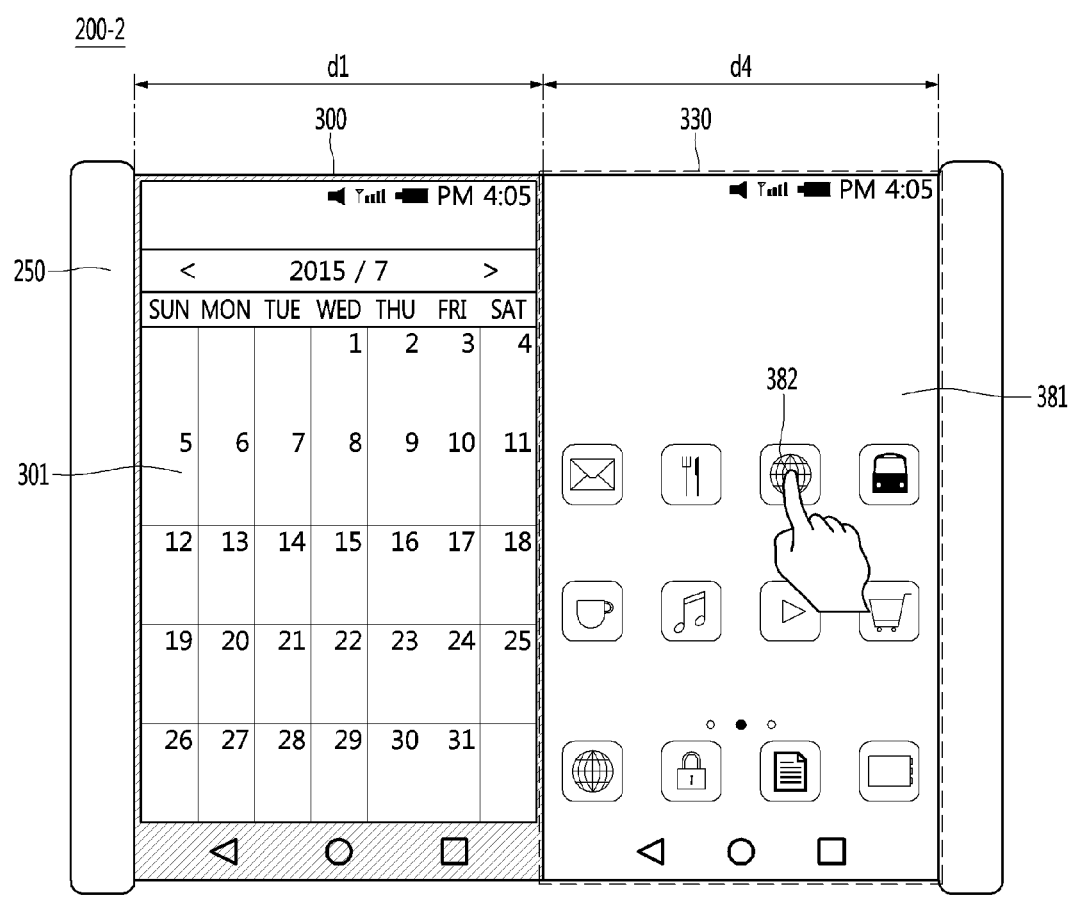
Figure 11C:
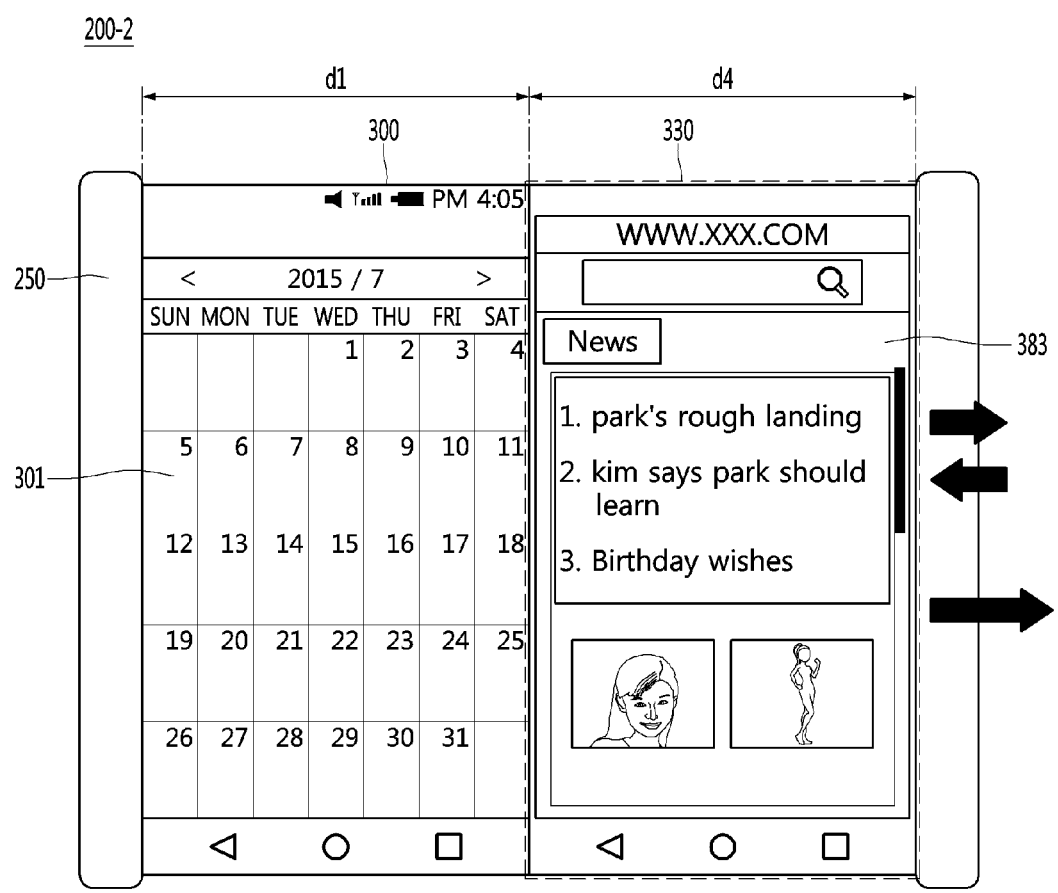

FIG. 11A is a diagram illustrating that the home screen 331 is displayed on the extended area 330 through the process described above with reference to FIGS. 7A to 7D. The default area 300 and the extended area 330 may be operated as if each of the default area 300 and the extended area 330 were a screen displayed on one device. The user may individually control the screen 300 and the extended area 330 as if the user used two devices. Referring to FIG. 11A, in the case where a flicking input of touching one point of the home screen 331 and then sliding thereon is received, the control unit 290 may switch the home screen 331 to another menu screen 381 as illustrated in FIG. 11B. Here, the previous scheduling application execution window 301 may be intactly displayed on the area 300 of the screen. In the case where a request for selecting an Internet application icon 382 displayed on the menu screen 381 is received, the control unit 290 may control the display unit 250 so that an execution window 383 of the Internet application is displayed on the extended area 330 as illustrated in FIG. 11C.

Figure 11D:
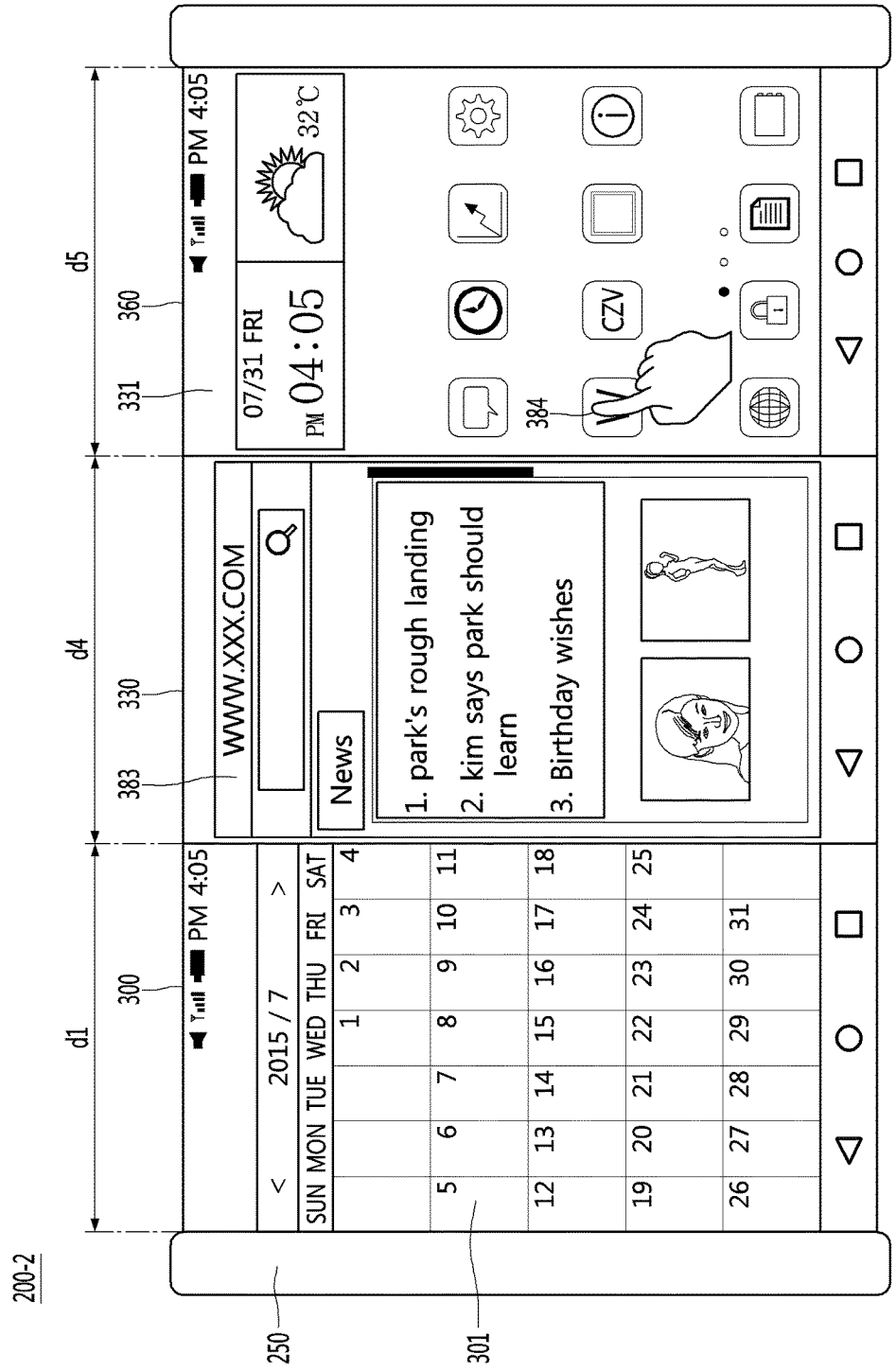

In the case where the request for displaying the second information is received and it is detected that the display unit 250 is further extended in the +x-axis direction, the control unit 290 may further extend the display unit 250 by as much as the area 360 corresponding to the distance d5 as illustrated in FIG. 11D. The control unit 290 may control the display unit 250 so that the second information is displayed on the extended area 360. The second information may be the home screen 331. Here, as described above with reference to FIGS. 7A to 7C, the request for displaying the second information may be an input of a motion of extending the display unit 250 by the certain distance d2 and then reducing it back.

Figure 11E:
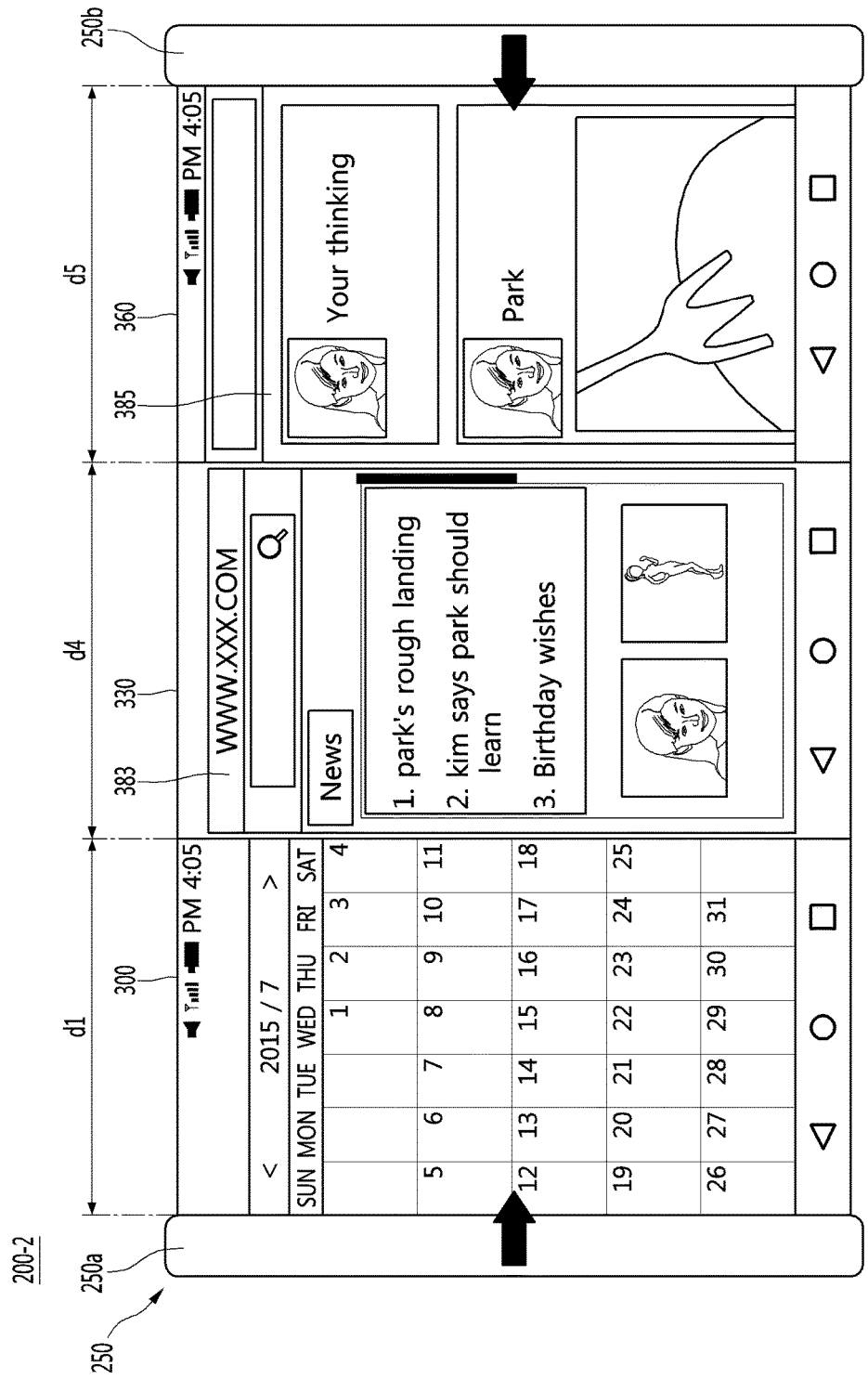

In the case where a request for selecting a social network service application icon 384 displayed on the home screen 331 is received, the control unit 290 may control the display unit 250 so that an execution window 385 of a selected social network service application is displayed as illustrated in FIG. 11E. Here, the previous scheduling application execution window 301 may be still displayed on the area 300 of the screen, and the execution window 383 of the Internet application may be still displayed on the extended area 330.

The user may perform an Internet search and may check a schedule while using a social network service, i.e., the user may perform multitasking.

Figure 11F:
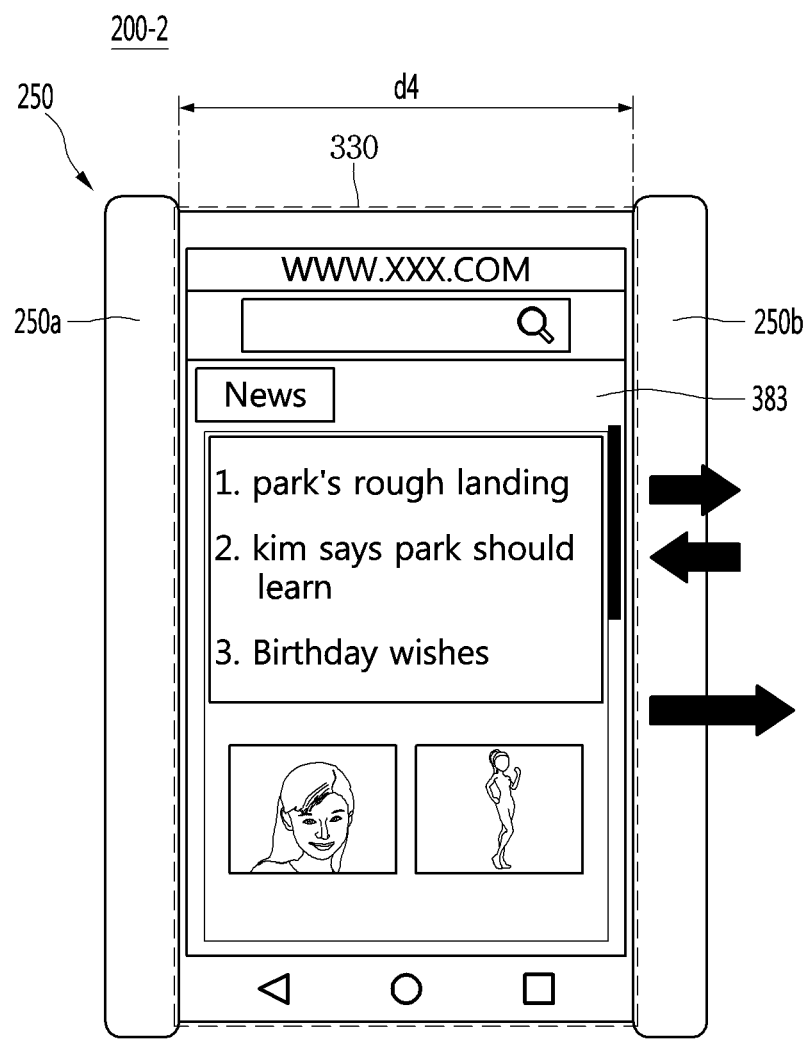
Figure 11G:
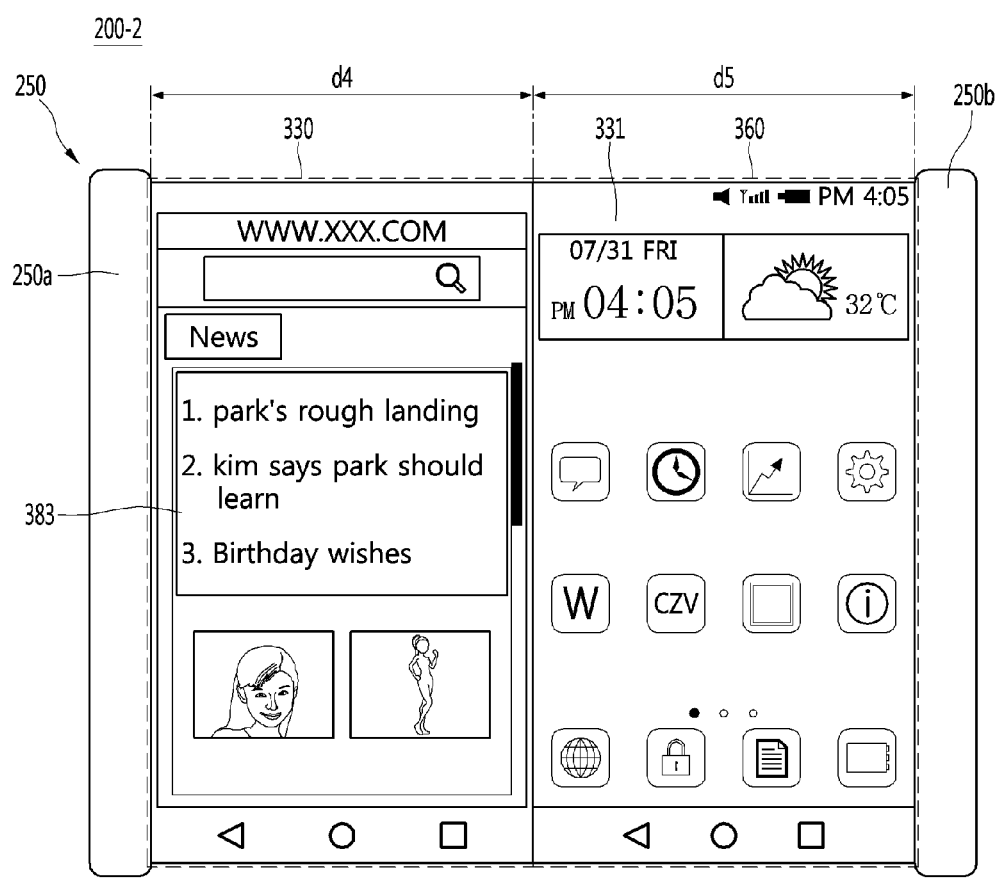

When the screen of the display unit 250 is in a state of being extended by as much as the areas 330 and 360, if it is detected that one side 250*a* of the display unit 250 is reduced in the +x-axis direction and another side 250*b* of the display unit 250 is reduced in the −x-axis direction as illustrated in FIG. 11E, the control unit 290 may reduce the display unit 250 as illustrated in FIG. 11F. In this case, the display unit 250 may only display the execution window 383 of the Internet application on the previously extended area 330. In this state, the control unit 290 may receive the request for displaying the second information. As described above with reference to FIGS. 7A to 7C, the request for displaying the second information may be an input of a motion of extending the display unit 250 by the certain distance d2 and then reducing it back. In the case where it is detected that the display unit 250 is extended in the +x-axis direction after the request for displaying the second information is received, the control unit 290 may extend the display unit 250 by as much as the area 360 corresponding to the distance d5 as illustrated in FIG. 11G. The control unit 290 may control the display unit 250 so that the second information, i.e., the home screen 331, is displayed on the extended area 360.

When performing multitasking, the user may roll in the rollable display device 200_2 to close a running screen and then may continue to perform multitasking with respect to remaining screens.

Meanwhile, if the extended distance of the display unit 250 is less than the reference distance (S115), the control unit 290 displays, on the extended area, an associated application icon associated with the first information (S123). In one embodiment, the reference distance may be a criterion for providing information on an application associated with the first information. The reference distance may be less than the distance d1 corresponding to the size of the default screen 300 illustrated in FIG. 7A.

In the case where the extended distance of the screen of the display unit 250 is less than the reference distance, the control unit 290 may control the display unit 250 so that an application icon corresponding to an application that provides the same type of information as the first information is displayed on the extended area.

The control unit 290 receives a request for selecting the associated application icon (S125).

Thereafter, the control unit 290 detects that the display unit 250 is extended (S127), and accordingly extends the display unit 250 (S129).

If the extended distance of the display unit 250 is equal to or larger than the reference distance, an execution window of an associated application corresponding to the selected associated application icon is displayed on the area extended by at least the reference distance (S133).

Operations S123 to S133 are described below with reference to the following figures.

FIGS. 12A to 12D illustrate that, in the case where the extended distance of the display unit is less than the reference distance, the associated application icon associated with the first information is displayed on the extended area, and an execution window corresponding to the associated application icon is provided to the extended area according to an embodiment.

Figure 12A:
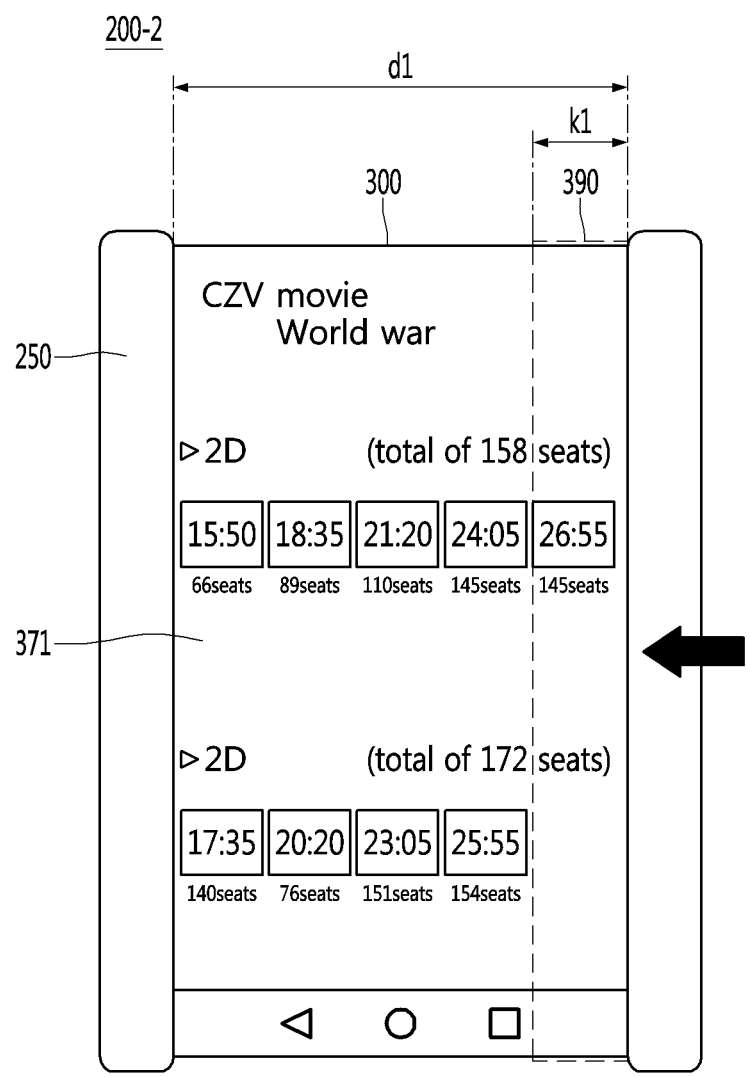
FIGS. 12A to 12D illustrate that, in the case where an extended distance of the display unit is less than a reference distance, an associated application icon associated with the first information is displayed on the extended area, and an execution window corresponding to the associated application icon is provided to the extended area according to an embodiment.
Figure 12B:
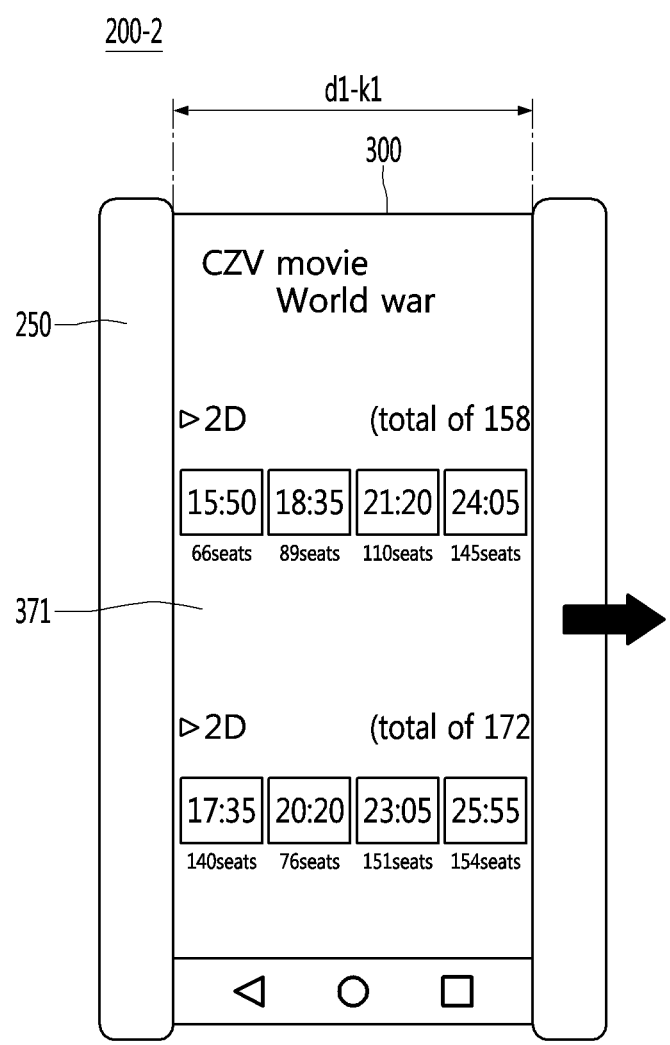
Figure 12C:
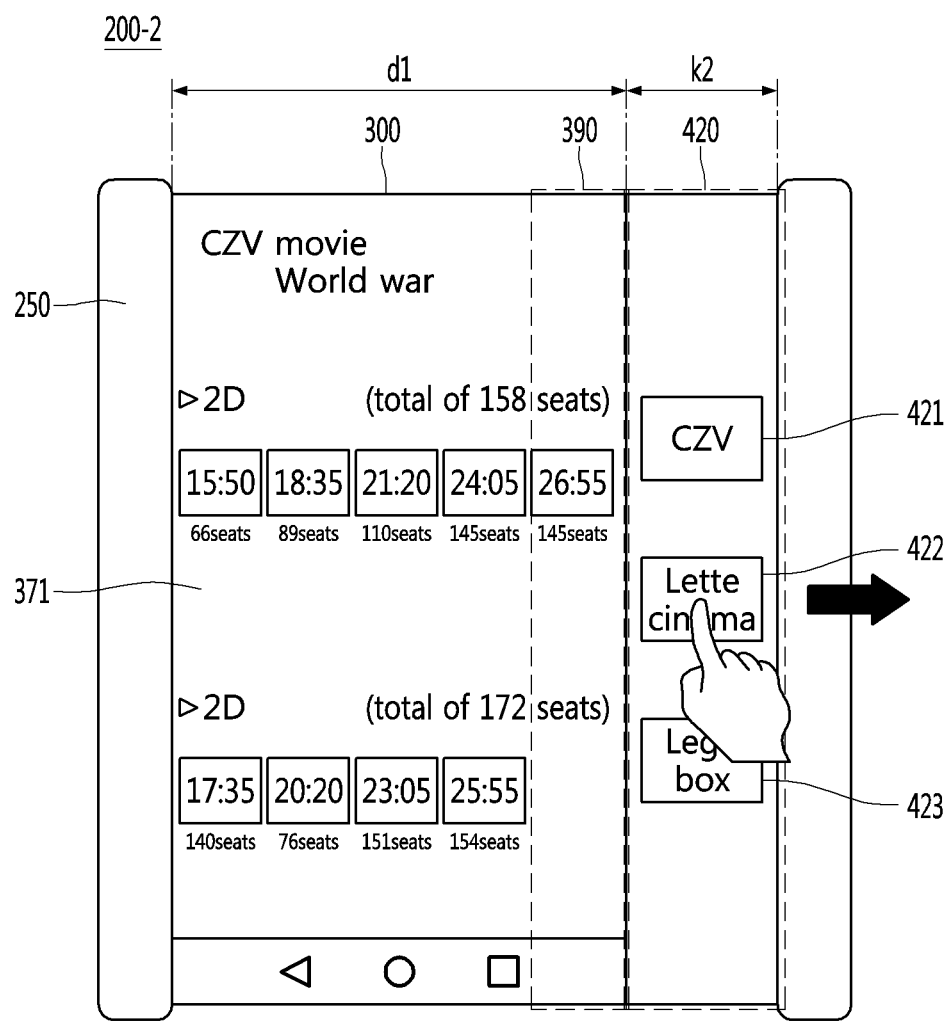
Figure 12D:
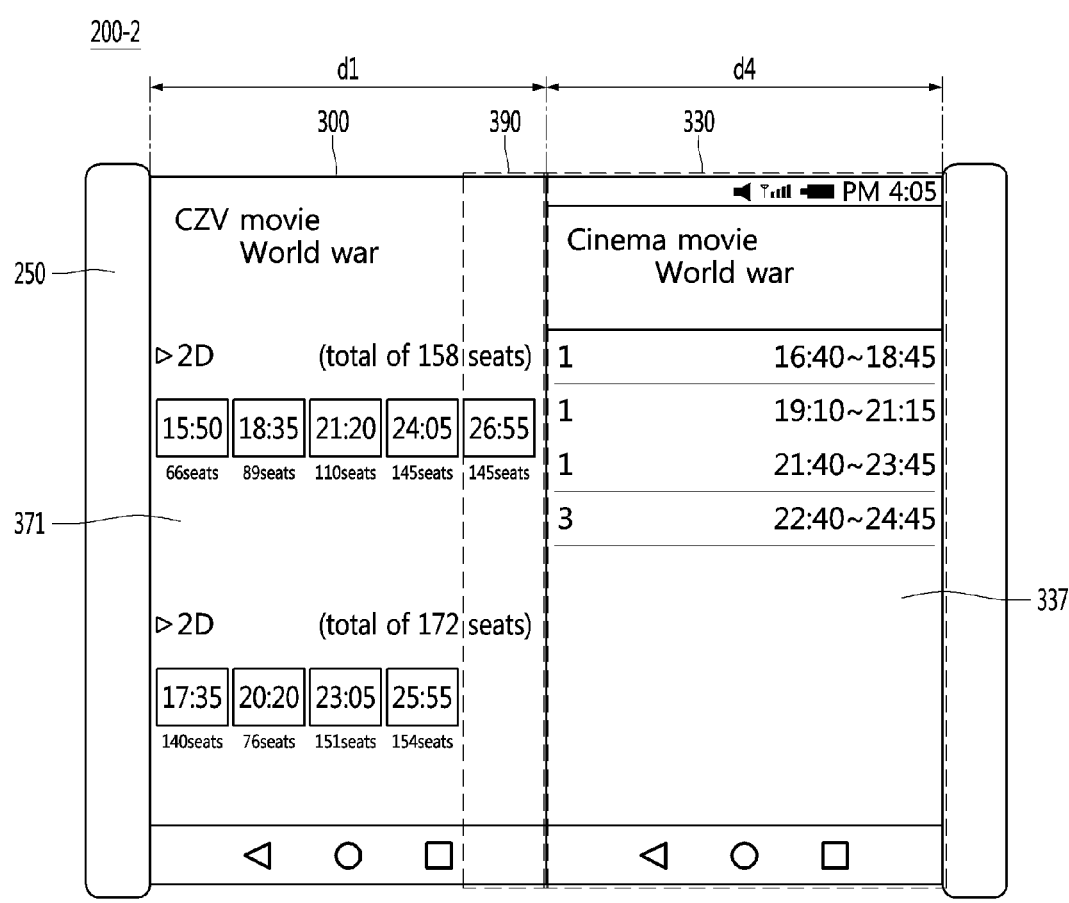

FIGS. 12A and 12B are the same as FIGS. 8A and 8B respectively, and the descriptions of FIGS. 8A and 8B are applied to FIGS. 12A and 12B.

Referring to FIG. 12B, if it is detected that the display unit 250 is extended in the +x-axis direction, the control unit 290 may extend the display unit 250 by as much as an area 420 corresponding to a distance k2. If the distance k2 is less than the reference distance, the control unit 290 may control the display unit 250 so that a plurality of associated application icons 421 to 423 associated with the first information are displayed on the extended area 420. Each of the plurality of associated application icons 421 to 423 may correspond to an application that provides the same service as the first movie application. In the case where a request for selecting the specific associated application icon 422 is received and the extended distance d4 of the display unit 250 is equal to or larger than the reference distance, the control unit 290 may control the display unit 250 so that the execution window 337 of a movie application corresponding to the selected associated application icon 422 is displayed on the extended area 330 corresponding to the extended distance d4.

FIGS. 13A to 13D illustrate that, in the case where the extended distance of the display unit is less than the reference distance, the associated application icon associated with the first information is displayed on the extended area, and an execution window corresponding to the associated application icon is provided to the extended area according to another embodiment.

Figure 13A:
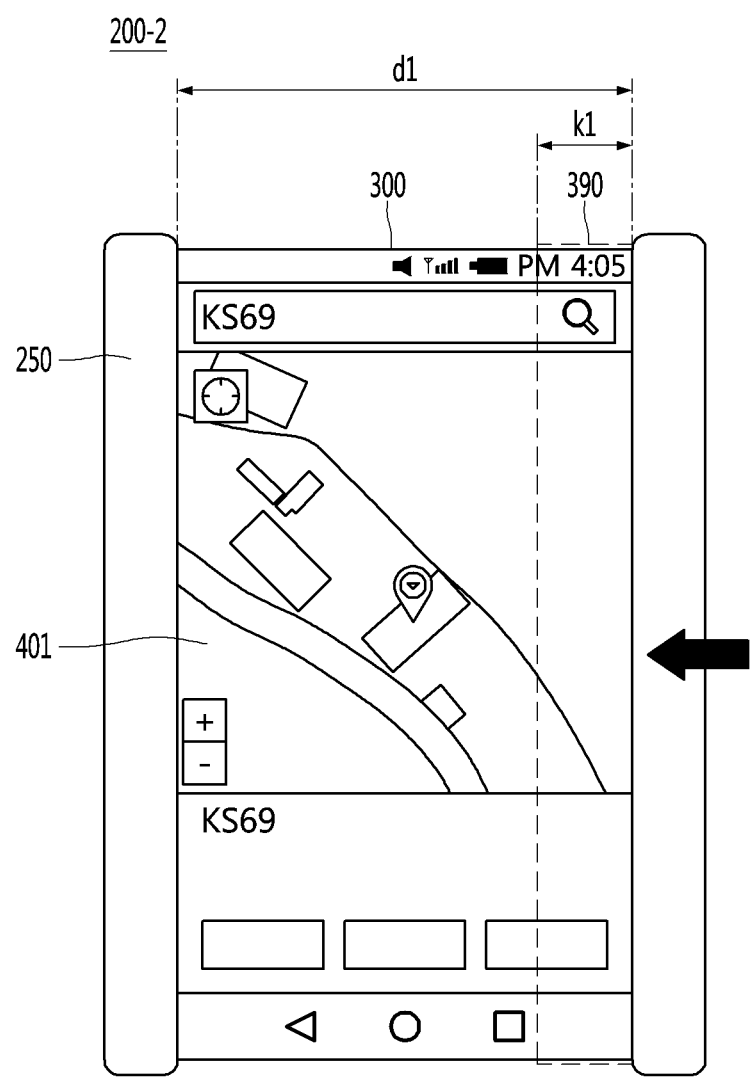
FIGS. 13A to 13D illustrate that, in the case where the extended distance of the display unit is less than the reference distance, the associated application icon associated with the first information is displayed on the extended area, and an execution window corresponding to the associated application icon is provided to the extended area according to another embodiment.
Figure 13B:
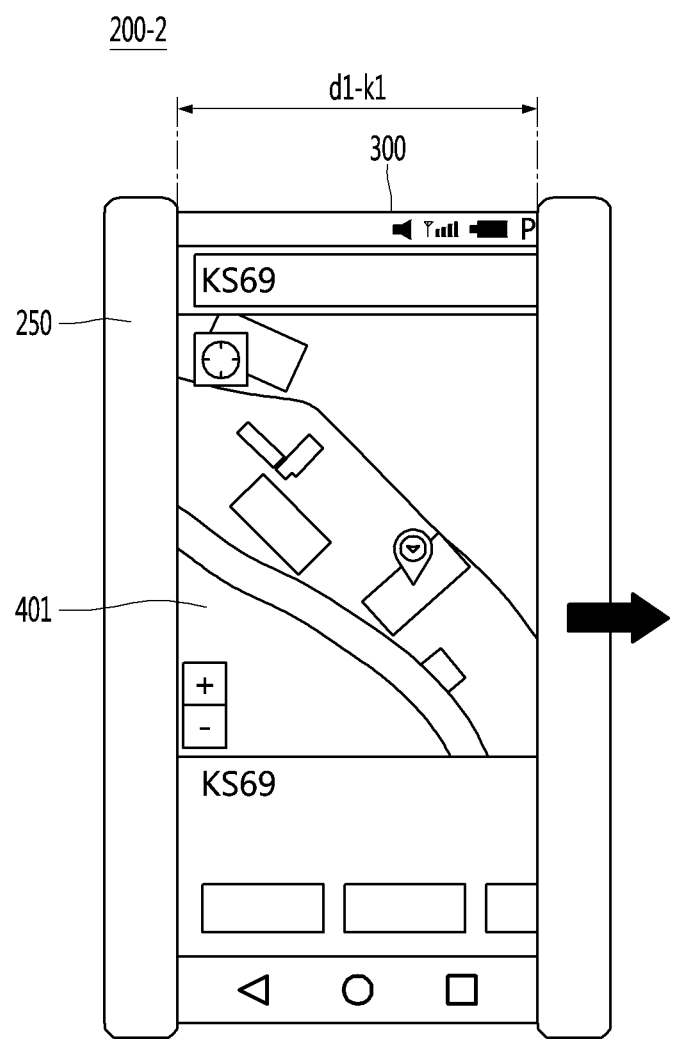
Figure 13C:
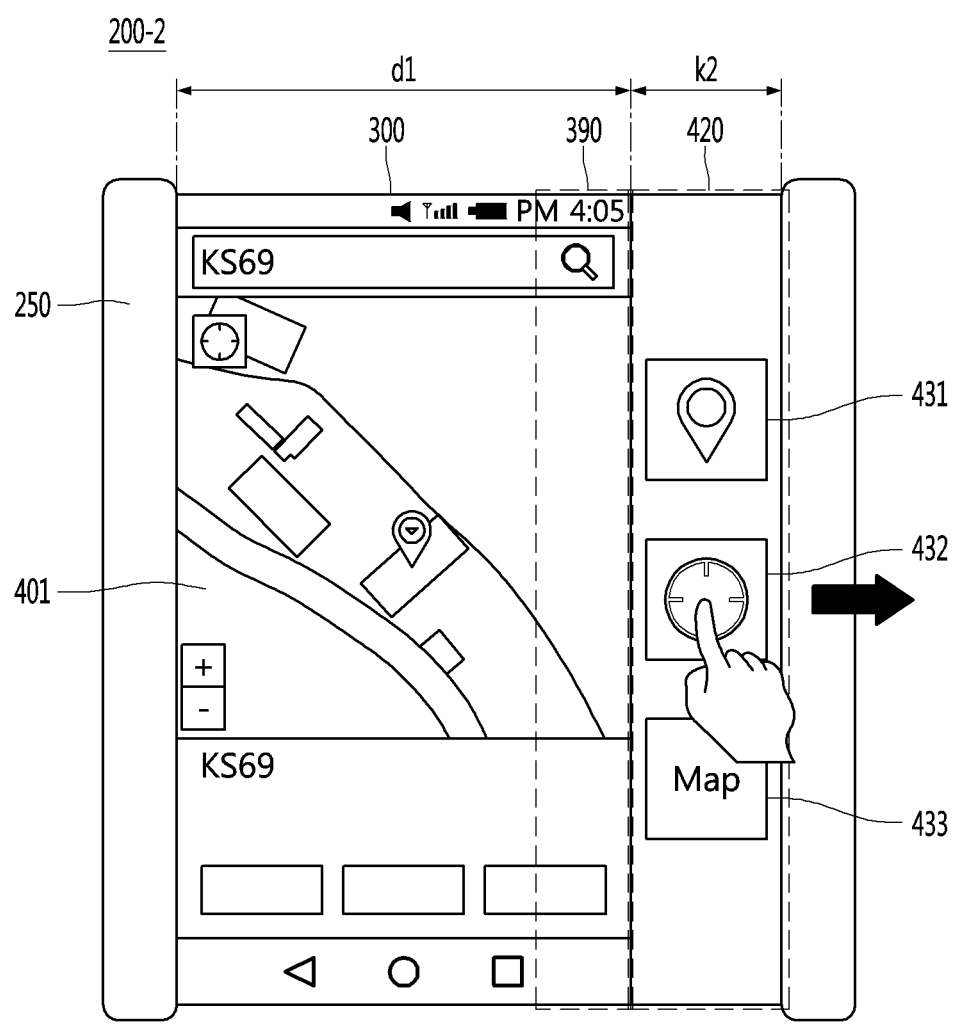
Figure 13D:
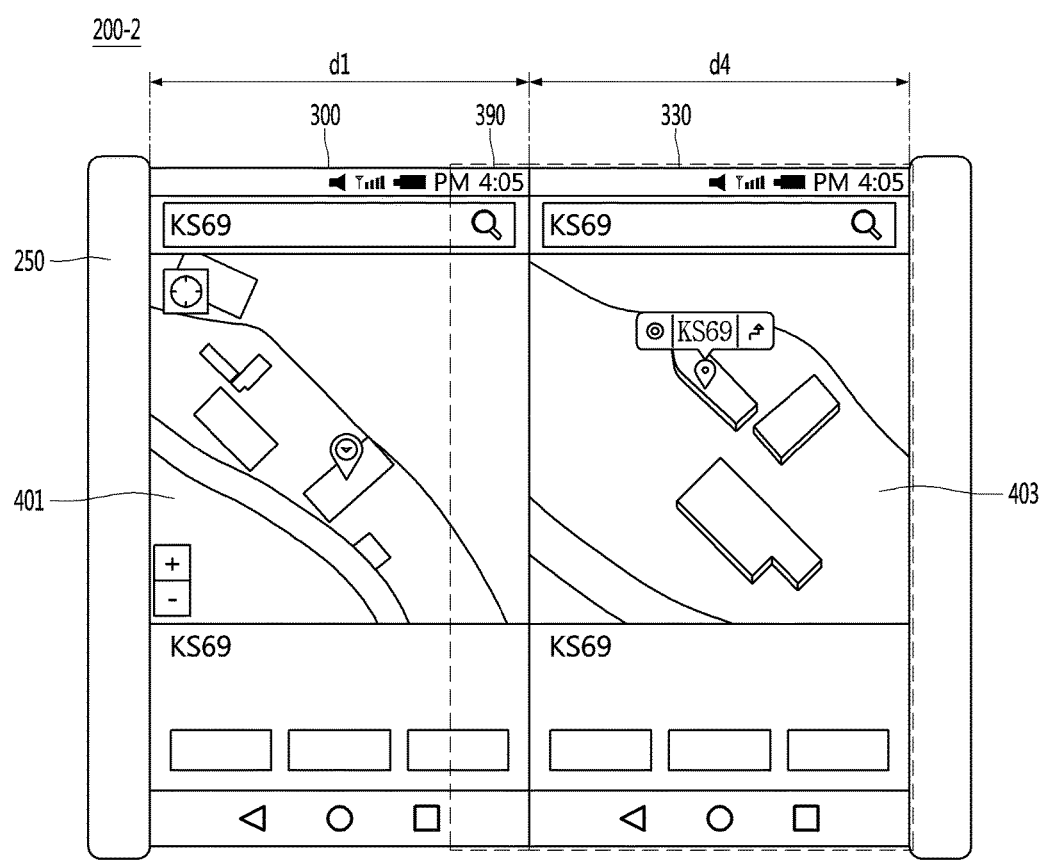

FIGS. 13A and 13B are the same as FIGS. 8D and 8E respectively, and the descriptions of FIGS. 8D and 8E are applied to FIGS. 13A and 13B.

Referring to FIG. 13B, if it is detected that the display unit 250 is extended in the +x-axis direction, the control unit 290 may extend the display unit 250 by as much as the area 420 corresponding to the distance k2. If the distance k2 is less than the reference distance, the control unit 290 may control the display unit 250 so that a plurality of associated application icons 431 to 433 associated with the first information are displayed on the extended area 420. Each of the plurality of associated application icons 431 to 433 may correspond to an application that provides the same service as the first map application provided via the default screen 300. In the case where a request for selecting the specific associated application icon 432 is received and the extended distance d4 of the display unit 250 is equal to or larger than the reference distance, the control unit 290 may control the display unit 250 so that the execution window 403 of a map application corresponding to the selected associated application icon 432 is displayed on the extended area 330.

A method for operating the flexible display device 200 according to another embodiment will be described.

Figure 14:
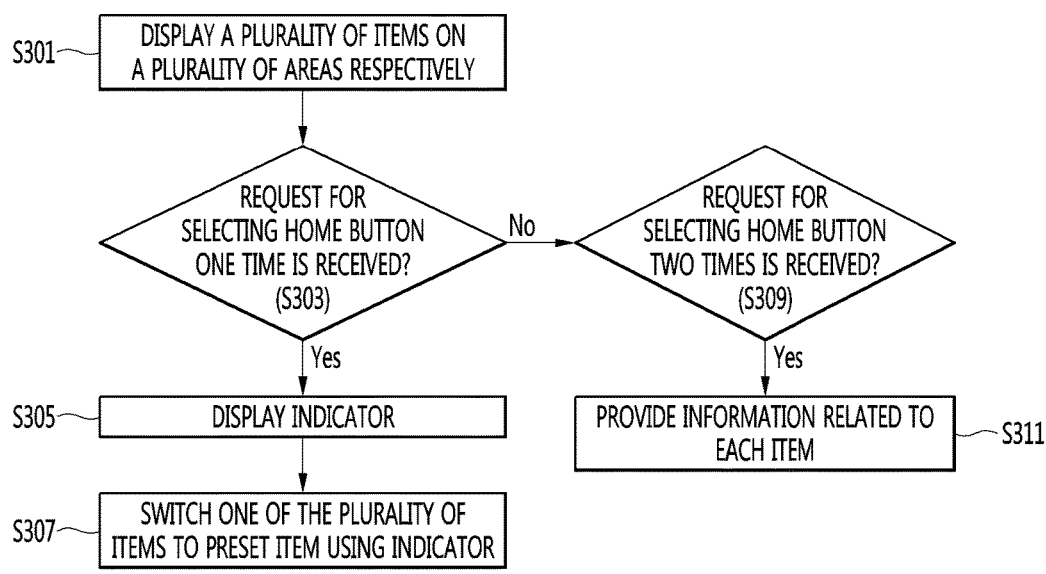
FIG. 14 is a flowchart illustrating a method for operating a flexible display device according to another embodiment.

FIG. 14 is a flowchart illustrating a method for operating a flexible display device according to another embodiment.

The control unit 290 of the flexible display device 200 displays, via the display unit 250, a plurality of items on a plurality of areas respectively (S301). In one embodiment, each of the plurality of areas may be an extended area of the display unit 250. In detail, each of the plurality of areas may be an extended area of a screen displayed by the display unit 250.

In one embodiment, each of the plurality of items may be an execution window of an application.

The control unit 290 receives a request for selecting a home button one time (S303), and displays an indicator via the display unit 250 in response to the received request (S305). In one embodiment, the home button may be provided to one side of the display unit 250. The home button may be used to display a home screen on a specific area among the plurality of areas.

In another embodiment, the home button may be displayed on the display unit 250.

In one embodiment, the indicator may be a highlight box for identifying one area among the plurality of areas.

In another embodiment, the indicator may be an icon for switching an item displayed on one of the plurality of areas to preset information.

The control unit 290 switches one of the plurality of items to the preset information using the indicator (S307). In one embodiment, the preset information may be a home screen. Operations S301 to S307 are described below with reference to the following figures.

Figure 15A:
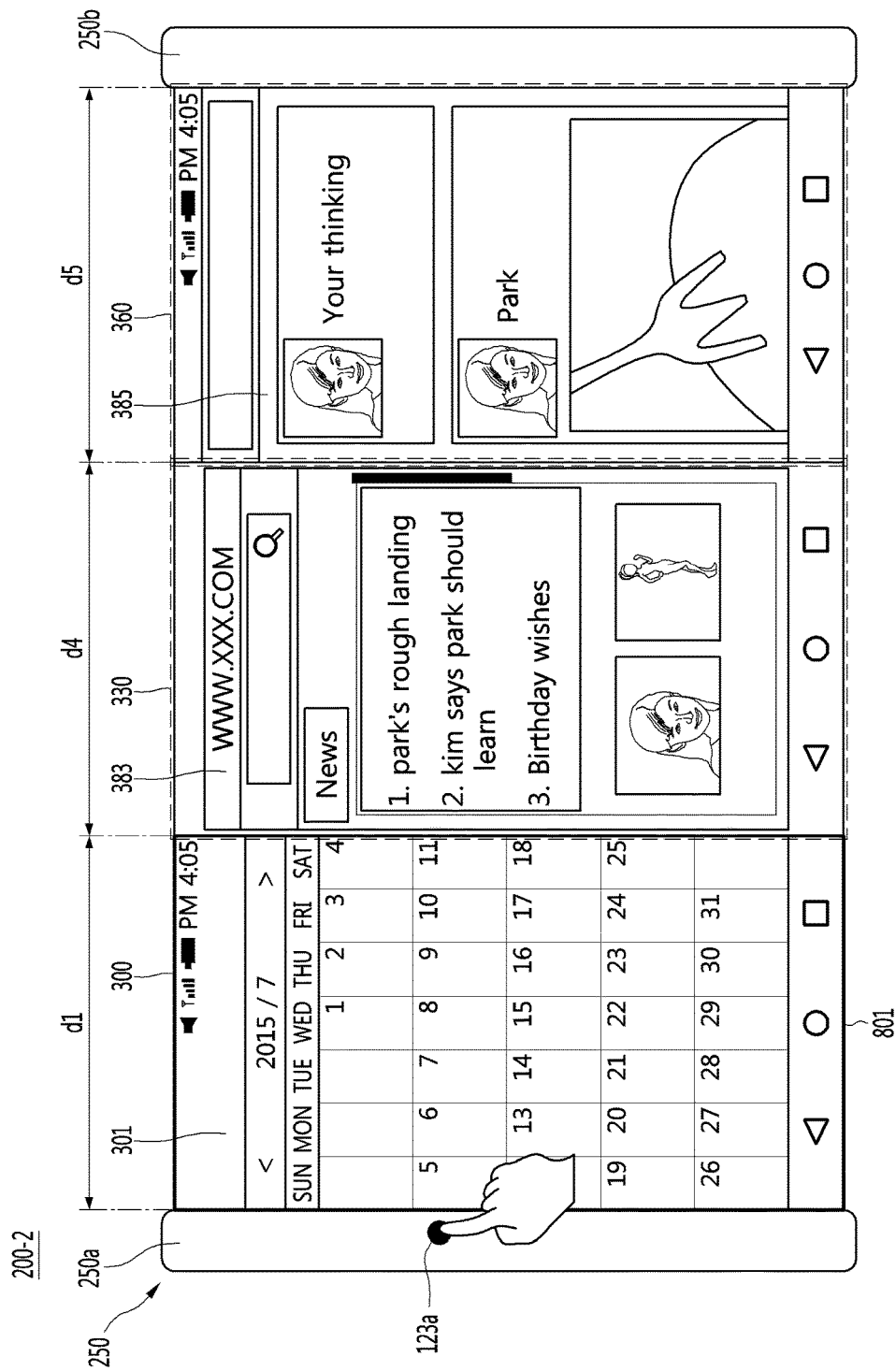
Figure 15C:
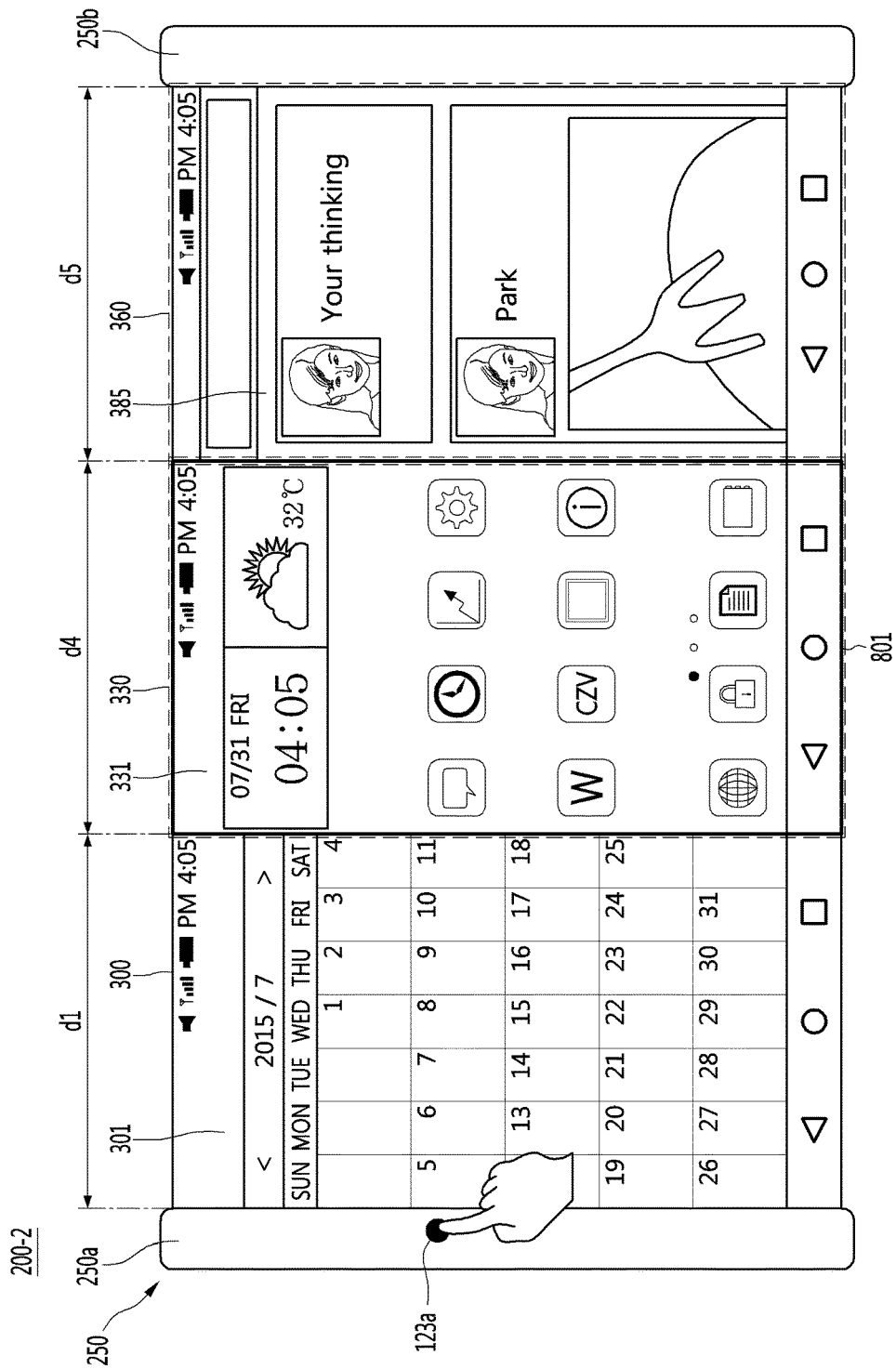

FIGS. 15A to 15C are diagrams illustrating an example in which one of the plurality of items is switched to the preset information using the home button according to an embodiment.

Referring to FIG. 15A, a home button 123*a* may be provided to the one side 250*a* of the display unit 250. The home button 123*a* may be included in the display unit 250, but an embodiment of the present disclosure is not limited thereto, and thus the home button 123 may be provided separately from the display unit 250. The display unit 250 may display first information 301 on the first area 300, second information 383 on the second area 330, and third information 385 on the third area 360. The second and third areas 330 and 360 may be extended areas of the screen of the display unit 250.

In the case where a request for selecting the home button 123*a* is received, the control unit 290 may control the display unit 250 so that a highlight box 801 is displayed on the first area 300. The highlight box 801 may surround a perimeter of the first area 300. Due to the highlight box 801, the first area 300 may be differentiated from the second and third areas 330 and 360.

In the case where a request for reselecting the home button 123*a* is received, the control unit 290 may move the highlight box 801 to the second area 330 as illustrated in FIG. 15B. In this state, if a request for pressing the home button 123*a* for a preset time or longer is received, the control unit 290 may switch the second information 383 displayed on the second area 330 to the preset information as illustrated in FIG. 15C. The preset information may be the home screen 331.

The user may easily switch an item displayed on a specific area to the home screen using the home button.

Figure 16A:
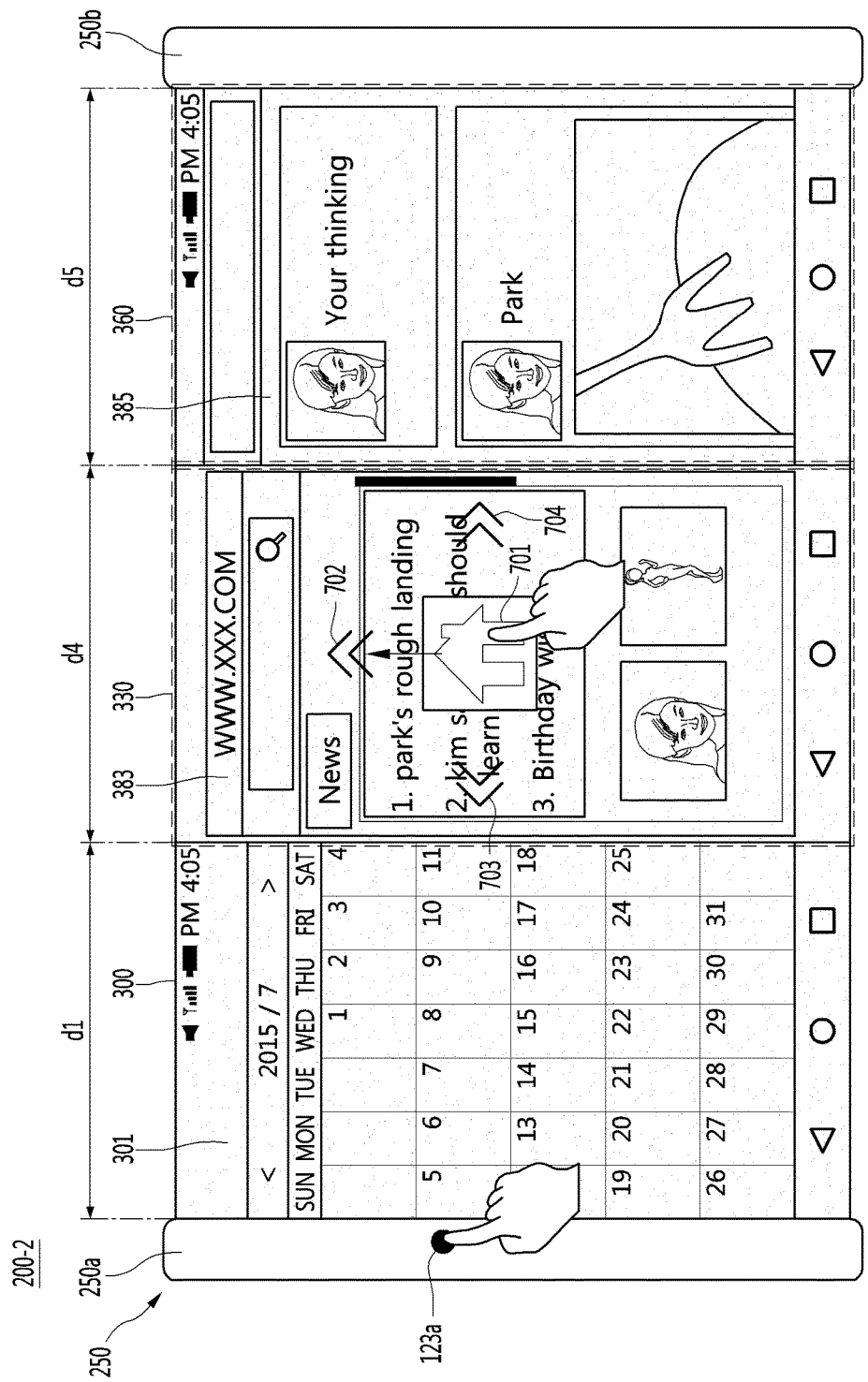
FIGS. 16A and 16B are diagrams illustrating an example in which one of the plurality of items is switched to the preset information using the home button according to another embodiment.
Figure 16B:
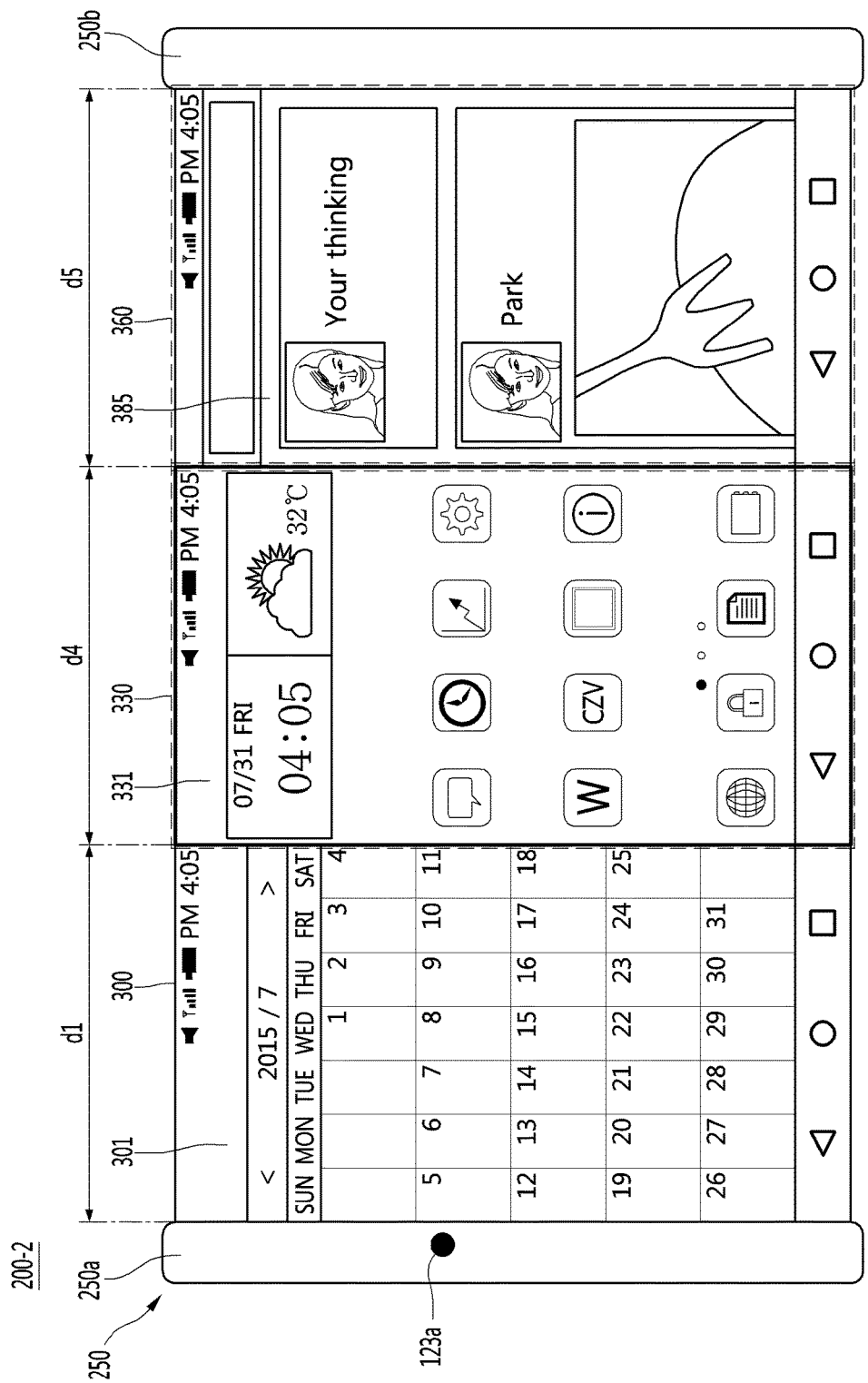

FIGS. 16A and 16B are diagrams illustrating an example in which one of the plurality of items is switched to the preset information using the home button according to another embodiment.

In the case where a request for reselecting the home button 123*a* is received, the control unit 290 may display a home icon 701 on the display unit 250 as illustrated in FIG. 16A. The home icon 701 may be used to switch an item displayed on a specific area to the home screen. An upward movement guide 702, a leftward movement guide 703, and a rightward movement guide 704 may be displayed around the home icon 701. Furthermore, the control unit 290 may dim the first to third areas 300, 330 and 360 while displaying the home icon 701 in response to the request for selecting the home button 123*a*. If an input of dragging-and-dropping the home icon 701 upwards is received, the control unit 290 may switch the second information 383 displayed on the second area 330 to the preset information 331 as illustrated in FIG. 16B. The preset information may be the home screen 331.

The user may easily switch an item displayed on a specific area to the home screen using the home button.

The method of FIG. 14 continues to be described below referring back to FIG. 14.

In the case where a request for selecting the home button two times is received (S309), the control unit 290 provides information related to the items displayed on the plurality of areas respectively (S311). In one embodiment, in the case where an input of selecting the home button 123*a* two times within a preset time is received, the control unit 290 may display items associated with the items displayed on the plurality of areas respectively The preset time may be one second, but this is merely an example. Operations S309 and S311 are described below with reference to the following figures.

Figure 17B:
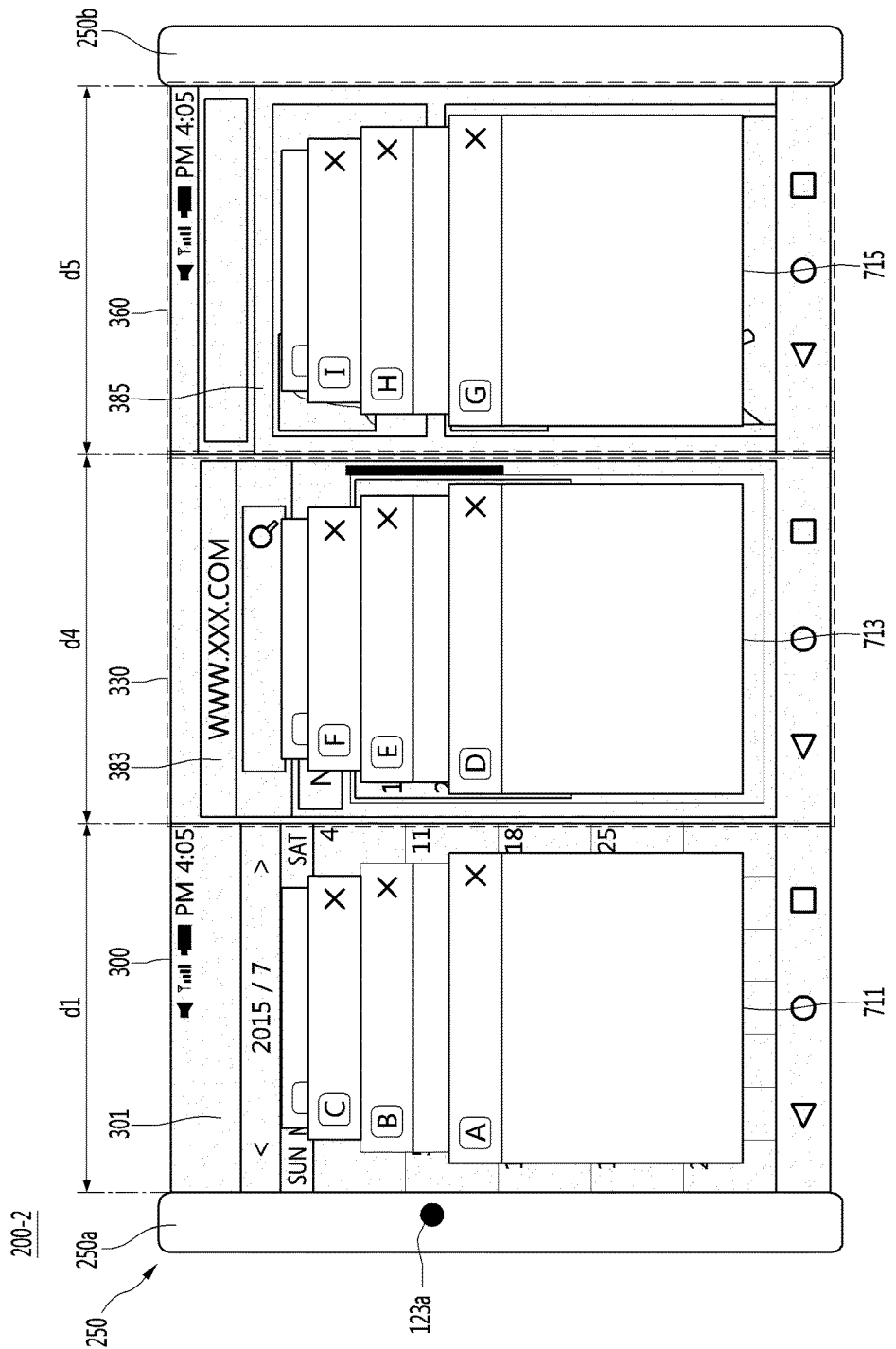

FIGS. 17A and 17B are diagrams illustrating an example in which in the case where a request for successively selecting the home button two times is received, information related to each item is displayed.

Referring to FIG. 17A, if a request for successively selecting the home button 123*a* two times within one second is received, the control unit 290 may display information 711 associated with the first information 301 displayed on the first area 300 as illustrated in FIG. 17B. The associated information 711 may overlap the first information 301. In the case where the first information 301 is an execution window of a scheduling application, the associated information 711 may include information on a previous schedule. For example, in the case where the execution window 301 of the scheduling application includes information on a schedule of August, the associated information 711 may include information on schedules of April to July.

In the case where the second information 383 displayed on the second area 330 is an execution window of an Internet application, the control unit 290 may display, on the second area 330, website windows 713 previously accessed through the Internet application, in response to the request for successively selecting the home button 123*a* two times within one second. The previously accessed website windows 713 may overlap the second information 383.

In the case where the third information 385 displayed on the third area 360 is a social network service application, the control unit 290 may display content 715 previously uploaded by the user through the social network service application. The previously uploaded content 715 may overlap the third information 385.

In the case where a request for successively selecting the home button two times within one second is received, the first to third information 301, 383 and 385 previously displayed may be dimmed.

Described below is an example in which an item displayed on a specific area among the plurality of areas is enlarged as the display unit 250 is extended.

Figure 18A:
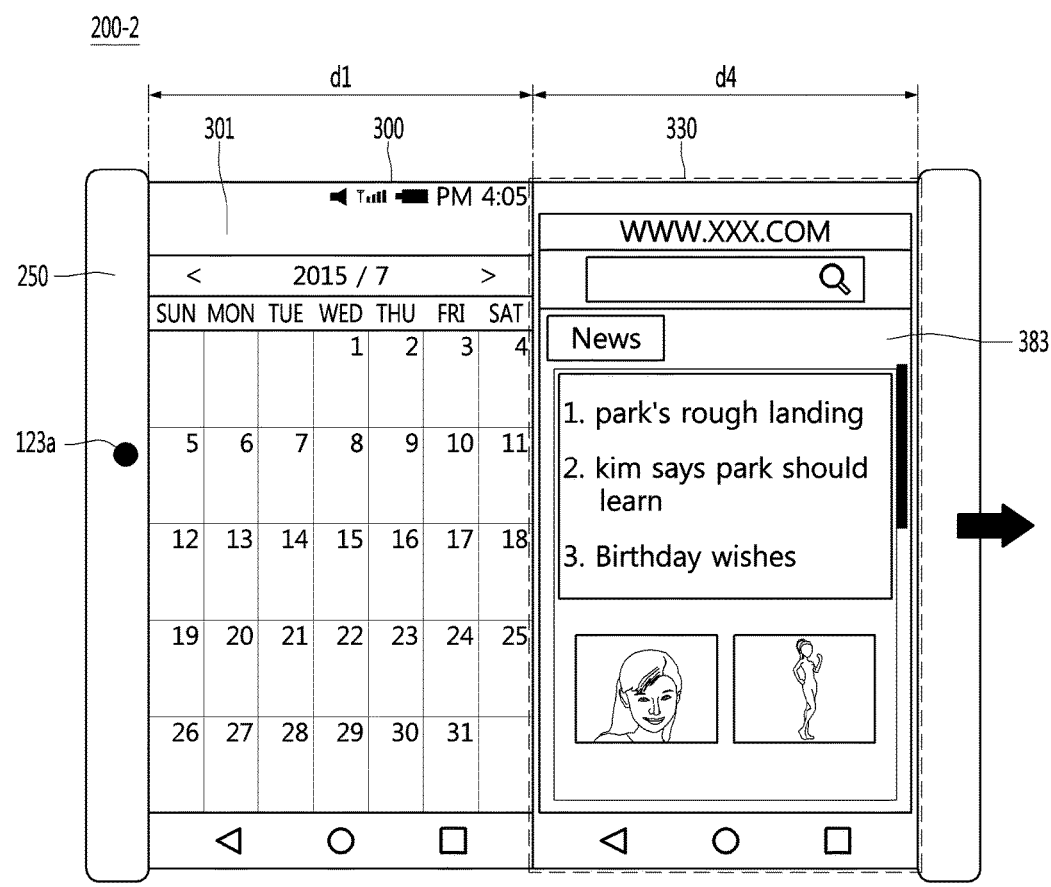
FIGS. 18A and 18B are diagrams illustrating that, in the case where the display unit is extended without receiving a request for selecting the home button, an item of an area corresponding to an extending direction of the display unit is enlarged.
Figure 18B:
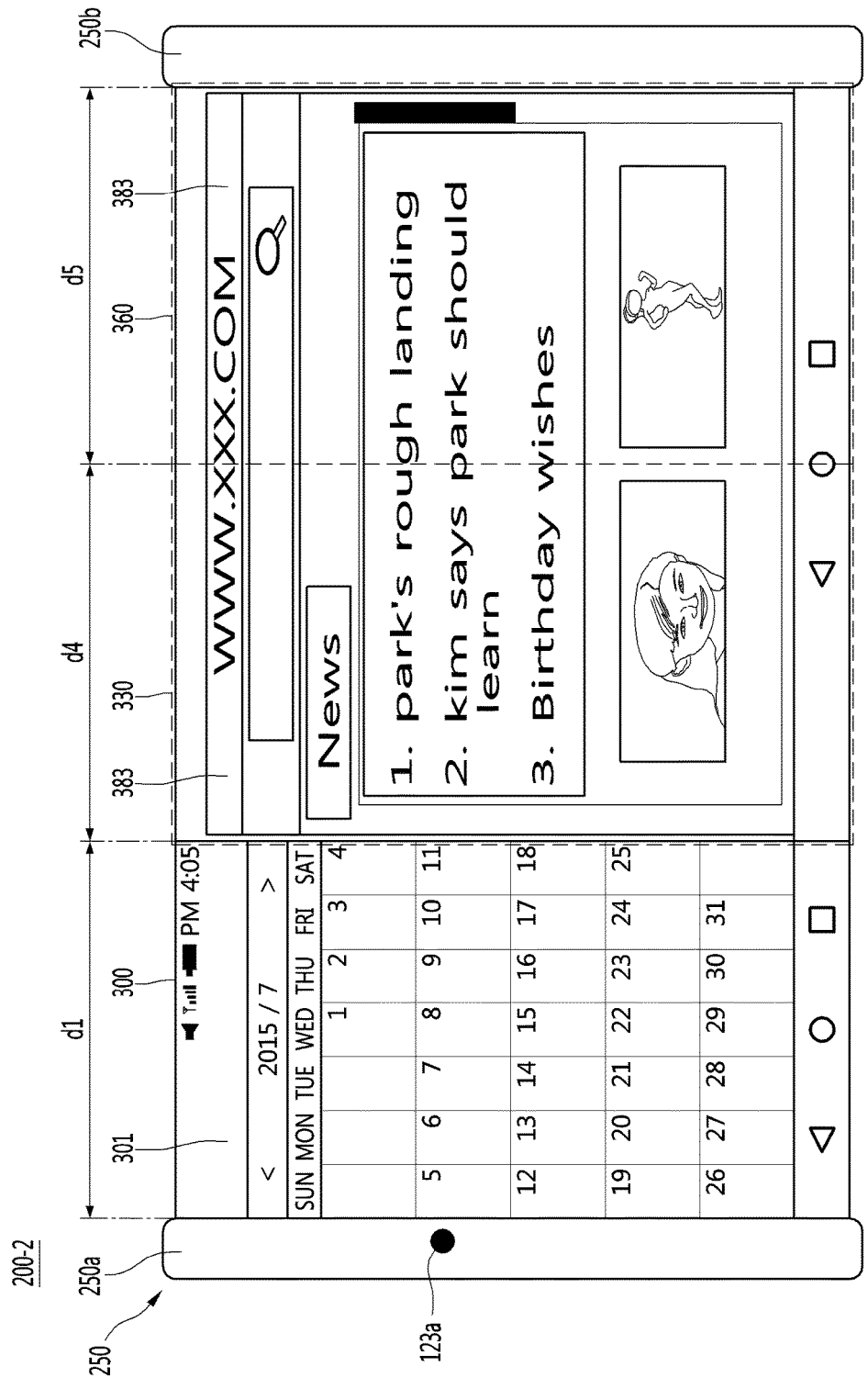

FIGS. 18A and 18B are diagrams illustrating that, in the case where the display unit is extended without receiving a request for selecting the home button, an item of an area corresponding to an extending direction of the display unit is enlarged.

Referring to FIG. 18A, the display unit 250 is in a state of being extended by as much as the second area 330 corresponding to the distance d4. In the case where a request for selecting the home button 123*a* is not received and it is detected that the display unit 250 is extended in the +x-axis direction, the control unit 290 may extend the display unit 250 by as much as the third area 360 corresponding to the distance d5 as illustrated in FIG. 18B. At the same time, the control unit 290 may enlarge the second information 383 displayed on the second area 330 so that the second information 383 may fit the extended area 360.

Figure 19A:
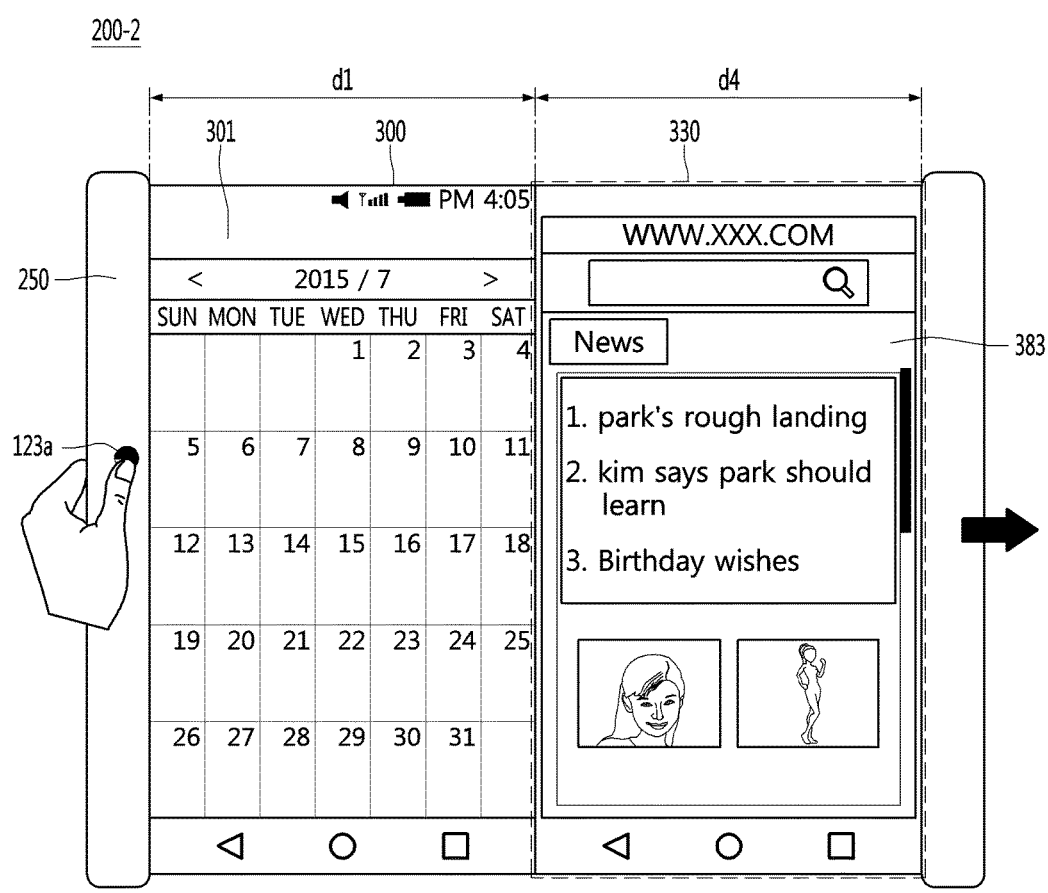

FIGS. 19A and 19B are diagrams illustrating that, in the case where a request for selecting the home button is received and the display unit is extended, an item of an area corresponding to an extending direction of the display unit is enlarged.

Referring to FIG. 19A, in the case where the request for selecting the home button 123*a* is received and it is detected that the display unit 250 is extended in the +x-axis direction, the control unit 290 may extend the display unit 250 by as much as the third area 360 corresponding to the distance d5 as illustrated in FIG. 19B. At the same time, the control unit 290 may enlarge the first information 301 displayed on the first area 300 so that the first information 383 may fit the extended area 360. Here, the user may keep pressing the home button 123*a*.

The user may enlarge an item of a desired location using the home button 123*a*.

According to various embodiments of the present disclosure, various information may be provided according to a degree of extension of a screen of a display unit so that the needs of the user may be met.

Furthermore, according to various embodiments of the present disclosure, the user may easily perform multitasking using an extended area of a display unit.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A flexible display device comprising:
a case;
a display unit including a screen that can extend or retract from the case, wherein a button is provided to the display unit;
a sensing unit configured to detect a size of the screen if extended from the case; and
a control unit coupled with the display unit and the sensing unit, wherein the control unit is further configured to:
display an executed first application on a first window on an area corresponding to a first distance of the screen if the screen is extended out corresponding to the first distance, and
display an executed second application on a second window on an area corresponding to a second distance of the screen if the screen is further extended out corresponding to the second distance,
wherein the control unit is configured to:
enlarge the first application displayed on the area corresponding to the first distance of the screen if a request for selecting the button is received and it is detected that the screen is further extended while displaying the first application on the first window and the second application on the second window, and
enlarge the second application displayed on the area corresponding to the second distance of the screen if the request for selecting the button is not received and it is detected that the screen is further extended while displaying the first application on the first window and the second application on the second window.

2. The flexible display device according to claim 1, wherein the sensing unit detects the screen extending out of the case and transmits to the control unit, wherein the control unit is configured to display the executed second application on the second window on the area corresponding to the second distance.

3. The flexible display device according to claim 2, wherein the first window and the second window are separated from each other on the screen.

4. The flexible display device according to claim 1, wherein when the at least a portion of the screen is retracted into the case after being extended to the first distance, the control unit is configured to display on the first window, an indicator indicating that a second application can be executed if the screen is extended out of the ease beyond the first distance.

5. The flexible display device according to claim 1, wherein the control unit is further configured to remove a part of the executed first application from the first window on the screen if the at least a portion of the screen is retracted into the case by a predetermined distance.

6. The flexible display device according to claim 1, wherein the first application and the second application provides a same type of service.

7. The flexible display device according to claim 1, wherein when the sensing unit does not detect that the screen is retracted into the case from the first distance in which the screen is extended and detects that the screen is extended beyond the first distance, and transmits to the control unit, the control unit is configured to display the first executed application on the first window that is enlarged corresponding to an area corresponding to a distance beyond the first distance.

8. A flexible display device comprising:
a case;
a display unit including a screen that can extend or retract from the case, wherein a button is provided to the display unit;
a sensing unit configured to detect a size of the screen when extended from the case; and a control unit coupled with the display unit and the sensing unit, wherein the control unit is configured to:

display a first information on a first area corresponding to a first distance of the screen, and display a second information related to the first information on a second area corresponding to a second distance of the screen if the screen is extended from the case, wherein the control unit is configured to:

enlarge the first information displayed on the area corresponding to the first distance of the screen if a request for selecting the button is received and it is detected that the screen is further extended while displaying the first information on the first area and the second information on the second area, and enlarge the second information displayed on the area corresponding to the second distance of the screen if the request for selecting the button is not received and it is detected that the screen is further extended while displaying the first information on the first area and the second information on the second area.

9. The flexible display device according to claim 8, wherein the first information is an executed first application and the second information is a home screen.

10. The flexible display device according to claim 9, wherein the control unit is further configured to
   receive a request corresponding to a selected application icon included in the home screen; and
   switch the home screen to an executed second application corresponding to the selected application icon.

11. The flexible display device according to claim 8, wherein the first information is an executed first application and the second information is an executed second application.

12. The flexible display device according to claim 11, wherein the first application and the second application provides a same type of service.

13. The flexible display device according to claim 8, wherein when the sensing unit does not detect that the screen is retracted into the case from the first distance in which the screen is extended and detects that the screen is extended beyond the first distance, and transmits to the control unit, the control unit is configured to display an enlarged first information on an area corresponding to a distance beyond the first distance.

* * * * *